(12) United States Patent
Wagner et al.

(10) Patent No.: US 8,698,762 B2
(45) Date of Patent: Apr. 15, 2014

(54) DEVICE, METHOD, AND GRAPHICAL USER INTERFACE FOR NAVIGATING AND DISPLAYING CONTENT IN CONTEXT

(75) Inventors: Oliver P. Wagner, San Francisco, CA (US); Michael Matas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 530 days.

(21) Appl. No.: 12/789,441

(22) Filed: May 27, 2010
(Under 37 CFR 1.47)

(65) Prior Publication Data
US 2011/0163971 A1    Jul. 7, 2011

Related U.S. Application Data

(60) Provisional application No. 61/335,520, filed on Jan. 6, 2010.

(51) Int. Cl.
*G06F 3/041* (2006.01)
(52) U.S. Cl.
USPC .............. 345/173; 345/156; 341/20; 715/863
(58) Field of Classification Search
USPC .................................................. 345/173–181
See application file for complete search history.

(56) References Cited

U.S. PATENT DOCUMENTS

| | | | |
|---|---|---|---|
| 7,587,671 B2 * | 9/2009 | Saft et al. ....................... | 715/253 |
| 2003/0122787 A1 | 7/2003 | Zimmerman et al. ........ | 345/173 |
| 2004/0135797 A1 | 7/2004 | Meier et al. .................... | 345/684 |
| 2004/0205504 A1 | 10/2004 | Phillips ....................... | 715/501.1 |
| 2005/0183026 A1 | 8/2005 | Amano et al. ................ | 715/764 |
| 2006/0001652 A1 | 1/2006 | Chiu et al. .................... | 345/173 |
| 2007/0152984 A1 | 7/2007 | Ording et al. ................. | 345/173 |
| 2008/0052945 A1 | 3/2008 | Matas et al. .................... | 34/173 |
| 2008/0168349 A1 | 7/2008 | Lamiraux et al. ............. | 715/702 |
| 2008/0168402 A1 * | 7/2008 | Blumenberg ................. | 715/863 |
| 2008/0309632 A1 | 12/2008 | Westerman et al. .......... | 345/173 |

(Continued)

FOREIGN PATENT DOCUMENTS

WO    WO 03/023593 A1    3/2003    ............. G06F 3/033

OTHER PUBLICATIONS

Dailywireless.org, "GPS Blogging Phones," 3 pages, Aug. 25, 2005, http://www.dailywireless.org/modules.php?name=News&file=article&sid=4163.

(Continued)

*Primary Examiner* — Christopher E Leiby
(74) *Attorney, Agent, or Firm* — Morgan, Lewis & Bockius LLP

(57) ABSTRACT

An electronic device displays one or more thumbnails. The device detects a first multi-contact gesture that includes movement of a first contact and a second contact; and, in response to detecting the first multi-contact gesture, the device displays content associated with a respective thumbnail and enlarges the content associated with the respective thumbnail to a respective enlarged size in accordance with the first multi-contact gesture. The device detects termination of the first multi-contact gesture; and, in response to detecting termination of the first multi-contact gesture: when a resizing metric based on the first multi-contact gesture is below a predefined threshold, the device ceases to display the content at the respective enlarged size; and, when the resizing metric based on the first multi-contact gesture is above the predefined threshold, the device displays the content on the display in a predefined arrangement.

25 Claims, 62 Drawing Sheets

(56) References Cited

U.S. PATENT DOCUMENTS

| | | | | |
|---|---|---|---|---|
| 2009/0278806 | A1 | 11/2009 | Duarte et al. | 345/173 |
| 2010/0083173 | A1* | 4/2010 | Germann et al. | 715/810 |
| 2010/0088641 | A1 | 4/2010 | Choi | 715/828 |
| 2010/0283743 | A1 | 11/2010 | Coddington | 345/173 |
| 2010/0302179 | A1* | 12/2010 | Ahn et al. | 345/173 |

OTHER PUBLICATIONS

EECE418 Project Paper Prototype, "Team 2: Portable Digital Photo Album," 16 pages, May 8, 2008.

Gears, "Orange SPV C600 Review," coolsmartphone.com, Apr. 14, 2006, 58 pages, http://www.coolsmartphone.com/article569.html.

Google Earth Blog, "New Improved Panoramio—Geo Photo Sharing," 1 page, printed Feb. 5, 2008, http://www.gearthblog.com/blog/archives/2006/06/new_improved_pa.html.

Han, J.Y., "Multi-Touch Interaction Research," printed Apr. 13, 2006, 4 pages, http://mrl.nyu.edu/~jhan/ftirtouch/.

MS Mobiles.com-Simply Mobile, "New Program for Mobile Blogging for Pocket PC Release: My Blog," Jul. 23, 2005, 1 page, http://msmobiles.com/news.php/4067.html.

Versiontracker, "Photogather—7.2.6. Hi-res Image Viewer & Editor for Palm," printed Jun. 12, 2006, 5 pages, http://www.versiontracker.com/dyn/moreinfo/palm/4624.

Invitation to Pay Additional Fees dated Jan. 28, 2008, received in International Application No. PCT/US2007/077441, which corresponds to U.S. Appl. No. 11/848,210.

International Search Report and Written Opinion dated May 8, 2008, for International Application No. PCT/US2007/077441, which corresponds to U.S. Appl. No. 11/848,210.

Office Action dated Mar. 15, 2010, received in Canadian Application No. 2,627,118, which corresponds to U.S. Appl. No. 11/848,210.

Office Action dated Jan. 8, 2010, received in Chinese Patent Application No. 200780001142.8, which corresponds to U.S. Appl. No. 11/848,210.

Office Action dated Sep. 14, 2010, received in German Patent Application No. 11 2007 000 067.8, which corresponds to U.S. Appl. No. 11/848,210.

Office Action dated Oct. 15, 2010, received in European Application No. 10 172 417.7, which corresponds to U.S. Appl. No. 11/848,210.

Anonymous, "Mouse gesture events," mozilla.org, May 14, 2009, 3 pages, http://developer.mozilla.org/index.php?title=En/DOM/Mouse_gesture_events&action=print.

International Search Report and Written Opinion dated May 26, 2011, received in International Application No. PCT/US2011/020403, which corresponds to U.S. Appl. No. 12/789,441.

ImageViewPro, "The simple flash photo slide show," ImageViewPro.com, downloaded Dec. 4, 2009, http://www.imageviewpro.com/instruction, 7 pages.

\* cited by examiner

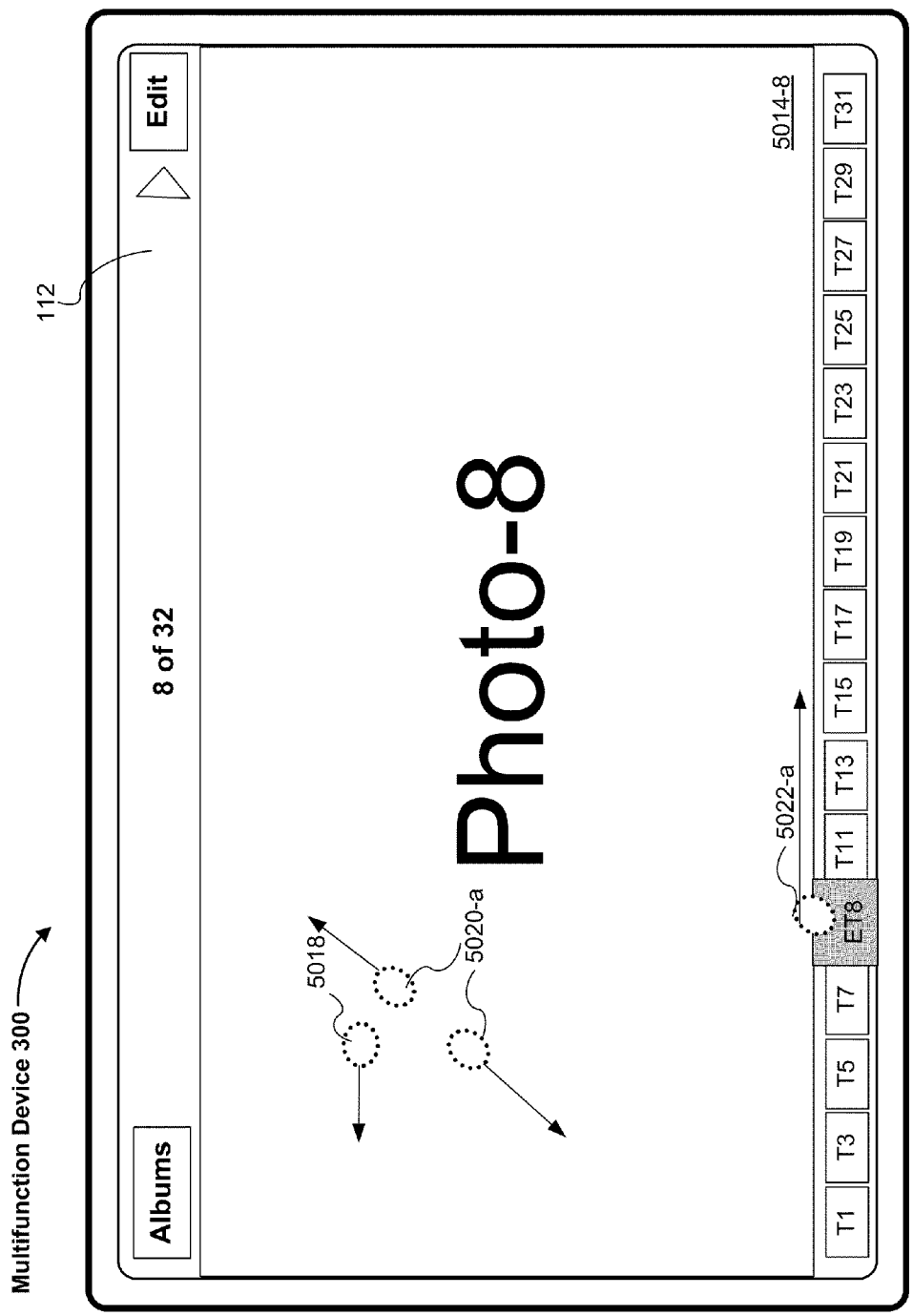

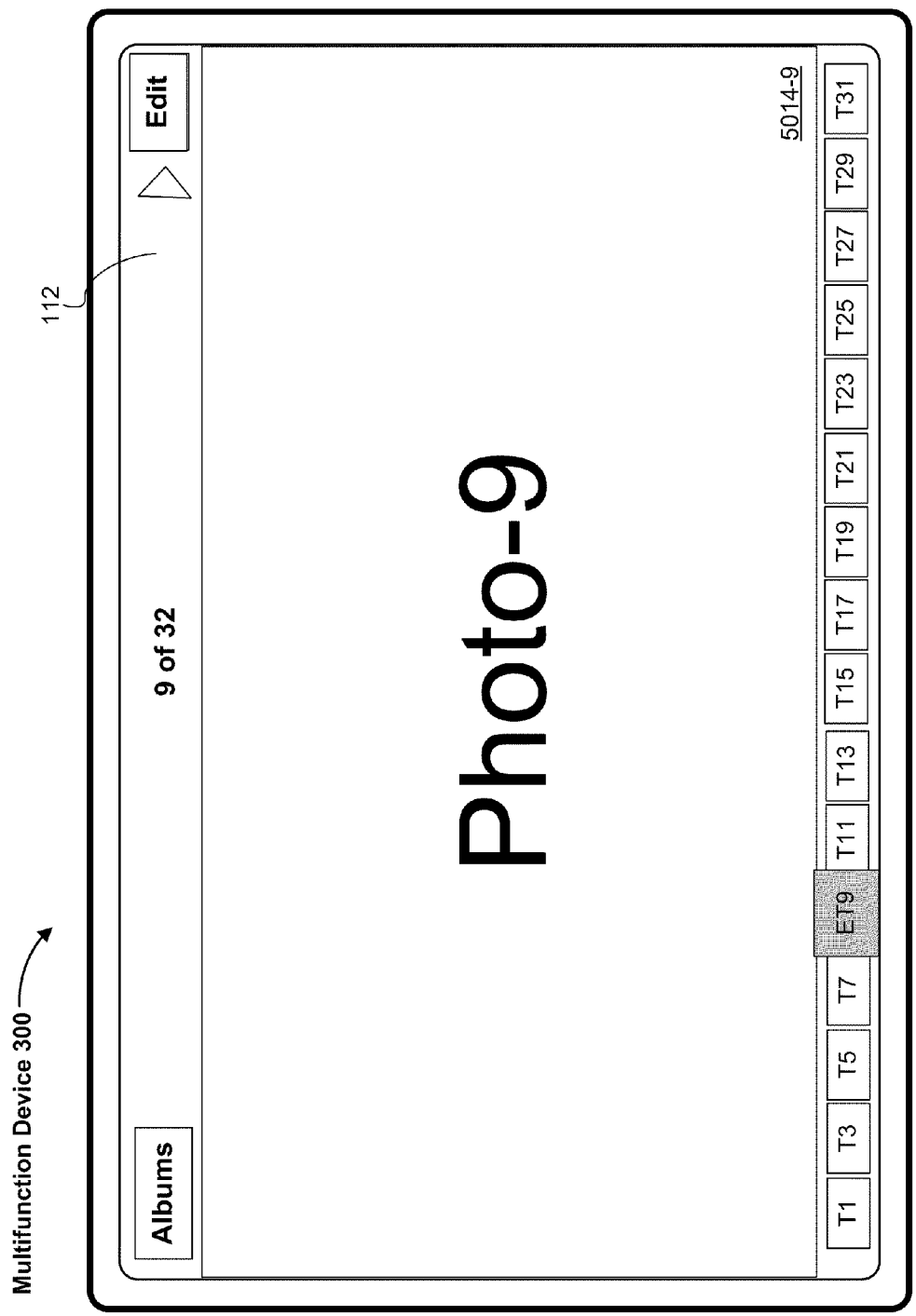

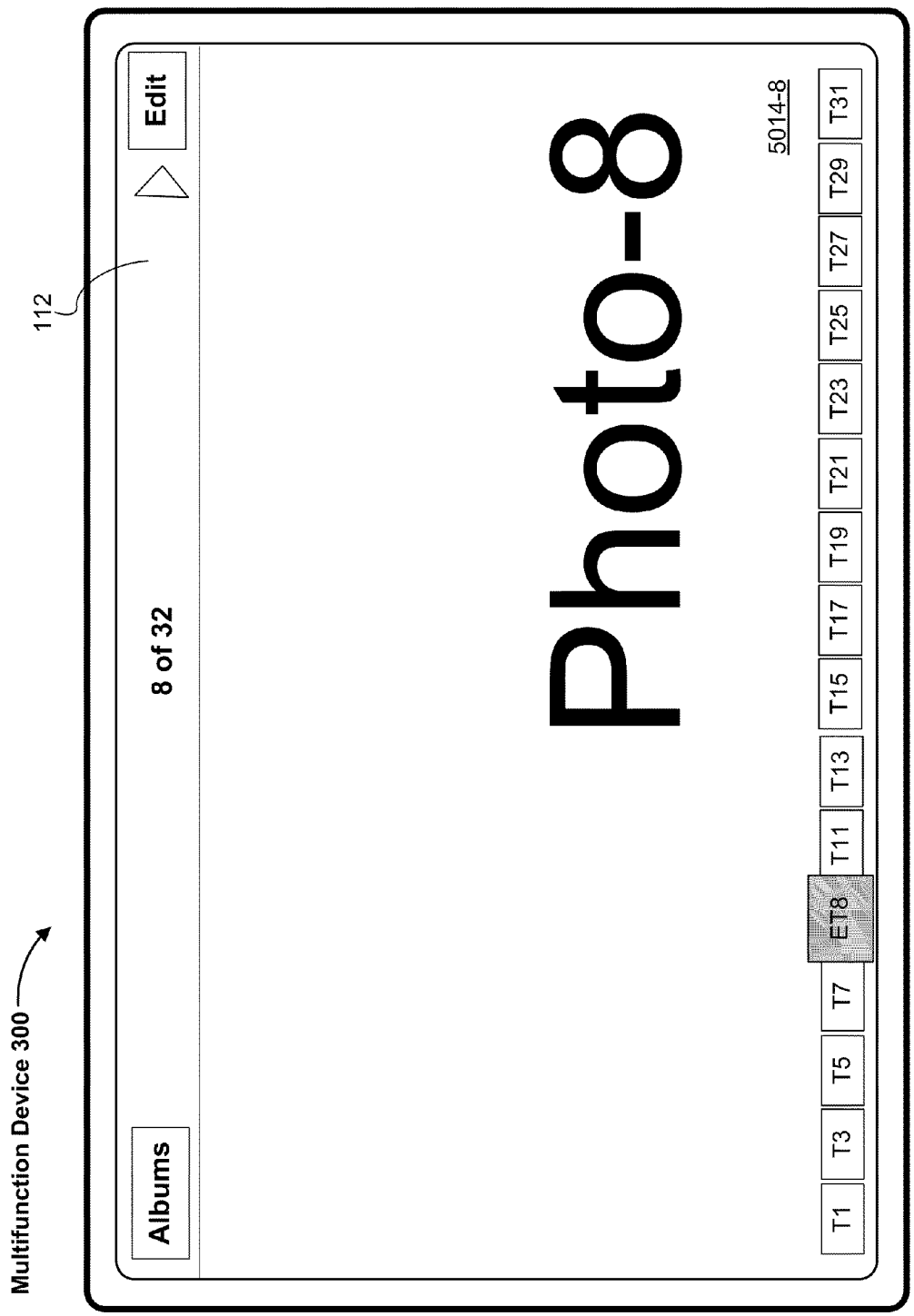

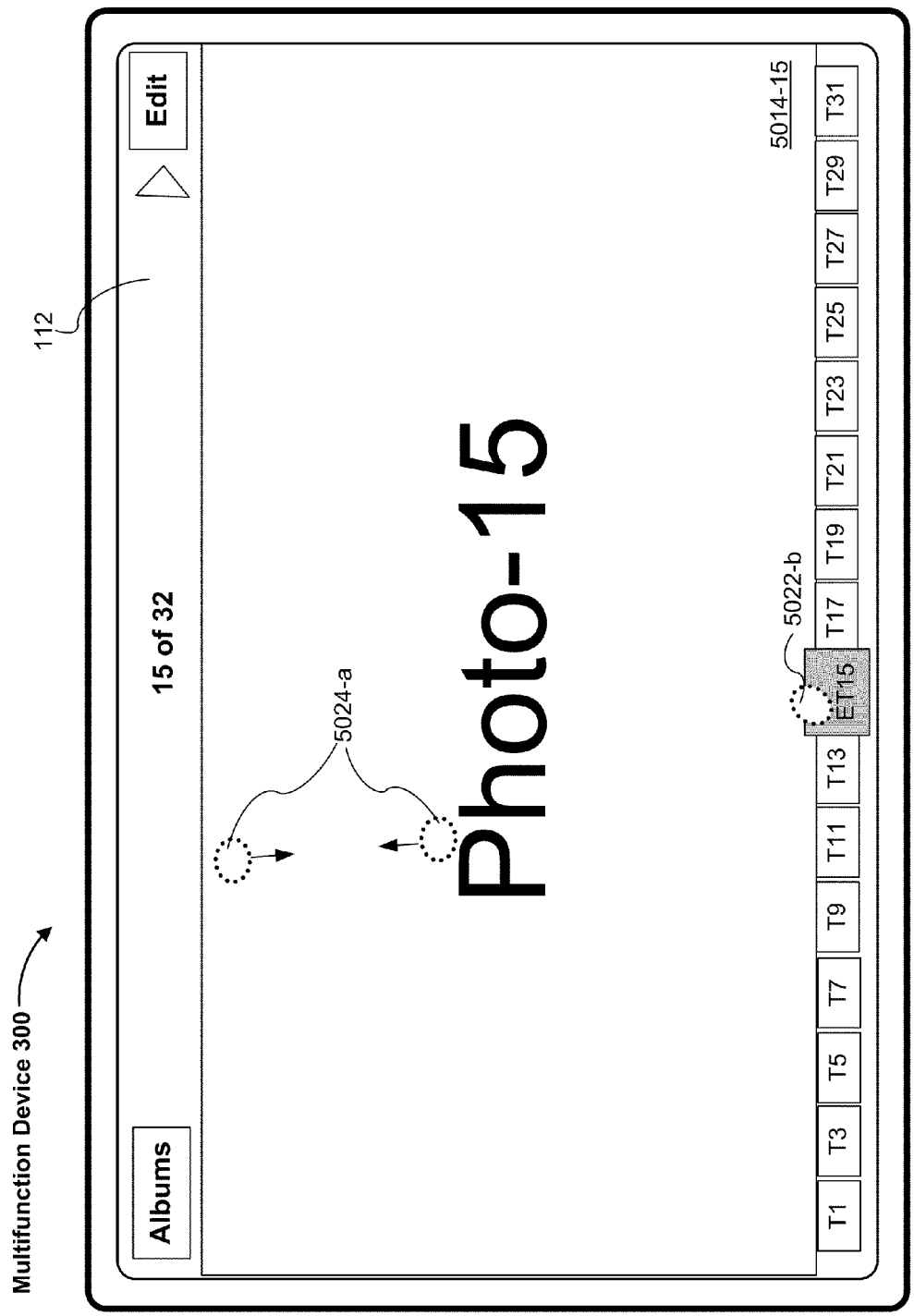

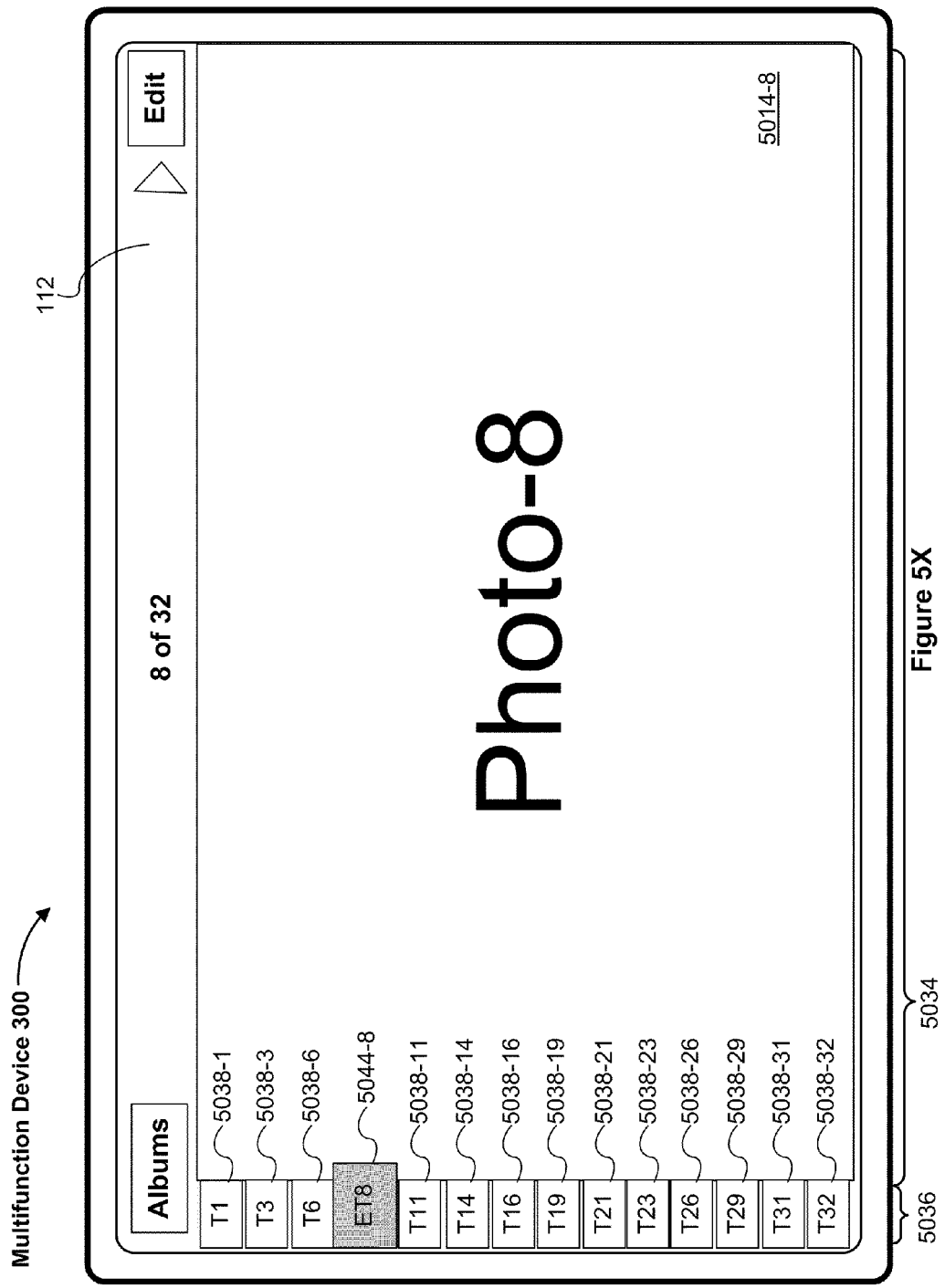

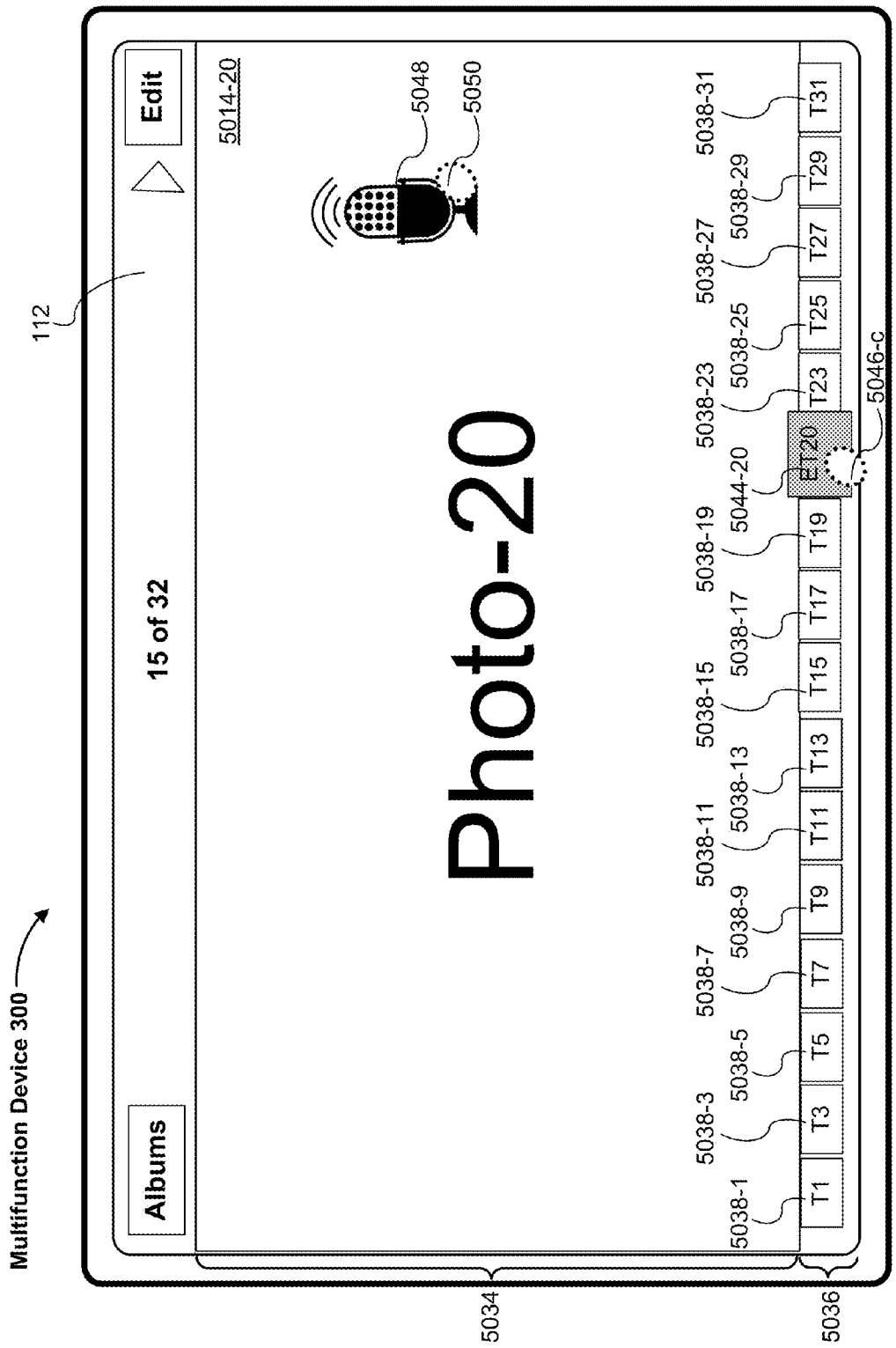

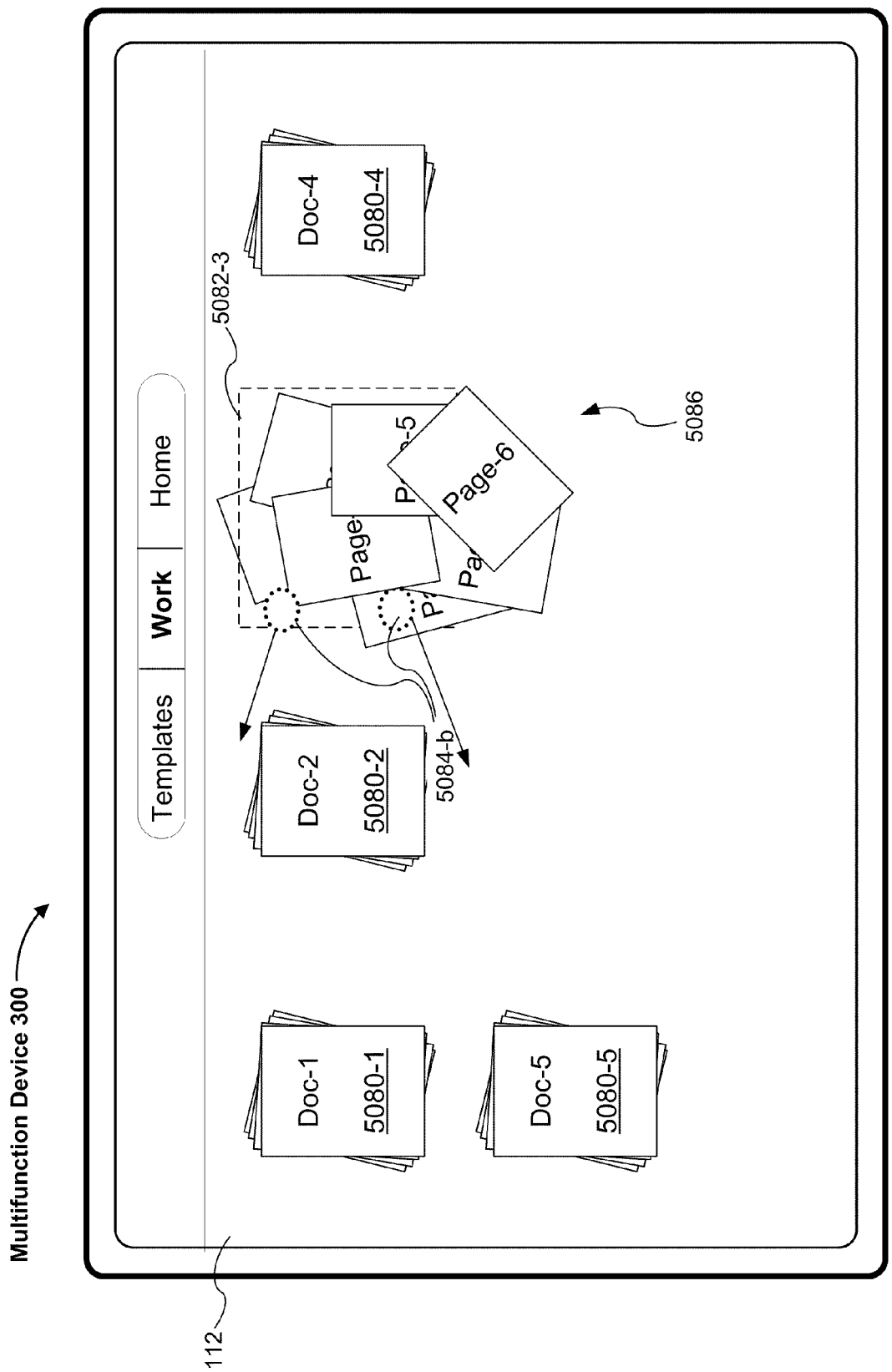

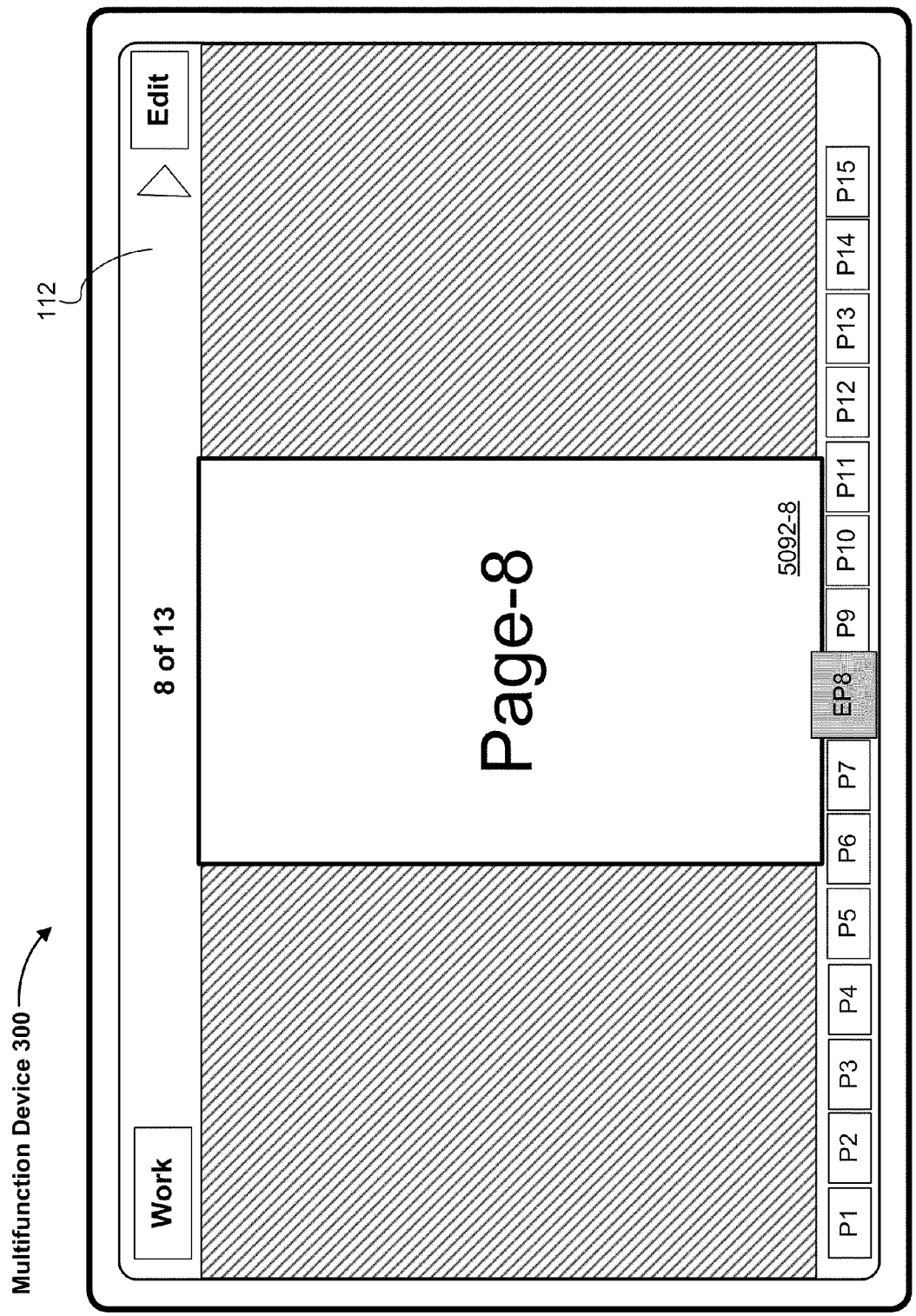

US 8,698,762 B2

DEVICE, METHOD, AND GRAPHICAL USER INTERFACE FOR NAVIGATING AND DISPLAYING CONTENT IN CONTEXT

RELATED APPLICATIONS

This application claims priority to U.S. Provisional Application Ser. No. 61/335,520, filed Jan. 6, 2010, entitled "Device, Method, and Graphical User Interface for Navigating and Displaying Content in Context," which is incorporated herein by reference in its entirety.

TECHNICAL FIELD

This relates generally to electronic devices with touch-sensitive surfaces, including but not limited to electronic devices with touch-sensitive surfaces that are used to display and navigate through content.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more images or viewing images that are associated with an album of images. Exemplary user interface objects include digital images, video, text files, audio files, icons, and other graphics. A user may need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for displaying and navigating through content are cumbersome and inefficient. For example, using a sequence of mouse-based inputs to select a representation of content and view the content associated with the representation of content or drill down through a hierarchy of content using many discrete inputs is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for displaying and navigating through content. Such methods and interfaces may complement or replace conventional methods for displaying and navigating through content. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at an electronic device with a display and a touch-sensitive surface. The method includes: displaying one or more thumbnails; and detecting a first contact and a second contact on the touch-sensitive surface. The method further includes, while continuing to detect the first contact and the second contact on the touch-sensitive surface: detecting a first multi-contact gesture that includes movement of the first contact and the second contact; and, in response to detecting the first multi-contact gesture: displaying content associated with a respective thumbnail; and enlarging the content associated with the respective thumbnail to a respective enlarged size in accordance with the first multi-contact gesture. The method further includes detecting termination of the first multi-contact gesture; and, in response to detecting termination of the first multi-contact gesture: when a resizing metric based on the first multi-contact gesture is below a predefined threshold, ceasing to display the content at the respective enlarged size; and, when the resizing metric based on the first multi-contact gesture is above the predefined threshold, displaying the content on the display in a predefined arrangement.

In accordance with some embodiments, a method is performed at an electronic device with a display and a touch-sensitive surface. The method includes: displaying one or more selectable objects; and detecting a first contact and a second contact on the touch-sensitive surface. The method further includes, while continuing to detect the first contact and the second contact on the touch-sensitive surface: detecting a first multi-contact gesture that includes movement of the first contact and the second contact; and, in response to detecting the first multi-contact gesture: displaying content associated with a respective selectable object; and enlarging the content associated with the respective selectable object to a respective enlarged size in accordance with the first multi-contact gesture. The method also includes detecting termination of the first multi-contact gesture; and, in response to detecting termination of the first multi-contact gesture: when a resizing metric based on the first multi-contact gesture is below a predefined threshold, ceasing to display the content at the respective enlarged size; and, when the resizing metric based on the first multi-contact gesture is above the predefined threshold, displaying the content on the display in a predefined arrangement.

In accordance with some embodiments, a method is performed at an electronic device with a display and a touch-sensitive surface. The method includes: displaying a plurality of album thumbnails. A respective album thumbnail represents a respective plurality of content items. The method also includes detecting a first contact and a second contact on the touch-sensitive surface. The method further includes, while continuing to detect the first contact and the second contact on the touch-sensitive surface: detecting a first multi-contact gesture that includes movement of the first contact and the second contact; and, in response to detecting the first multi-contact gesture, displaying representations of content items associated with the respective album thumbnail. The method also includes detecting termination of the first multi-contact gesture; and, in response to detecting termination of the first multi-contact gesture: when a first resizing metric based on the first multi-contact gesture is below a predefined threshold, ceasing to display the representations of the content items associated with the respective album thumbnail; and when the first resizing metric based on the first multi-contact gesture is above the predefined threshold, displaying the representations of the content items associated with the respective album thumbnail on the display in a first predefined arrangement. A respective representation of a content item is a respective content thumbnail that is associated with a respective content item. The method further includes, while displaying the representations of the content items associated with the respective album thumbnail on the display in the first predefined arrangement, detecting a third contact and a fourth contact on the touch-sensitive surface; and while continuing to detect the third contact and the fourth contact on the touch-sensitive surface: detecting a second multi-contact gesture that includes movement of the third contact and the fourth contact; and, in response to detecting the second multi-contact gesture, displaying the respective content item that is associated with the respective content thumbnail. The method further includes detecting termination of the second multi-contact gesture; and in response to detecting termination of the second multi-contact gesture: when a second resizing metric based on the second multi-contact gesture is below a predefined threshold, ceasing to display the respective content item that is associated with the respective content thumbnail; and when the second resizing metric based on the second multi-contact gesture is above the predefined threshold, displaying the respective content item in a second predefined arrangement.

In accordance with some embodiments, a method is performed at an electronic device with a display and a touch-sensitive surface. The method includes: displaying a presentation user interface configured to present content items from a set of content items in a predetermined sequence, the presentation user interface including: a display region for displaying a currently displayed content item in the set of content items; and a scrubber for navigating between content items in the set of content items. The scrubber includes: an ordered line of thumbnail representations for a plurality of content items in the set of content items. The ordered line is ordered in accordance with the predetermined sequence. The scrubber also includes an enlarged thumbnail representation of the currently displayed content item. The enlarged thumbnail representation is displayed in the ordered line at a position that is determined in accordance with the predetermined sequence. The method further includes detecting a first input at a location on the touch-sensitive surface that corresponds to a location on the scrubber for a respective content item in the set of content items; and, in response to detecting the first input, displaying the respective content item in the display region and displaying an enlarged thumbnail representation of the respective content item in the scrubber at a location on the scrubber that is determined in accordance with the predetermined sequence.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display and a touch-sensitive surface, cause the device to perform the operations of any of the methods described above. In accordance with some embodiments, an electronic device includes: a display; a touch-sensitive surface; means for performing the operations of any of the methods described above. In accordance with some embodiments, an information processing apparatus, for use in an electronic device with a display and a touch-sensitive surface, includes means for performing the operations of any of the methods described above.

Thus, electronic devices with displays and touch-sensitive surfaces are provided with faster, more efficient methods and interfaces for displaying and navigating through content, thereby increasing the effectiveness, efficiency, and user satisfaction with such devices. Such methods and interfaces may complement or replace conventional methods for displaying and navigating through content.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
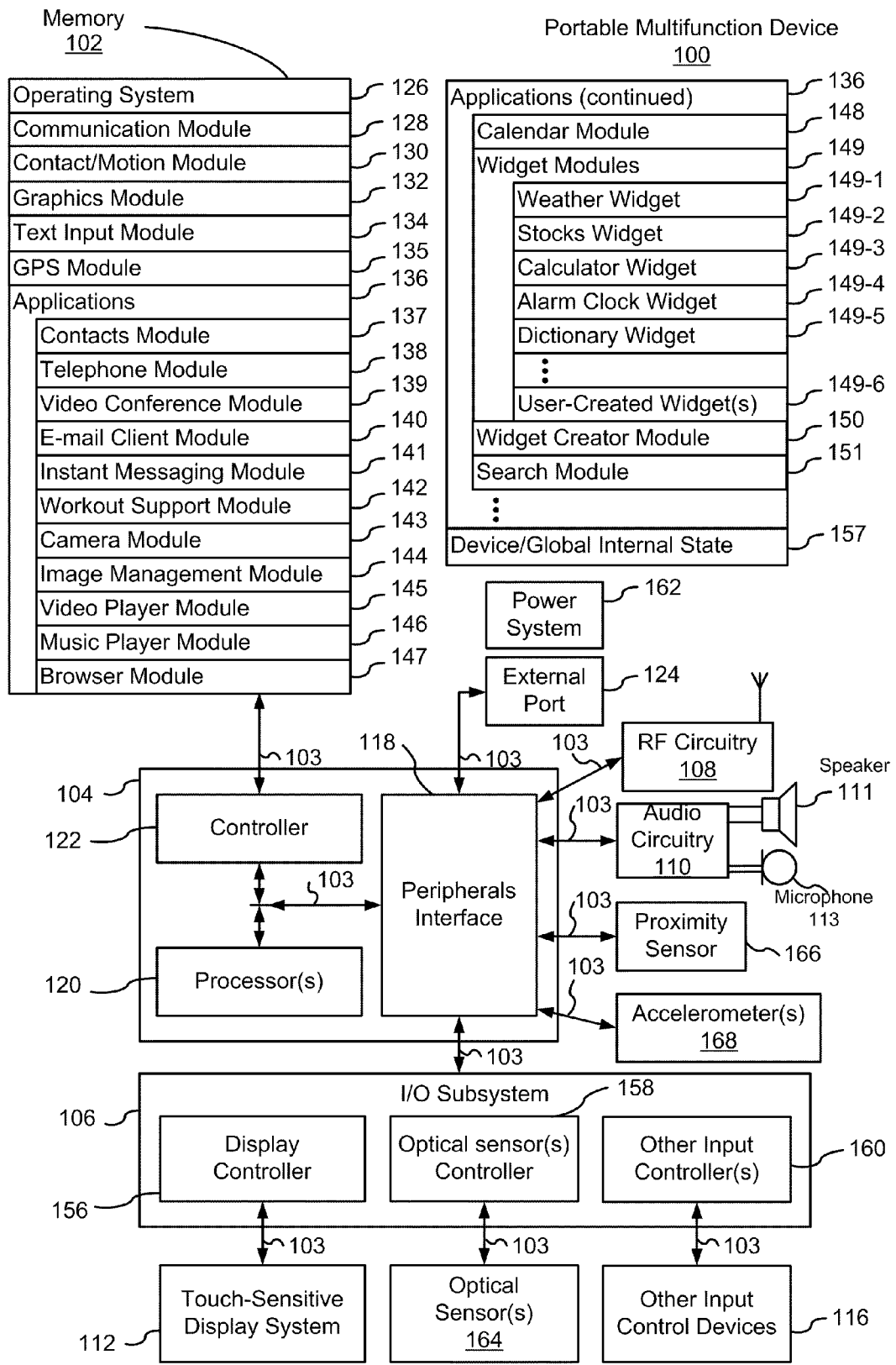
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
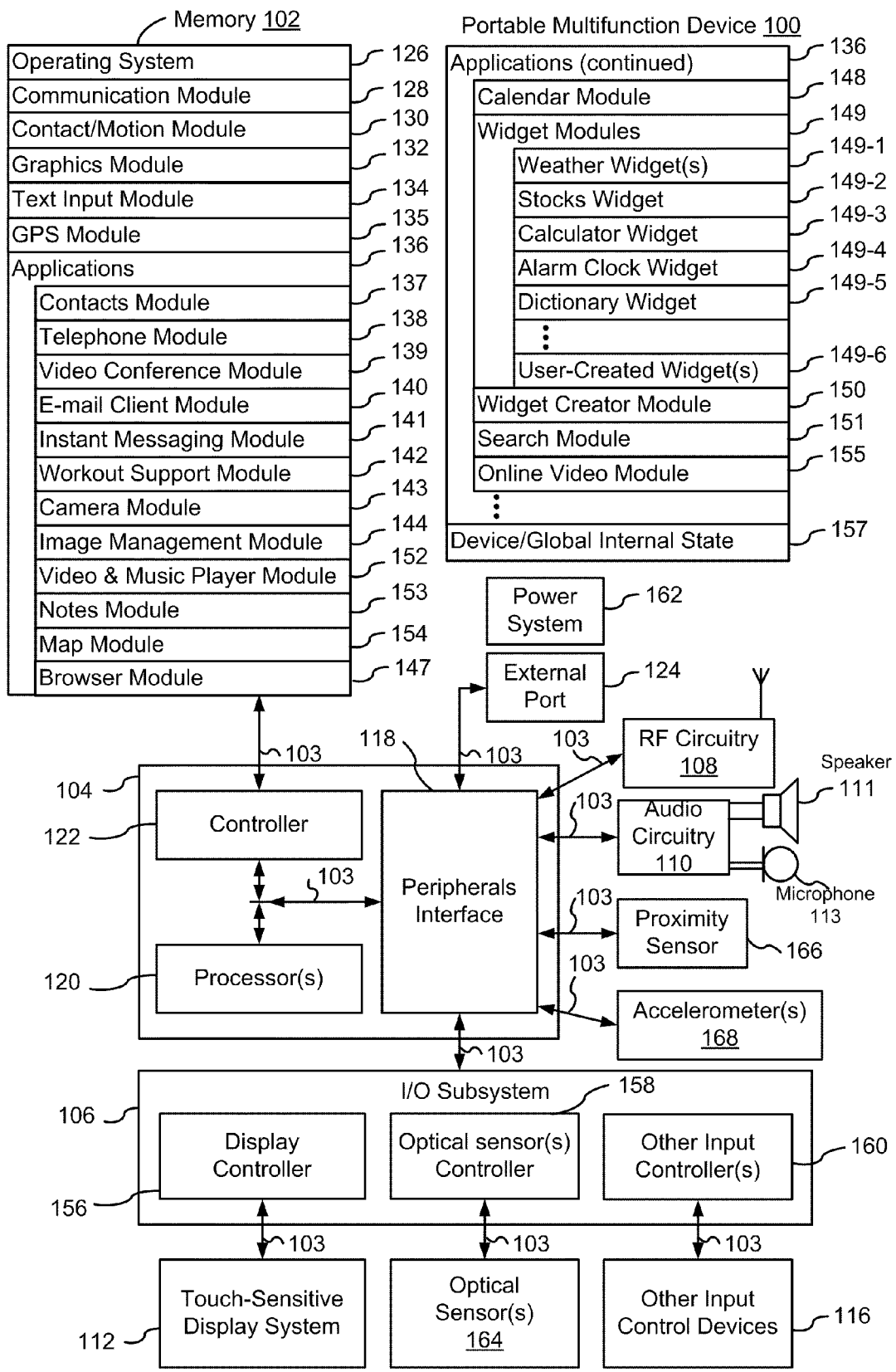

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser.

No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
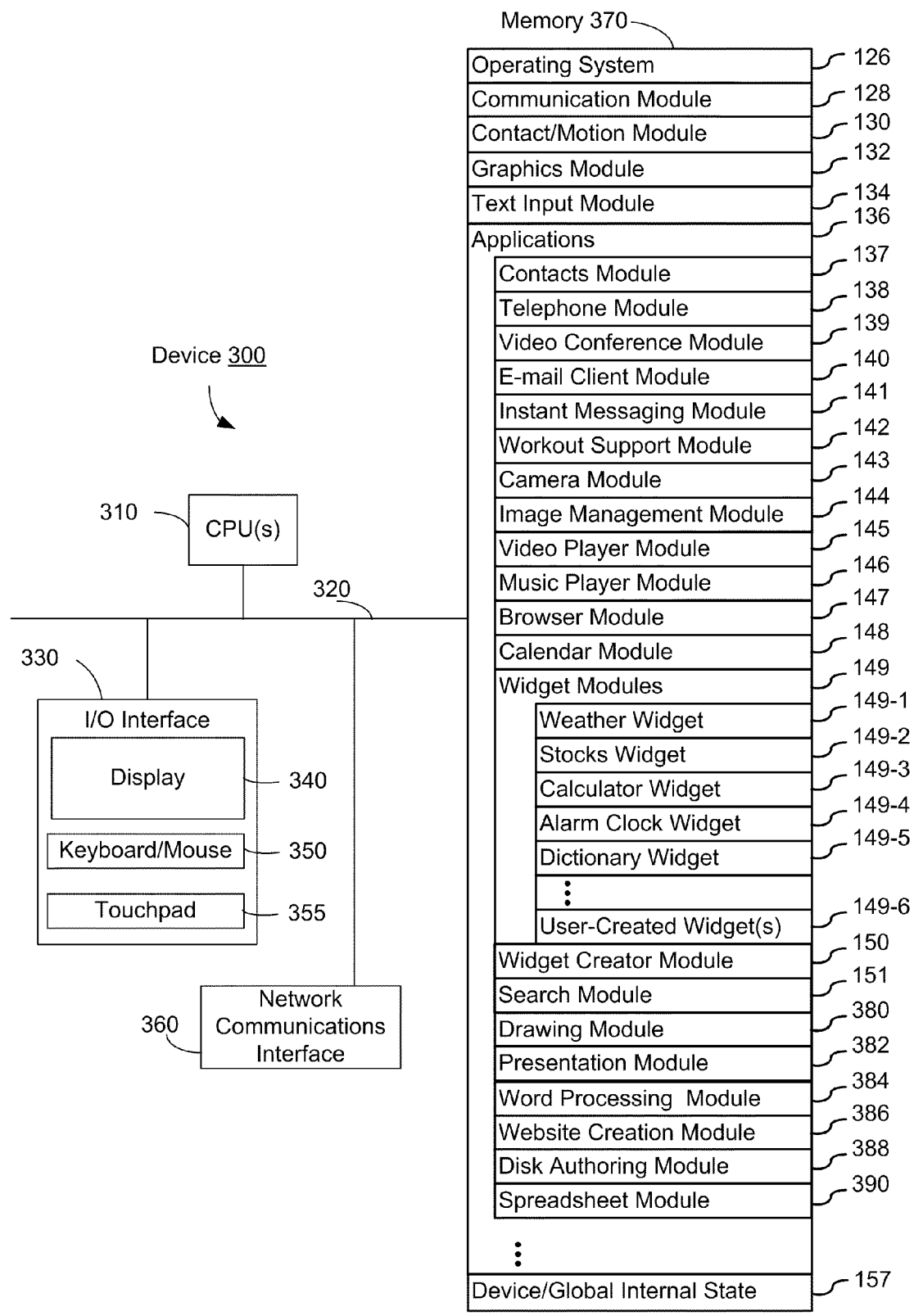
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
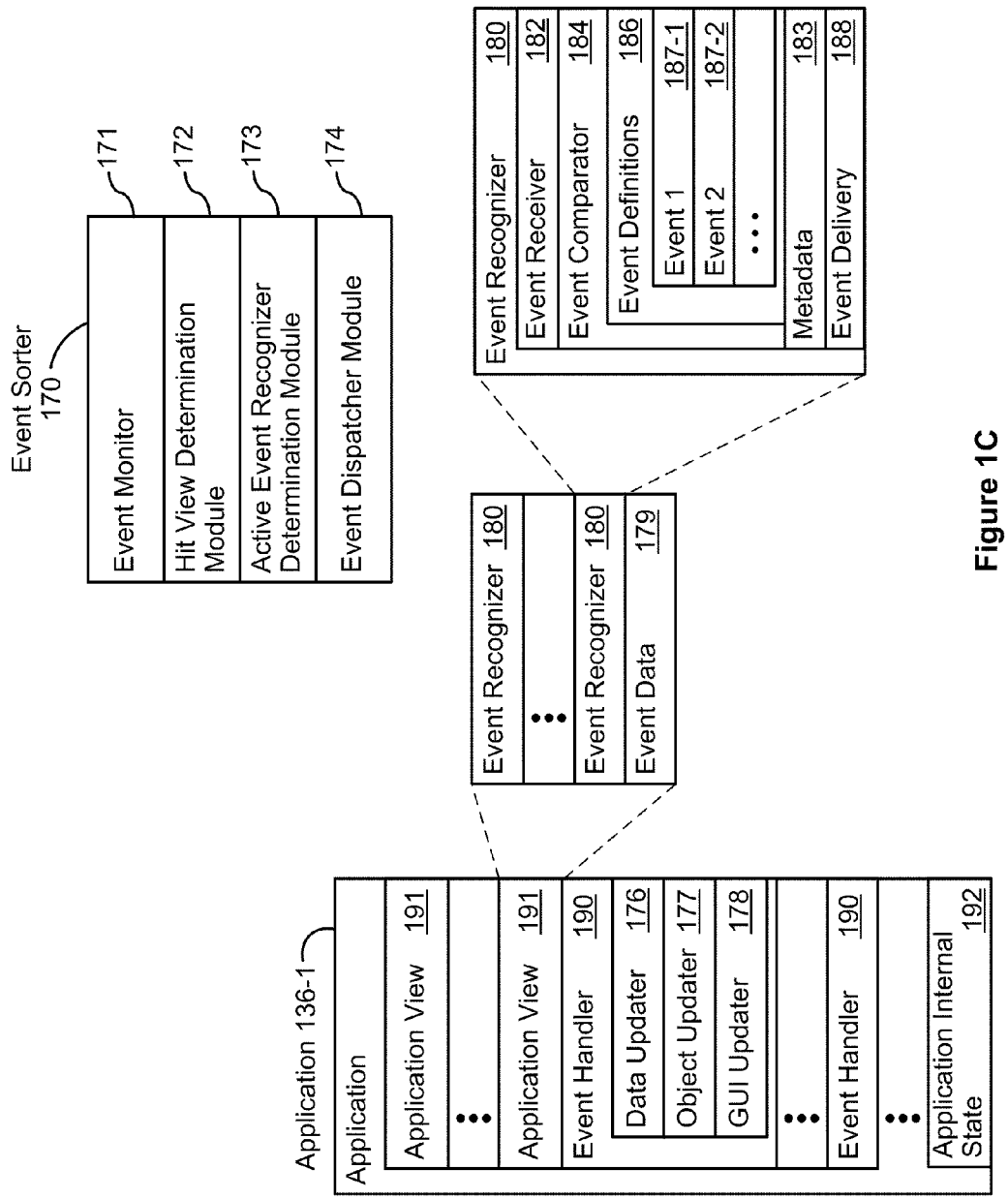
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
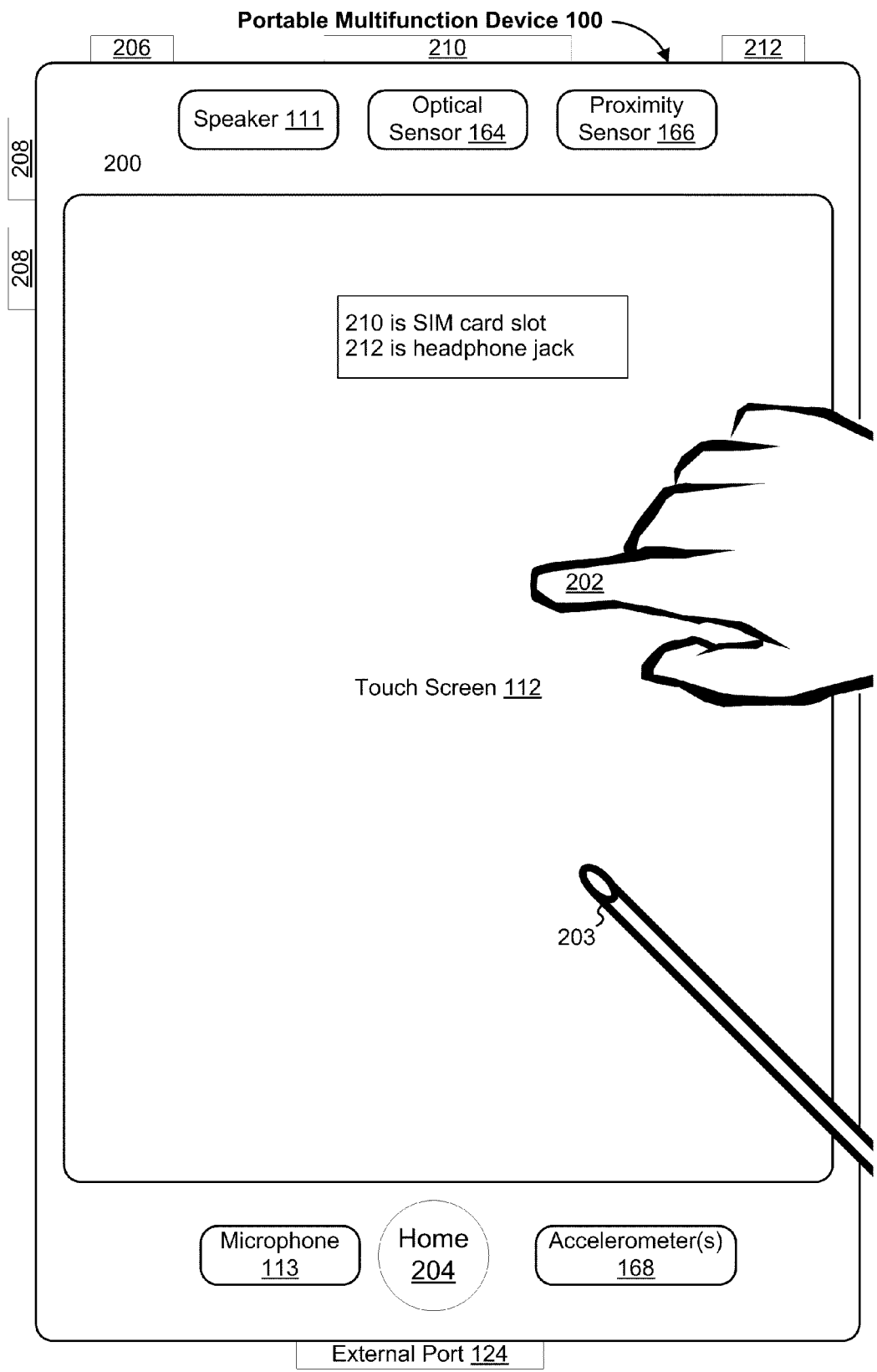
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
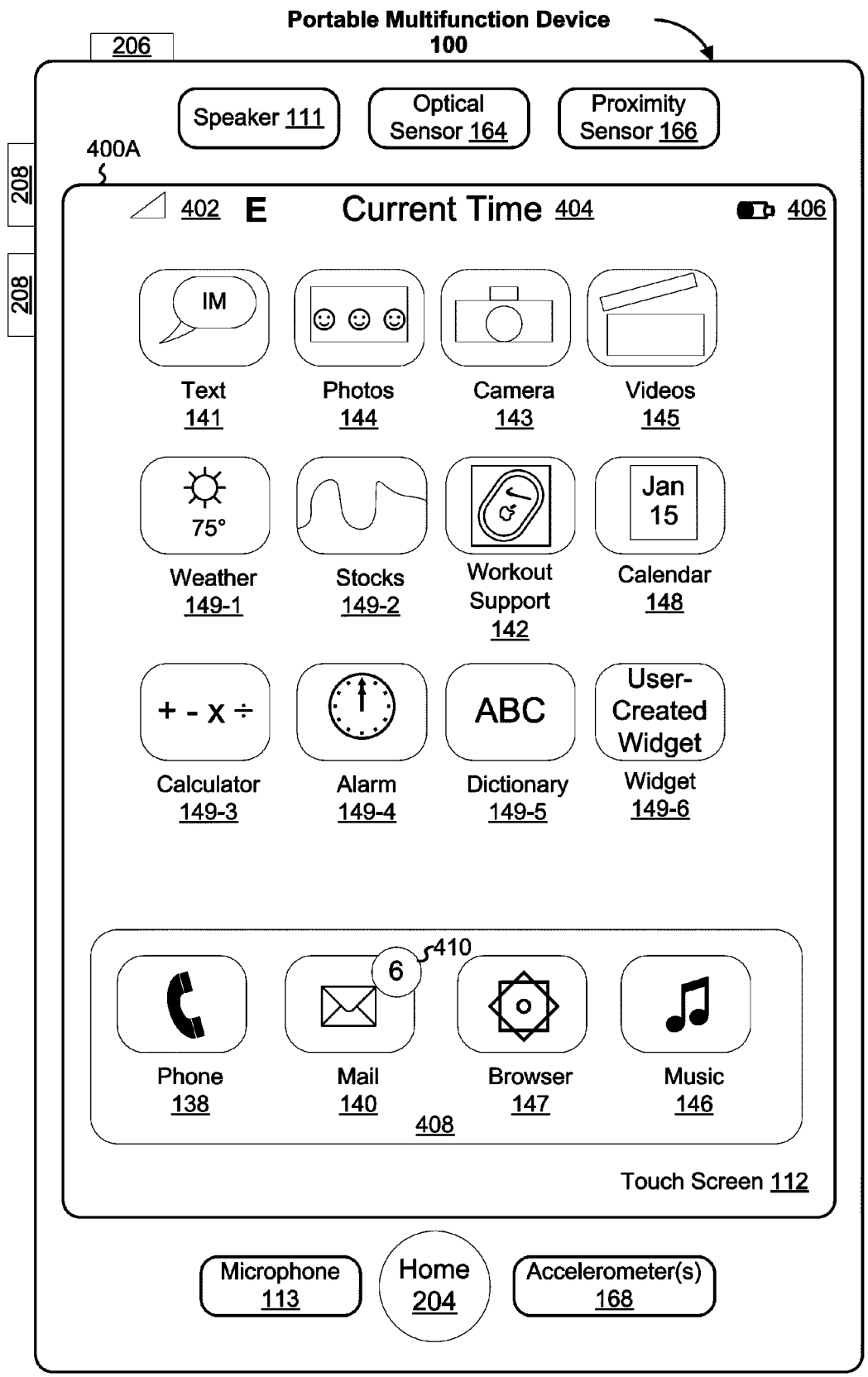
FIGS. 4A and 4B illustrate exemplary user interfaces for a menu of applications on a portable multifunction device in accordance with some embodiments.
Figure 4B:
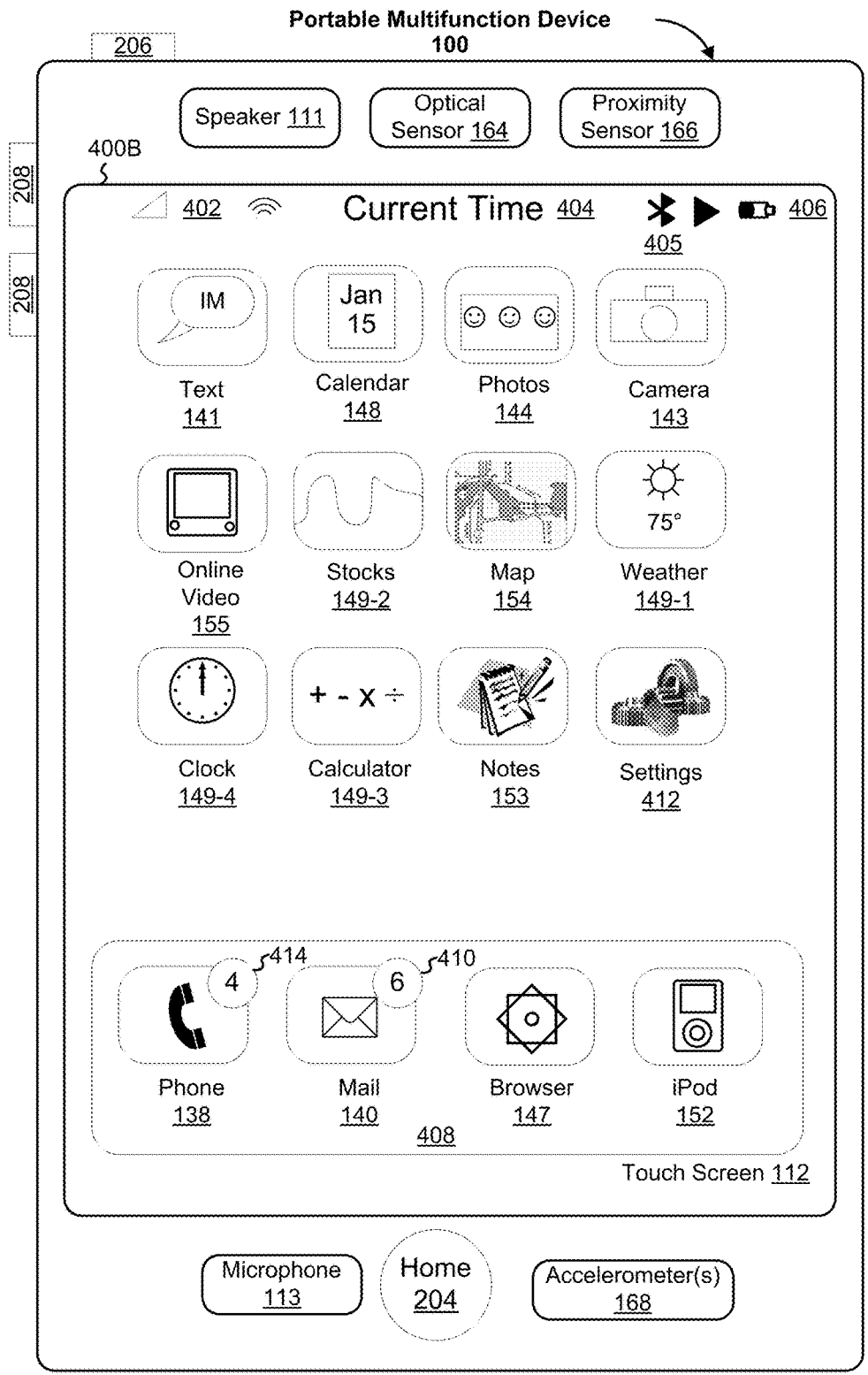

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Phone 138, which may include an indicator 414 of the number of missed calls or voicemail messages;
    E-mail client 140, which may include an indicator 410 of the number of unread e-mails;
    Browser 147; and
    Music player 146; and
Icons for other applications, such as:
    IM 141;
    Image management 144;
    Camera 143;
    Video player 145;
    Weather 149-1;
    Stocks 149-2;
    Workout support 142;
    Calendar 148;
    Calculator 149-3;
    Alarm clock 149-4;
    Dictionary 149-5; and
    User-created widget 149-6.

In some embodiments, user interface 400B includes the following elements, or a subset or superset thereof:
    402, 404, 405, 406, 141, 148, 144, 143, 149-3, 149-2, 149-1, 149-4, 410, 414, 138, 140, and 147, as described above;
    Map 154;
    Notes 153;
    Settings 412, which provides access to settings for device 100 and its various applications 136, as described further below;
    Video and music player module 152, also referred to as iPod (trademark of Apple Inc.) module 152; and
    Online video module 155, also referred to as YouTube (trademark of Google Inc.) module 155.

Figure 4C:
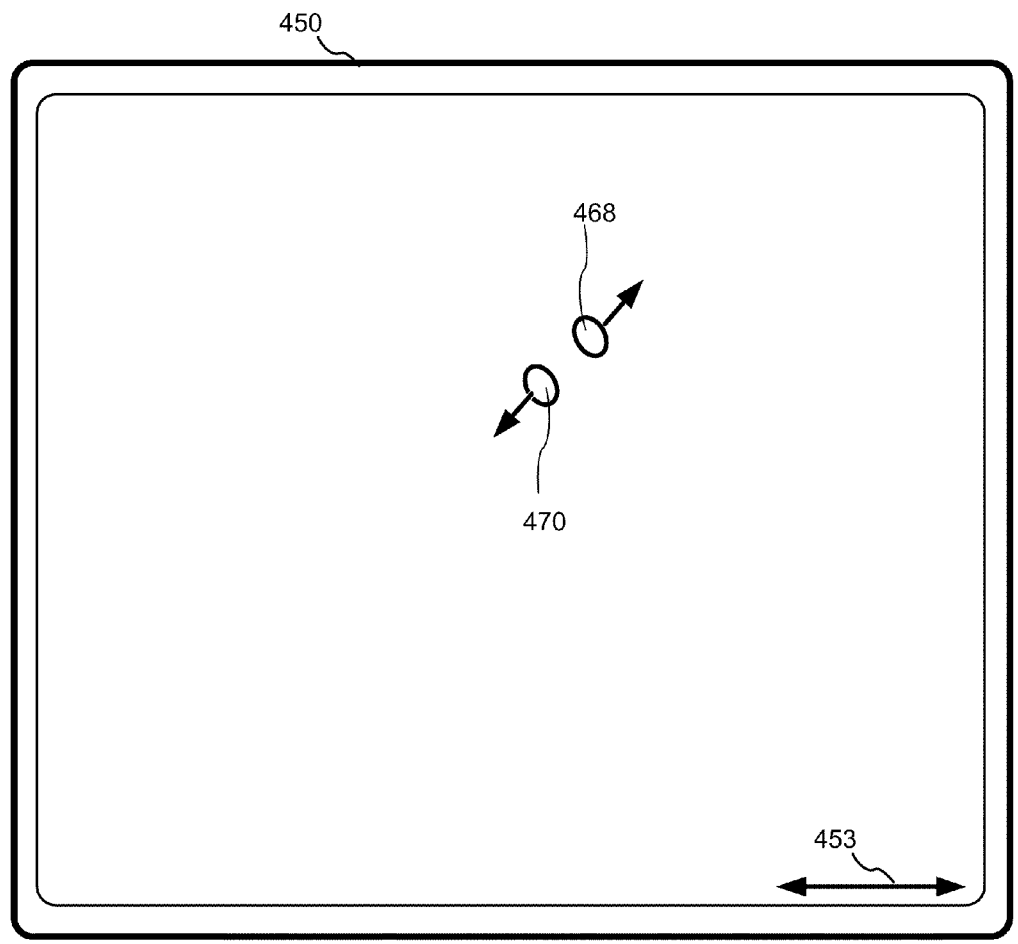
FIG. 4C illustrates an exemplary user interface for a multifunction device with a touch-sensitive surface that is separate from the display in accordance with some embodiments.
Figure 4C:
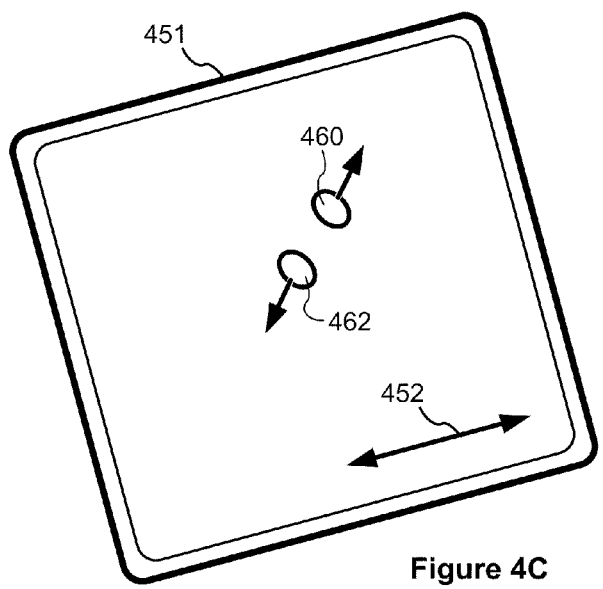

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5LL illustrate exemplary user interfaces for displaying and navigating through content in accordance with some embodiments. The user interfaces in these figures are used to illustrate the processes described below, including the processes in FIGS. 6A-6G, 7, 8A-8D and 9A-9D.

Figure 5A:
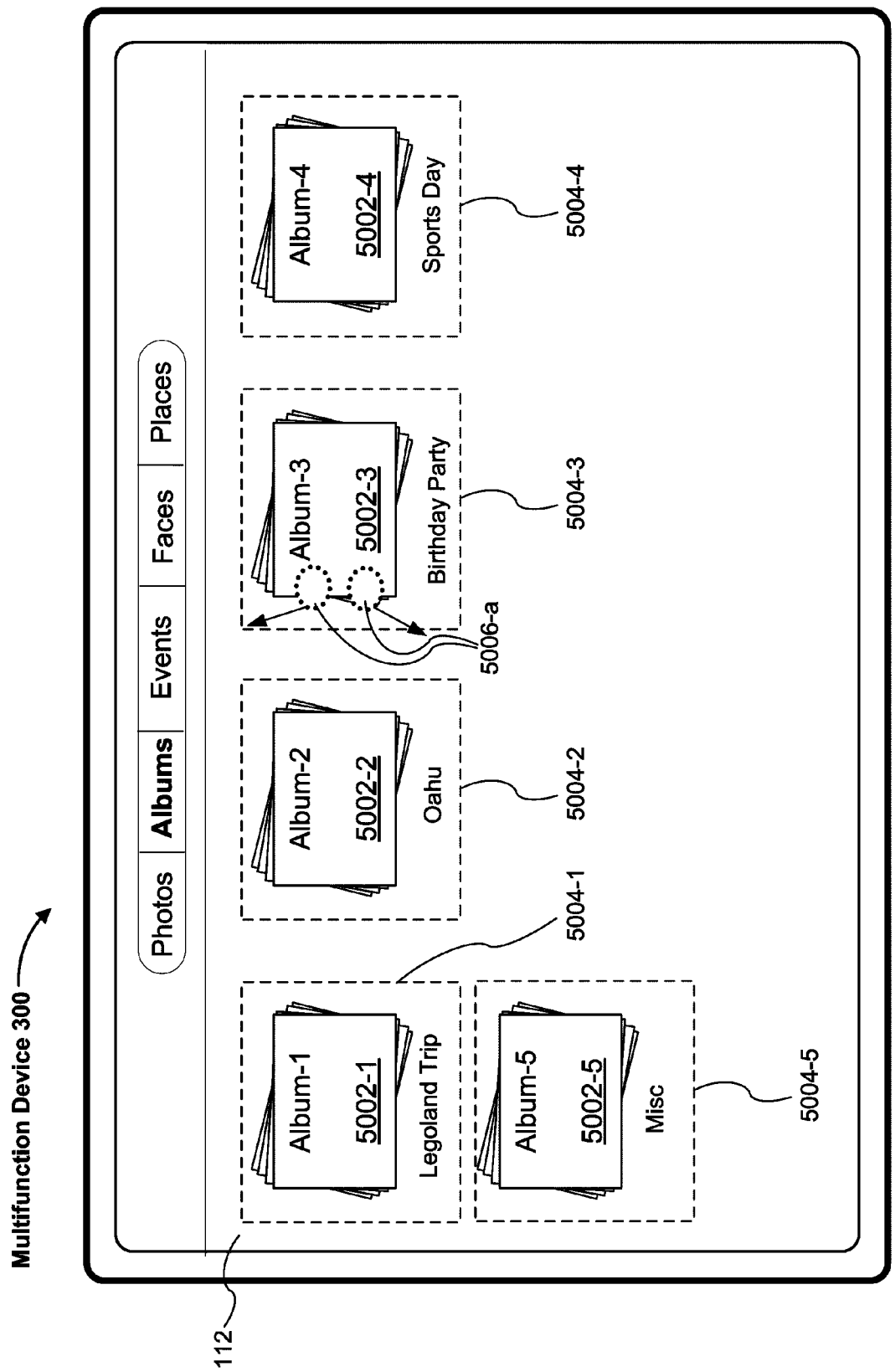
FIGS. 5A-5LL illustrate exemplary user interfaces for displaying and navigating through content in accordance with some embodiments.
Figure 5B:
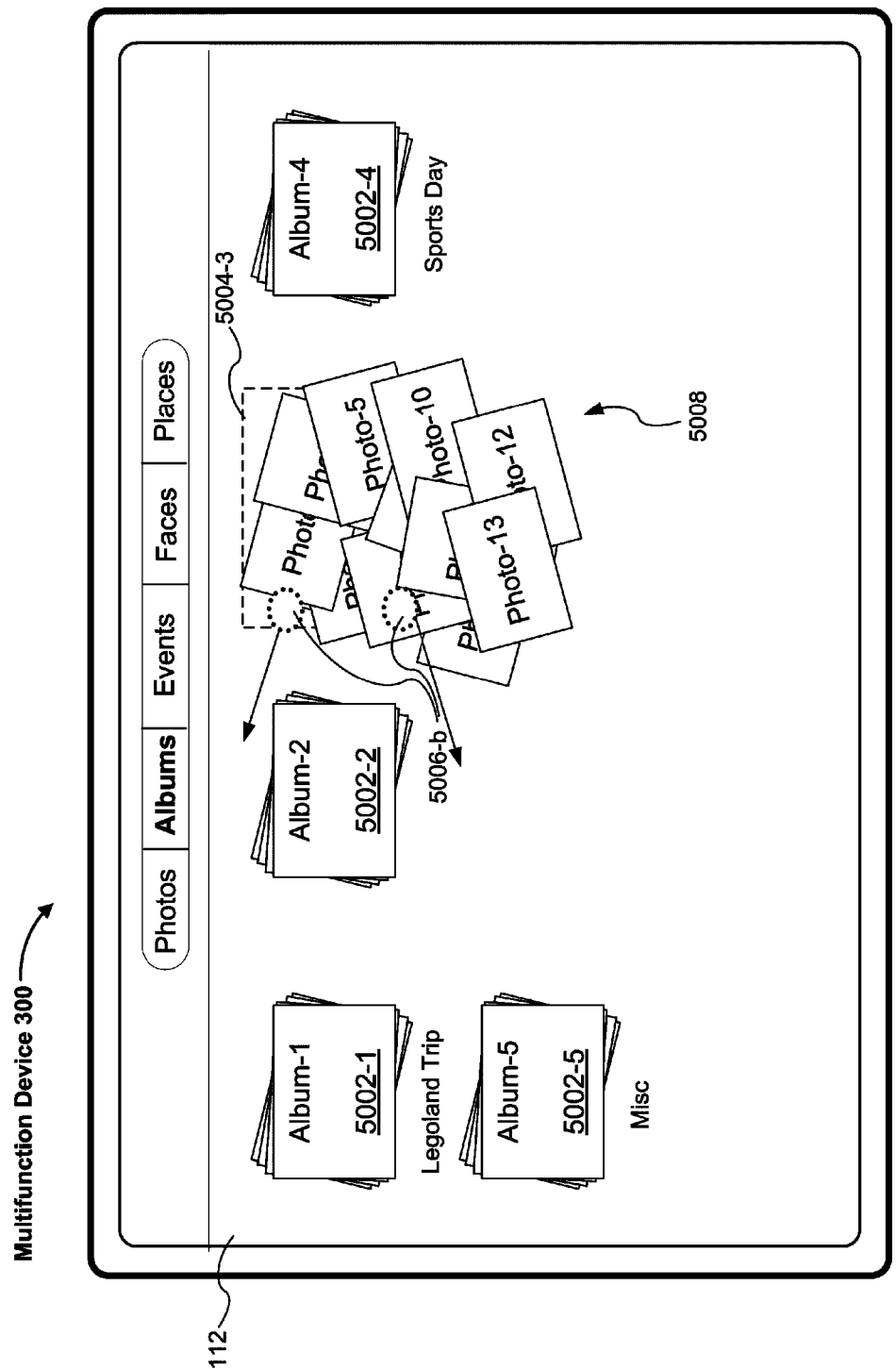
Figure 5C:
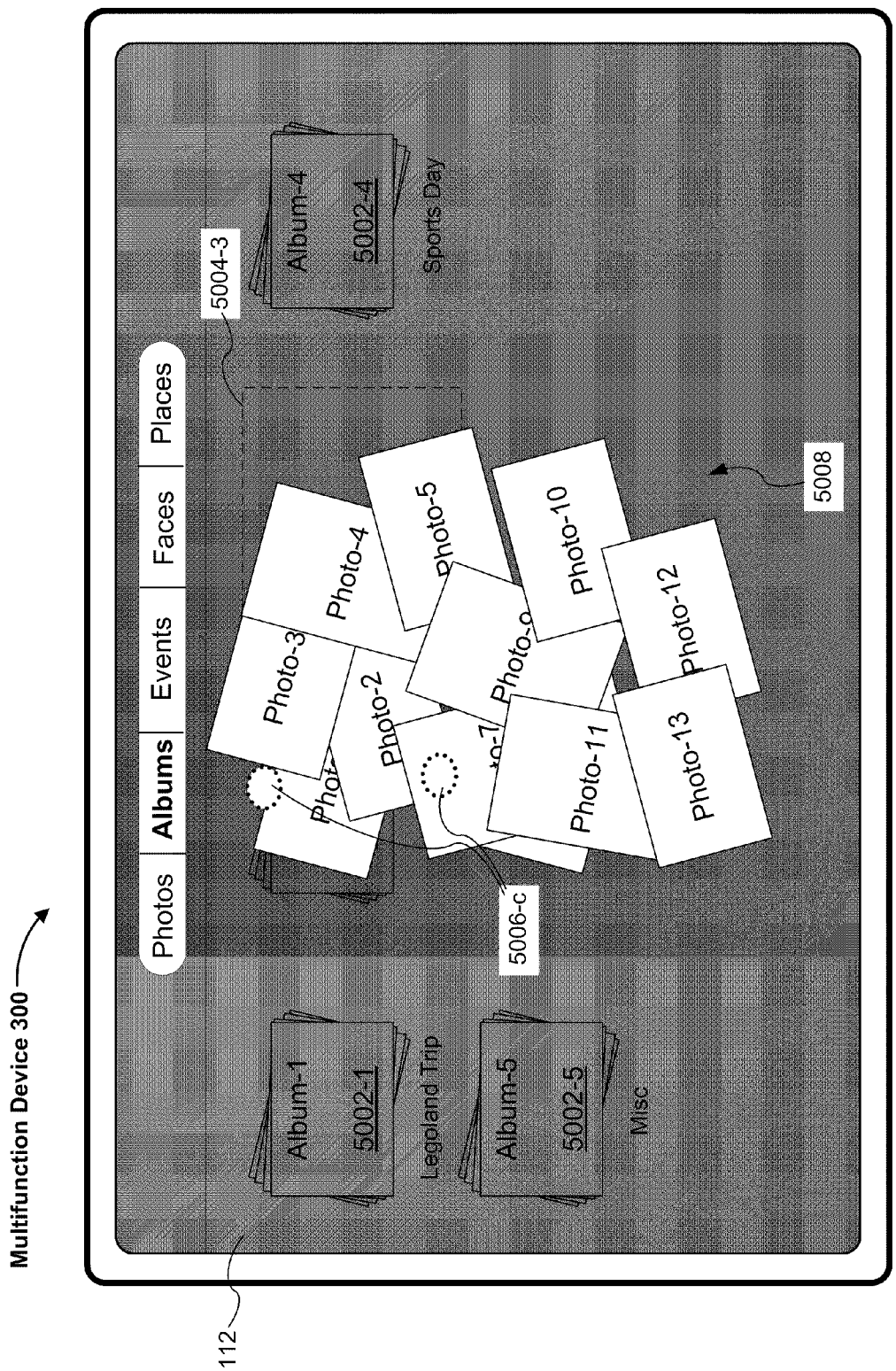

FIGS. 5A-5C illustrate exemplary user interfaces for detecting a multi-contact gesture (e.g., movement of contacts 5006 from a first position 5006-a in FIG. 5A, to a second position 5006-b in FIG. 5B and a third position 5006-c in FIG. 5C) that starts in a region 5004-3 that includes an album thumbnail 5002-3 that is associated with content (e.g., a plurality of photos). In response to detecting the multi-contact gesture, the device displays representations (e.g., content thumbnails 5008 in FIGS. 5B-5C) of the content associated with the album thumbnail 5002-3. In response to detecting the multi-contact gesture, the device enlarges the representations 5008 of the content.

FIGS. 5B and 5A illustrate exemplary user interfaces for ceasing to display the representations 5008 of the content in response to detecting an end of the multi-contact gesture (e.g., liftoff of contacts 5006-b in FIG. 5B) when a resizing metric is below a predefined value. For example in FIG. 5A, the device ceases to display the representations 5008 of the content and redisplays the album thumbnail 5002-3.

Figure 5D:
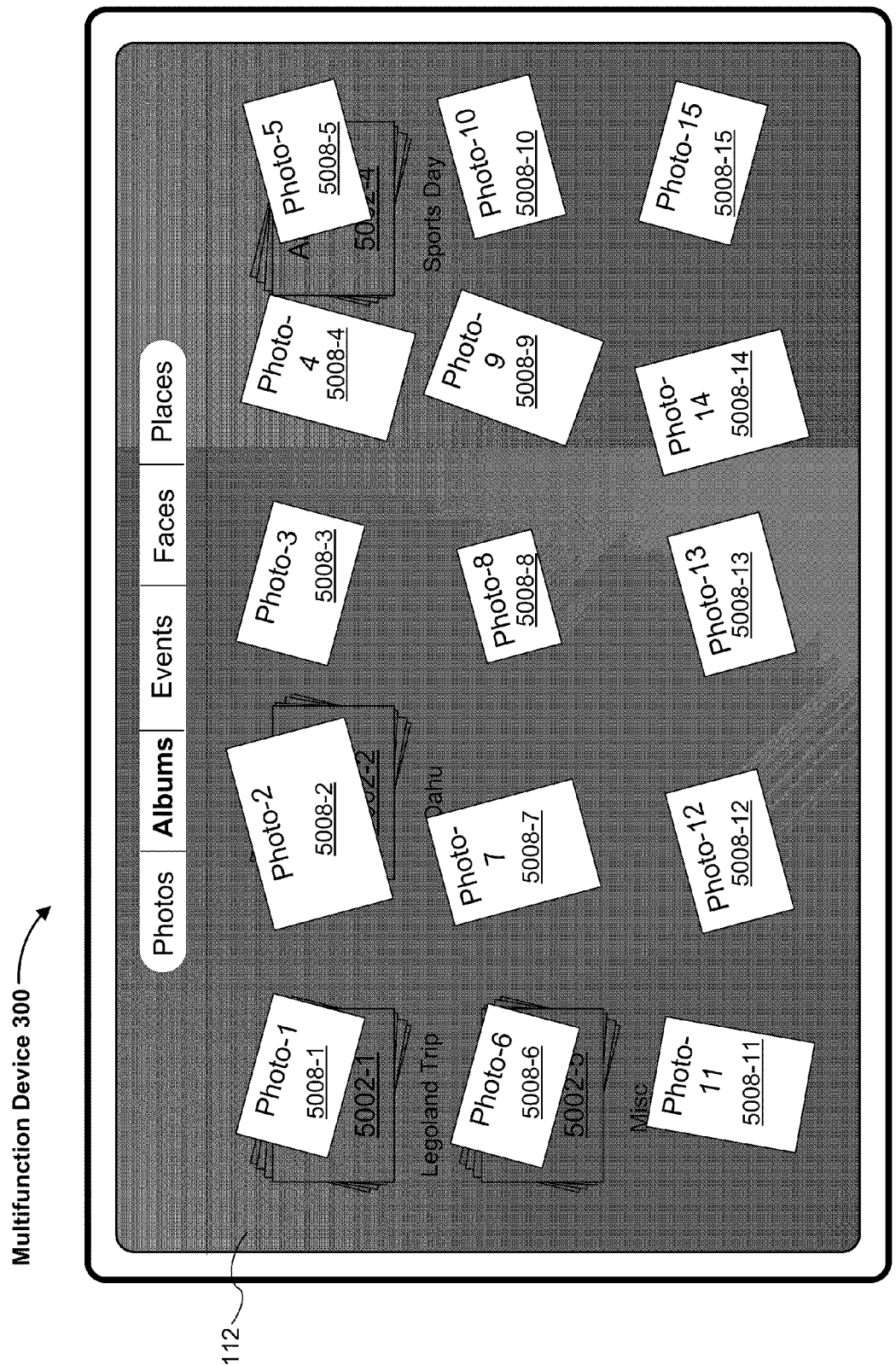
Figure 5E:
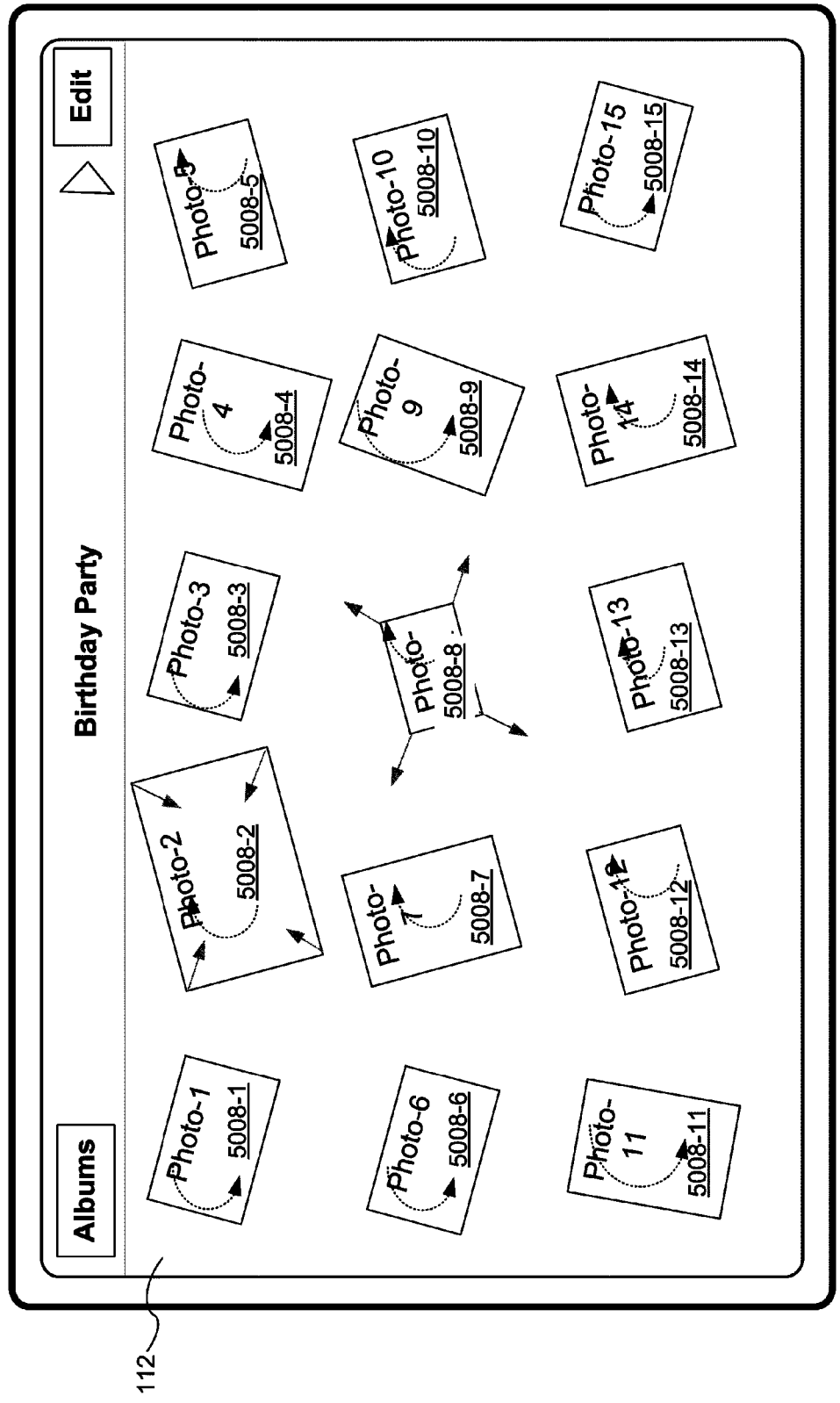
Figure 5F:
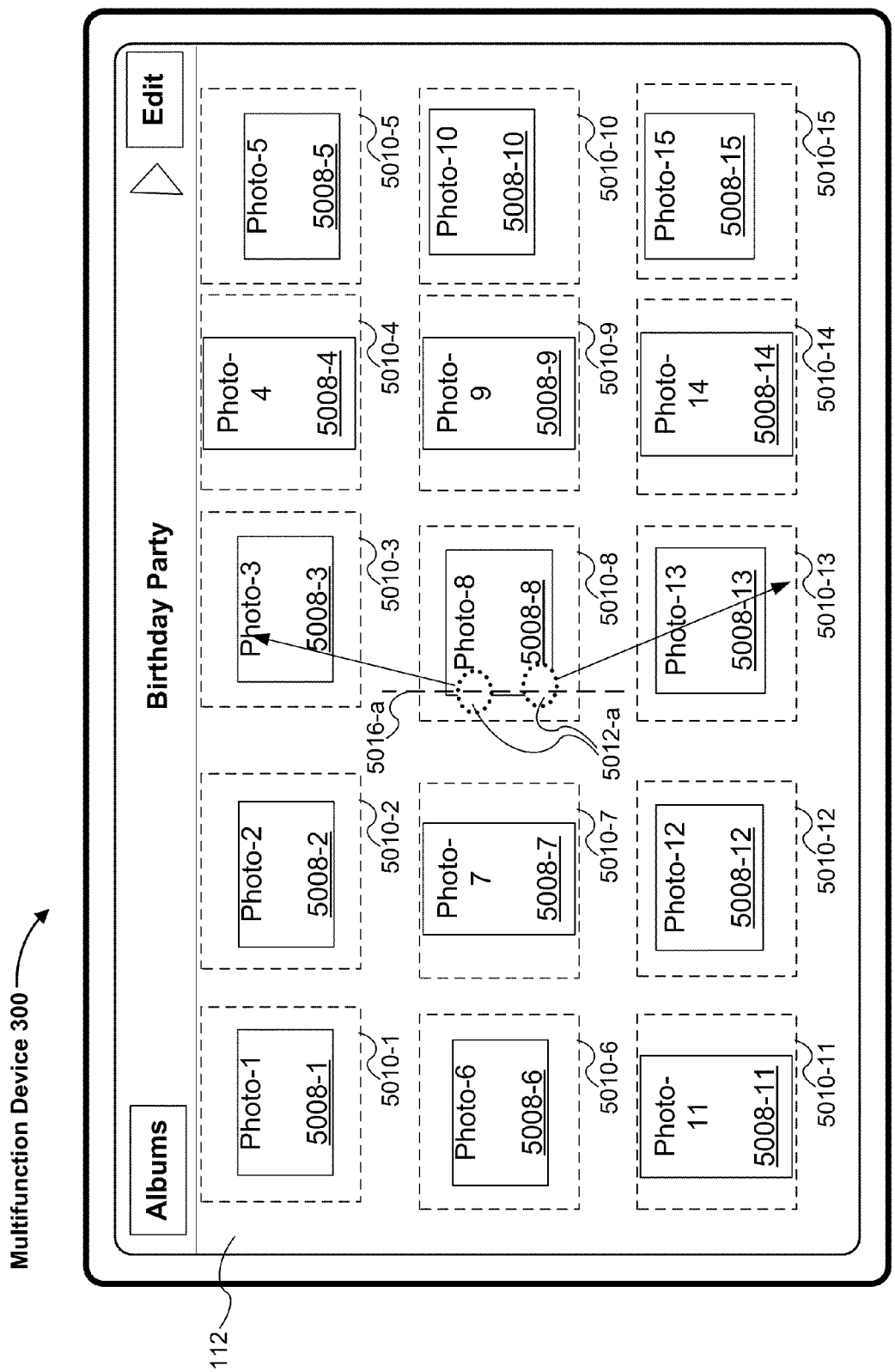

FIGS. 5C-5F illustrate exemplary user interfaces for displaying the representations 5008 of the content in a predefined arrangement (e.g., 5008 in FIG. 5F) in response to detecting an end of the multi-contact gesture (e.g., liftoff of contacts 5006-c in FIG. 5C) when a resizing metric is above a predefined value. FIG. 5D illustrates moving the representations 5008 of the content to respective average positions. FIG. 5E illustrates rotating and resizing each representation of the content about its respective average position so as to display a multi-row array of representations of the content (e.g., the representation of Photo-2 is reduced in size and rotated clockwise). In FIG. 5F, the representations 5008 of the content are displayed in the predefined arrangement.

Figure 5G:
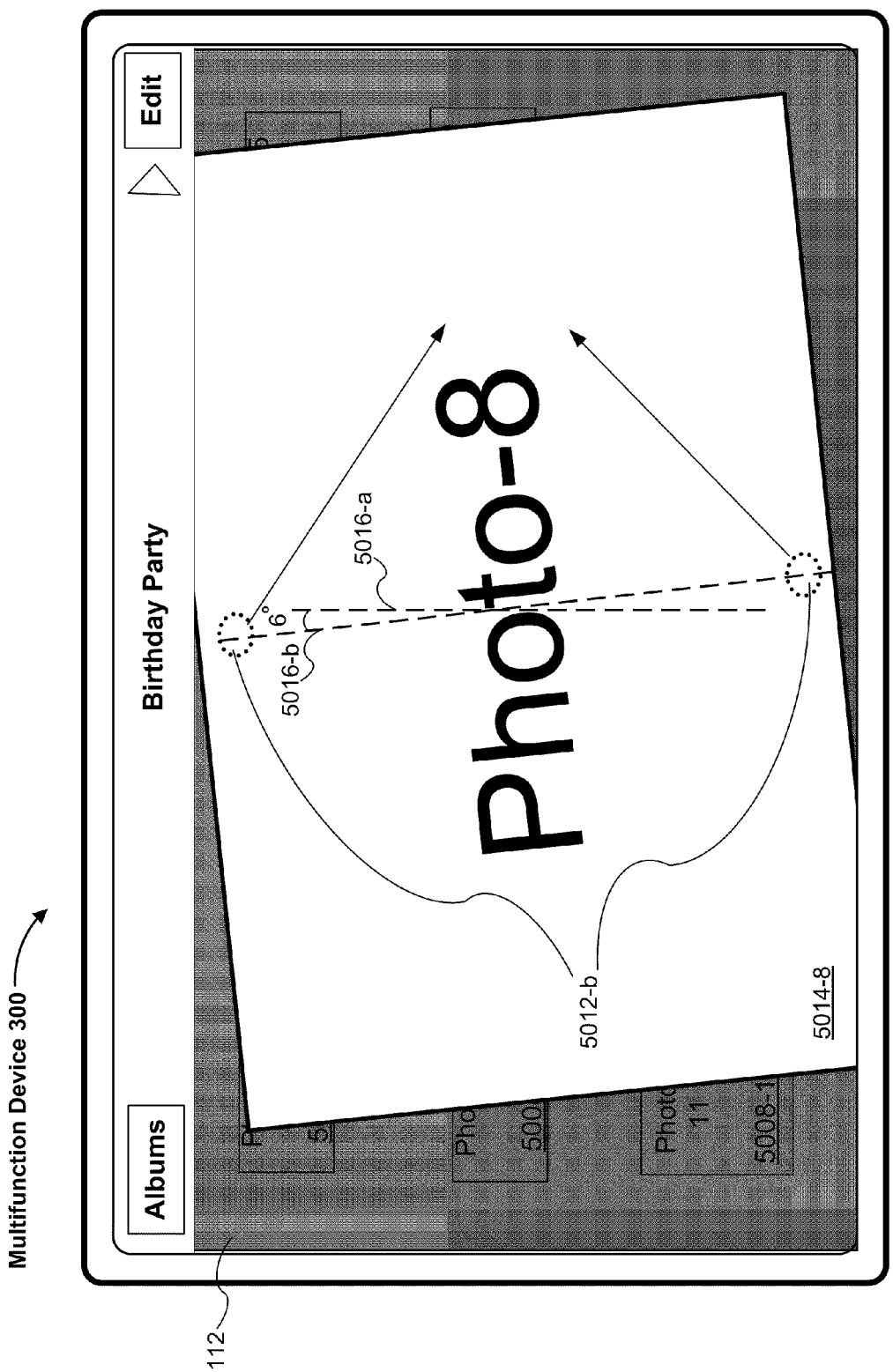
Figure 5H:
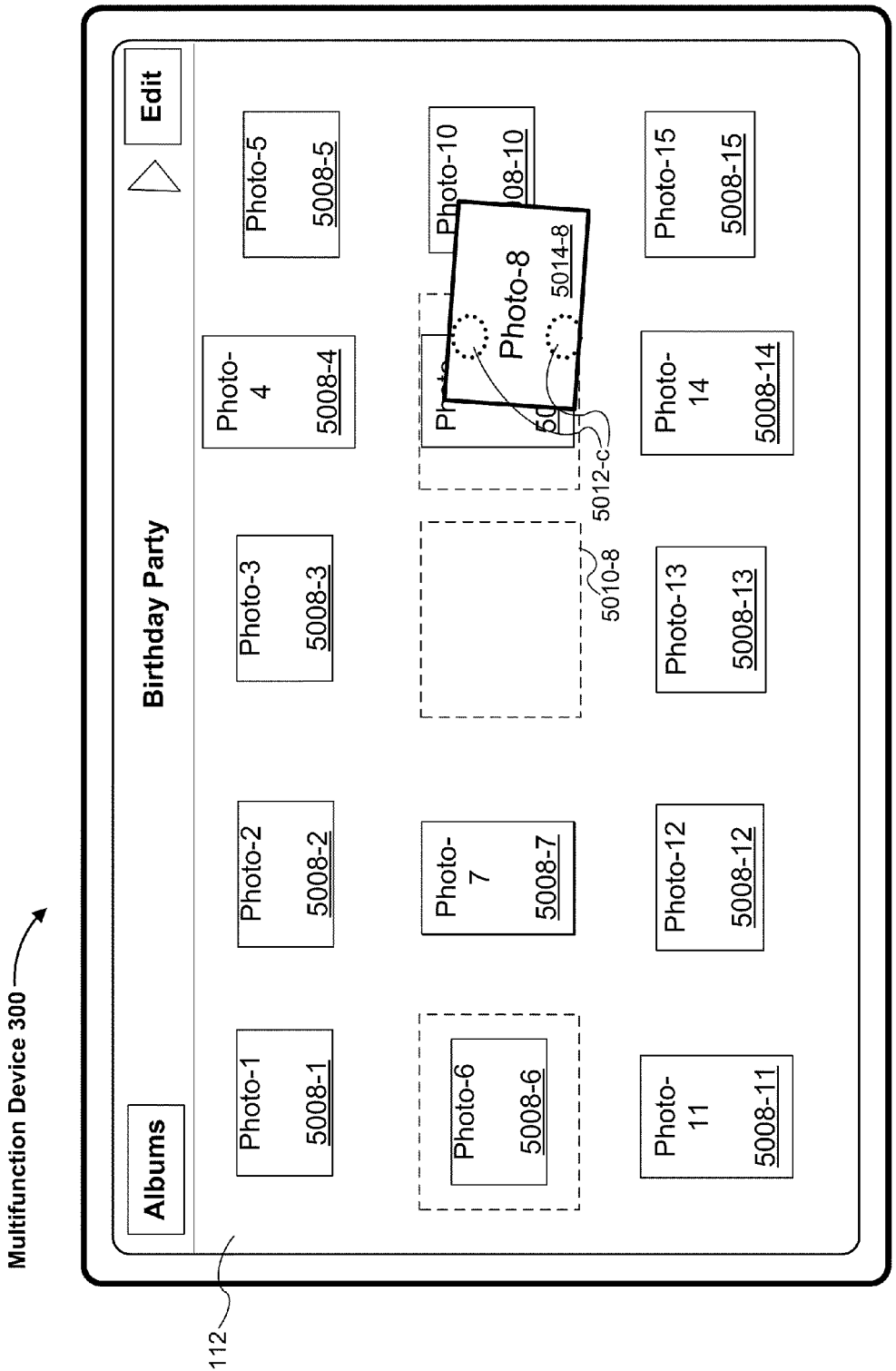

FIGS. 5F-5H illustrate exemplary user interfaces for detecting a multi-contact gesture (e.g., movement of contacts 5012 from a first position 5012-a in FIG. 5F, to a second position 5012-b in FIG. 5G and a third position 5012-c in FIG. 5H) that starts in a region 5010-8 that includes a content thumbnail 5008-8 that is associated with content (e.g., photos 5014-8 in FIGS. 5G-5H). In response to detecting the multi-contact gesture, the device displays content (e.g., 5014-8 in FIGS. 5G-5H) that is associated with the album thumbnail 5002-3. In response to detecting the multi-contact gesture, the device enlarges the content 5014-8.

Figure 5I:
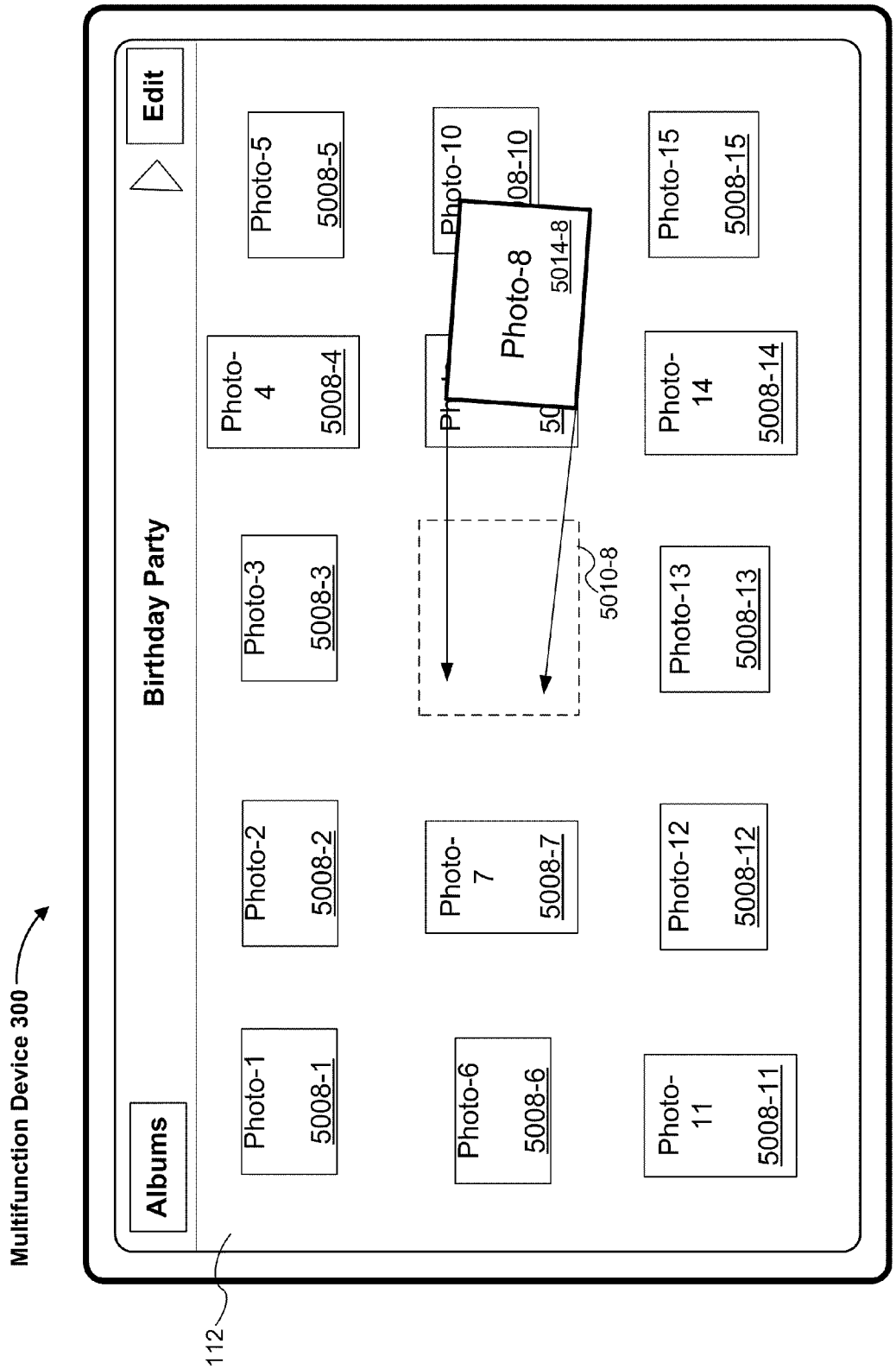
Figure 5J:
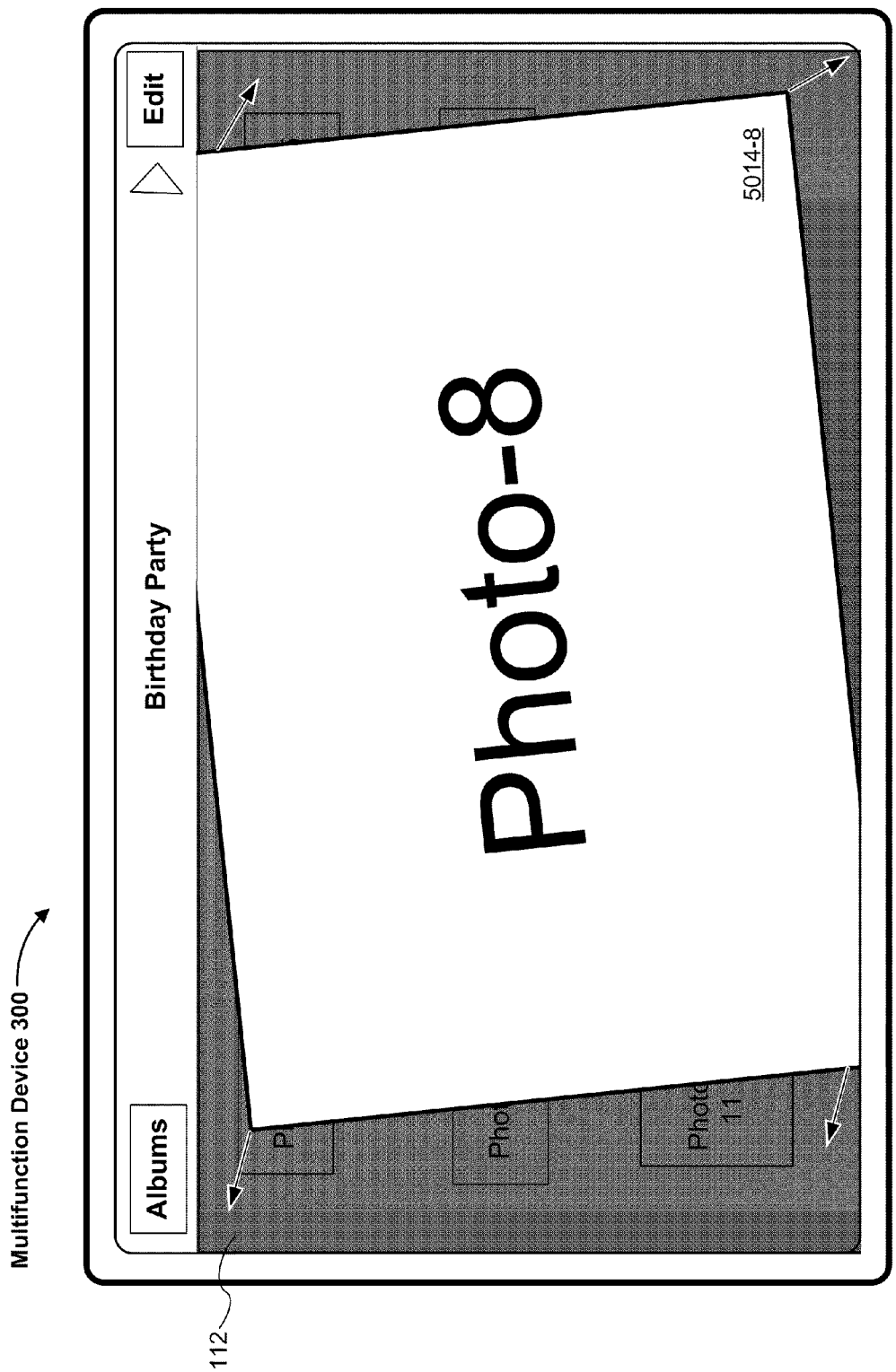
Figure 5M:
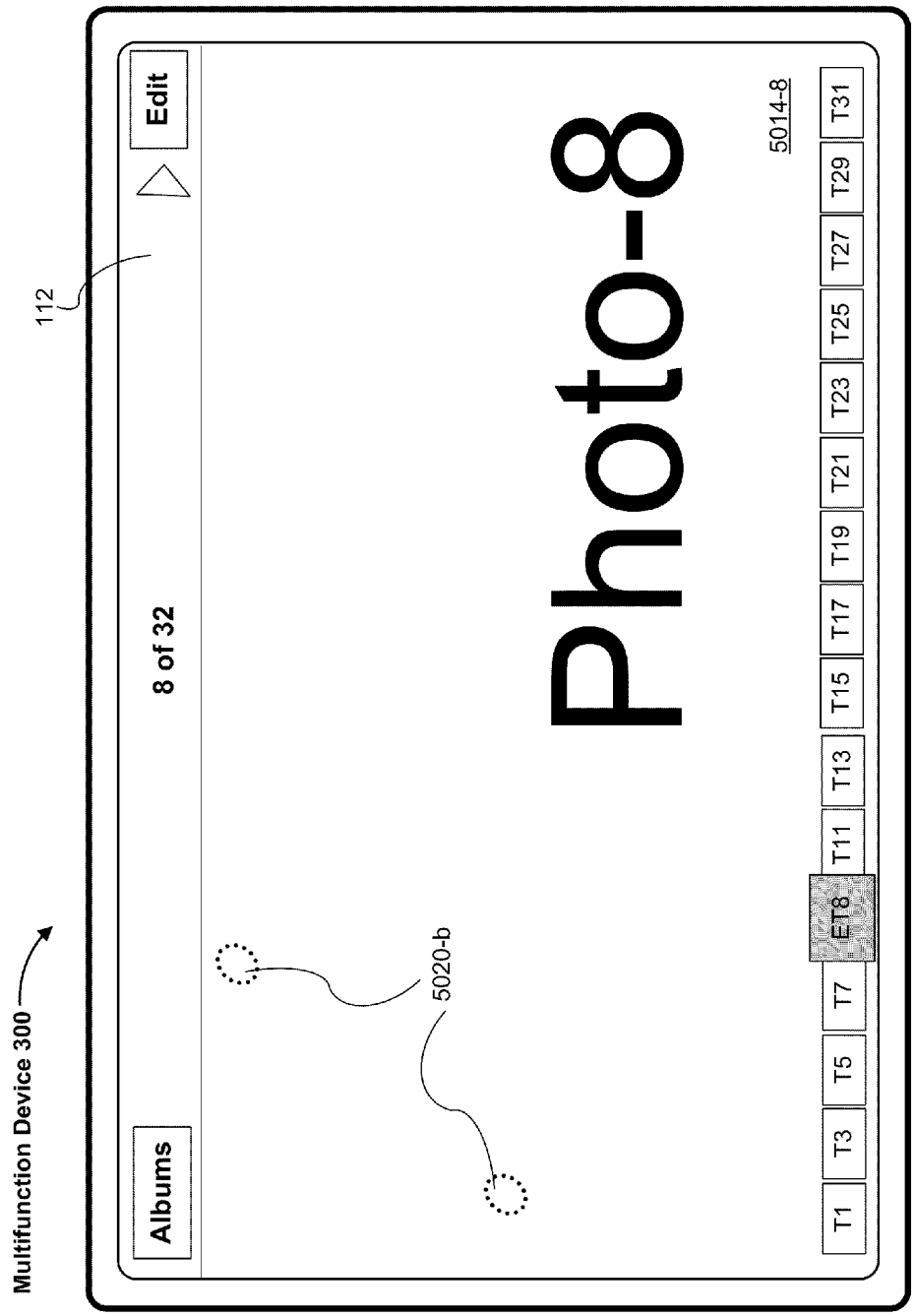
Figure 5P:
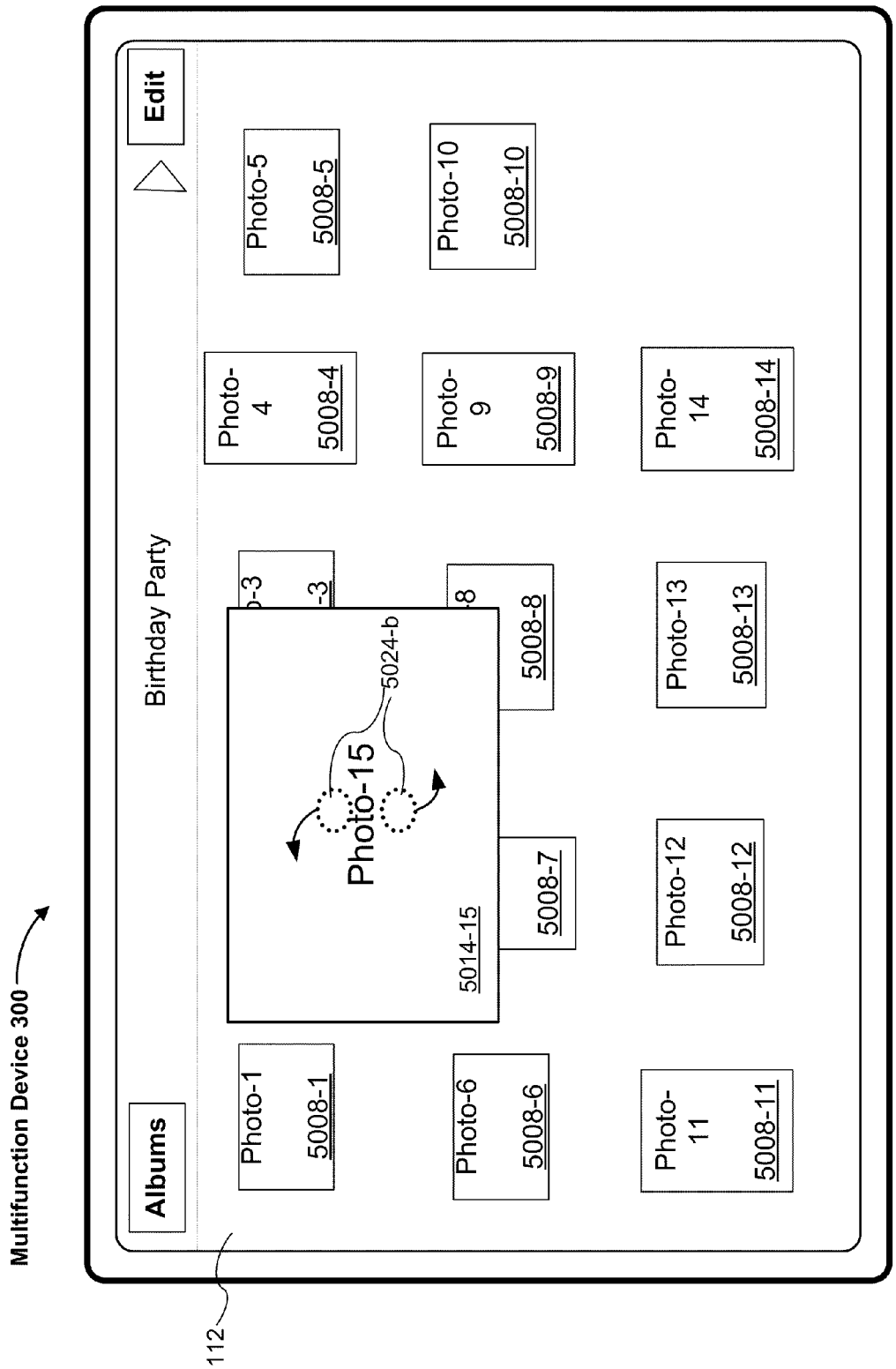
Figure 5Q:
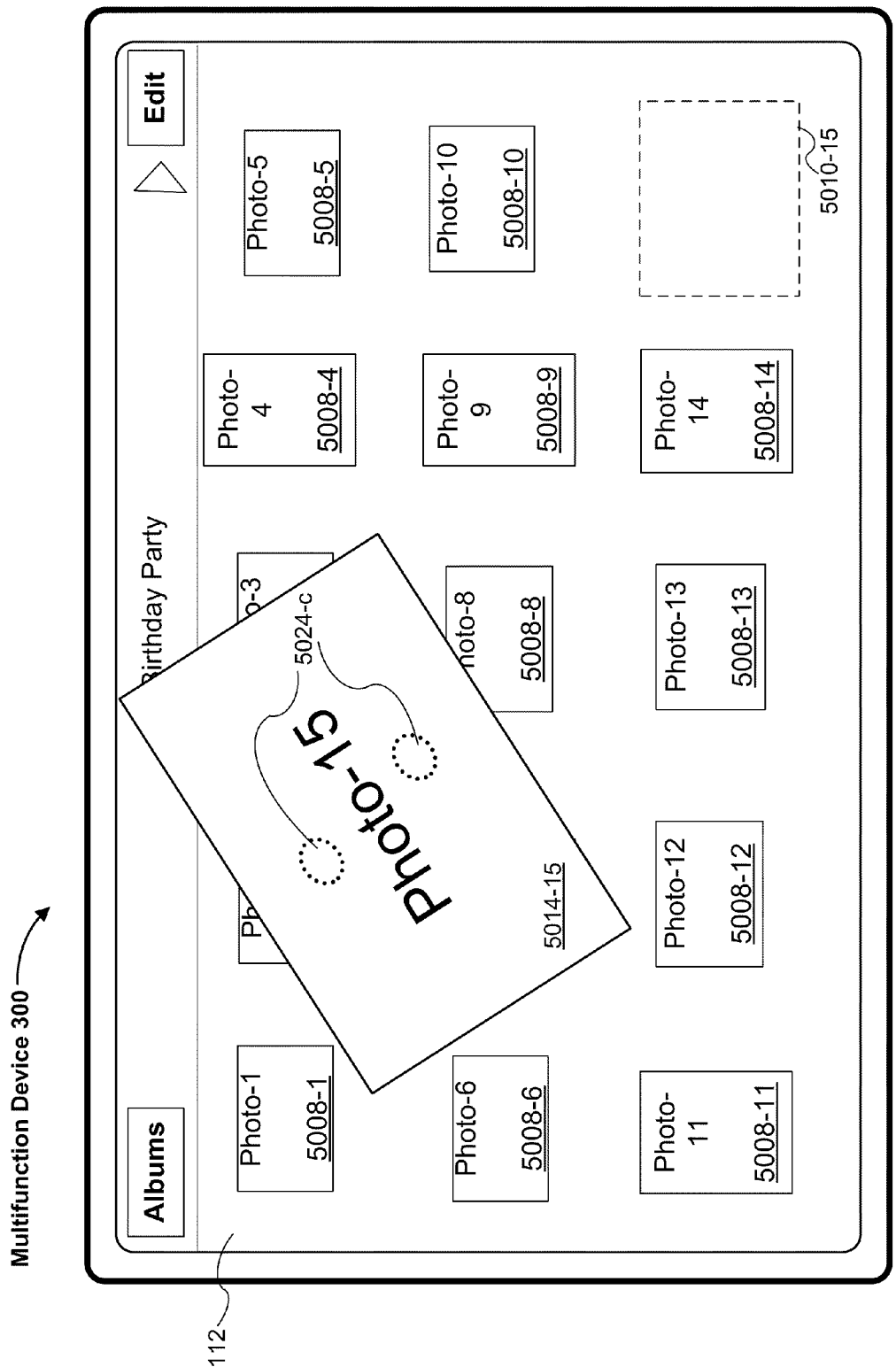
Figure 5R:
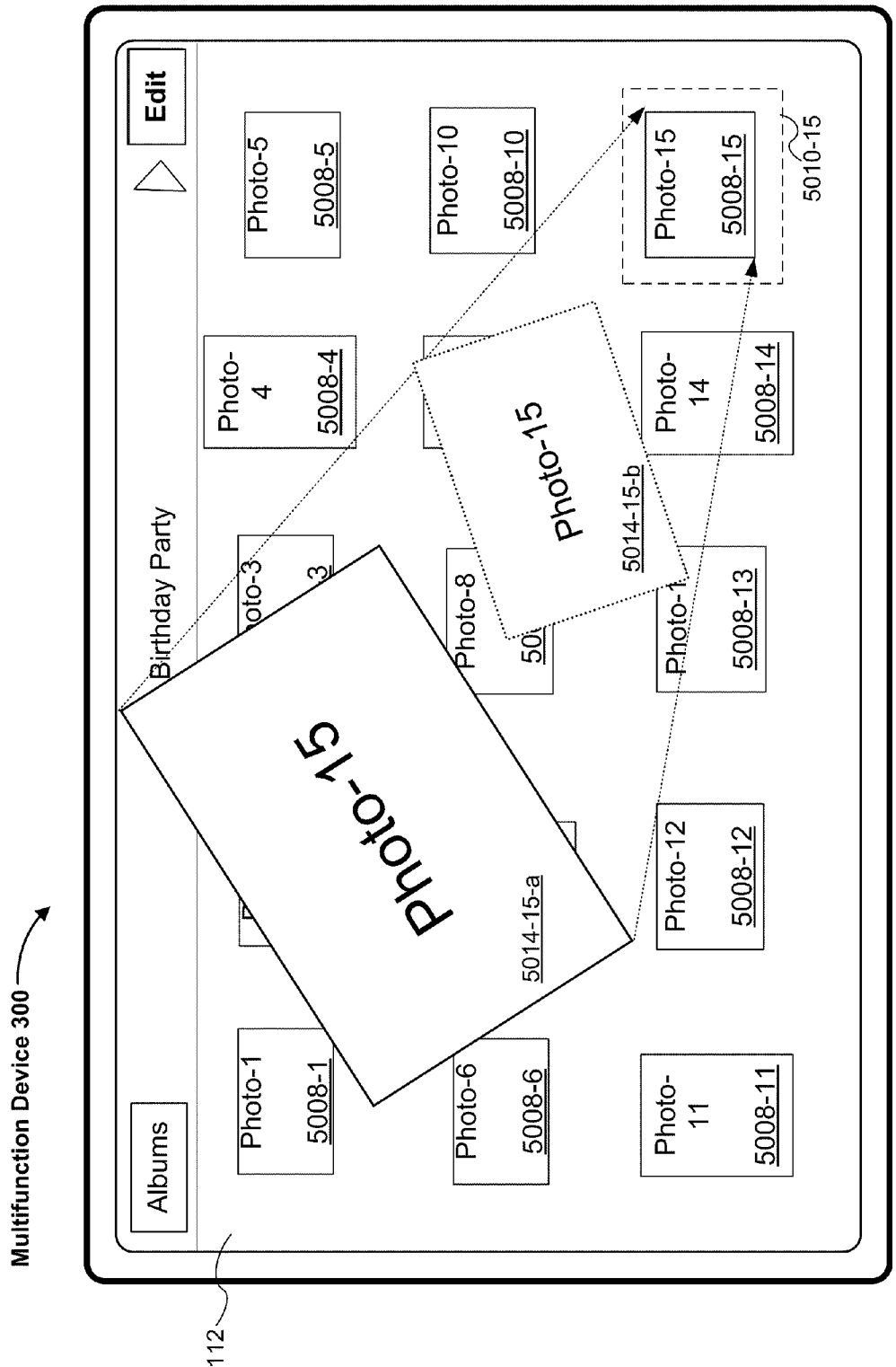
Figure 5S:
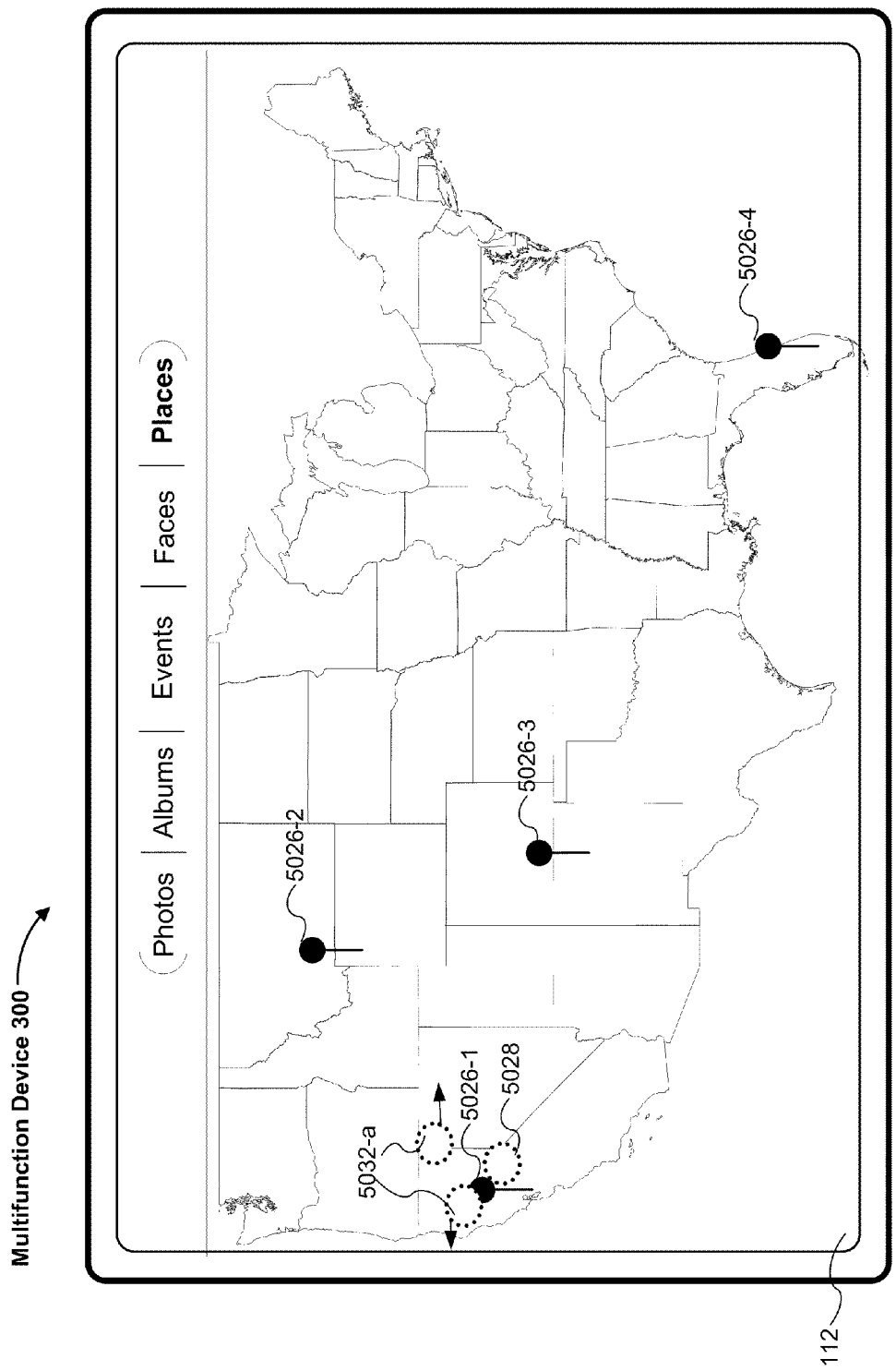
Figure 5T:
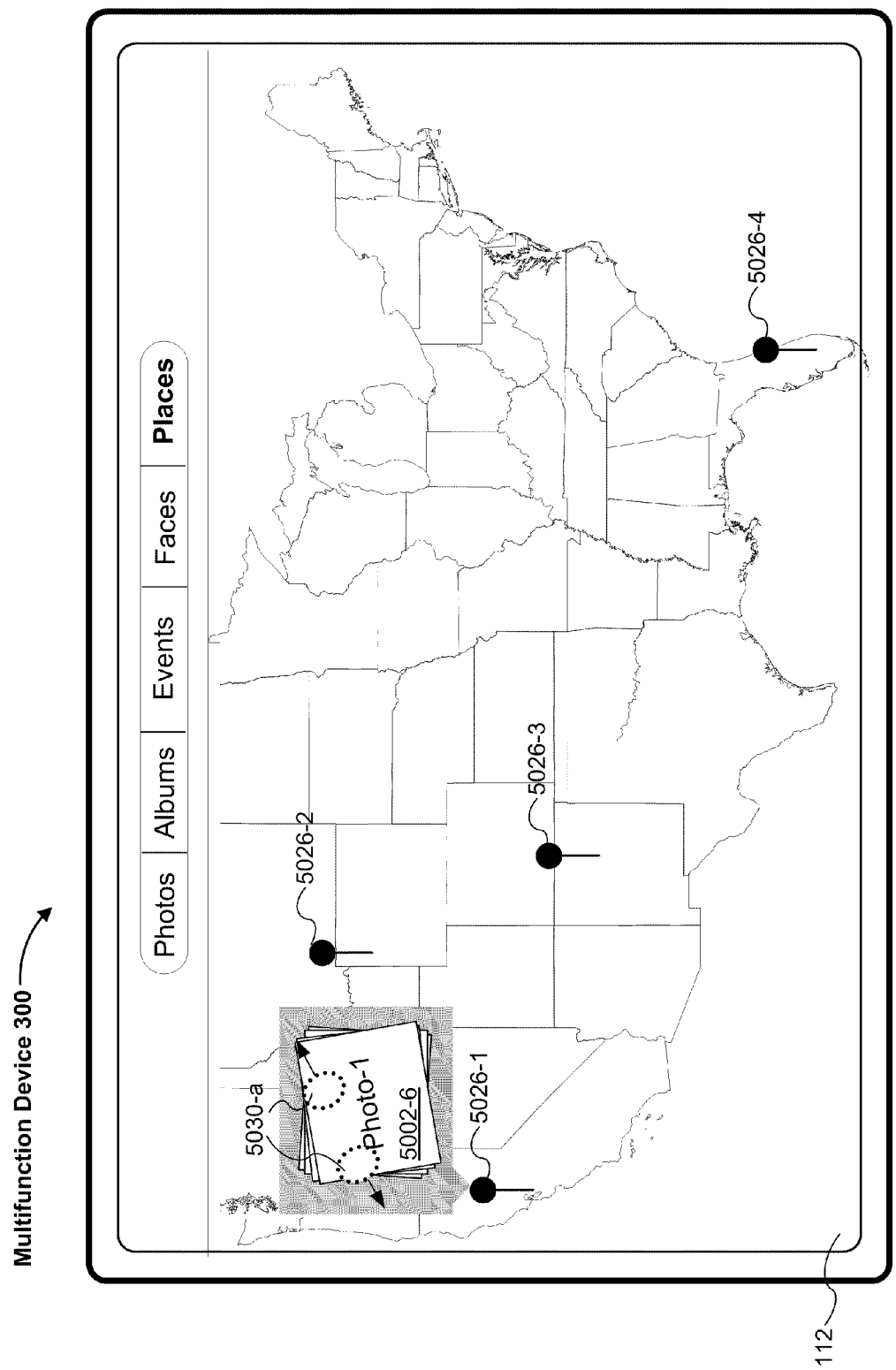
Figure 5U:
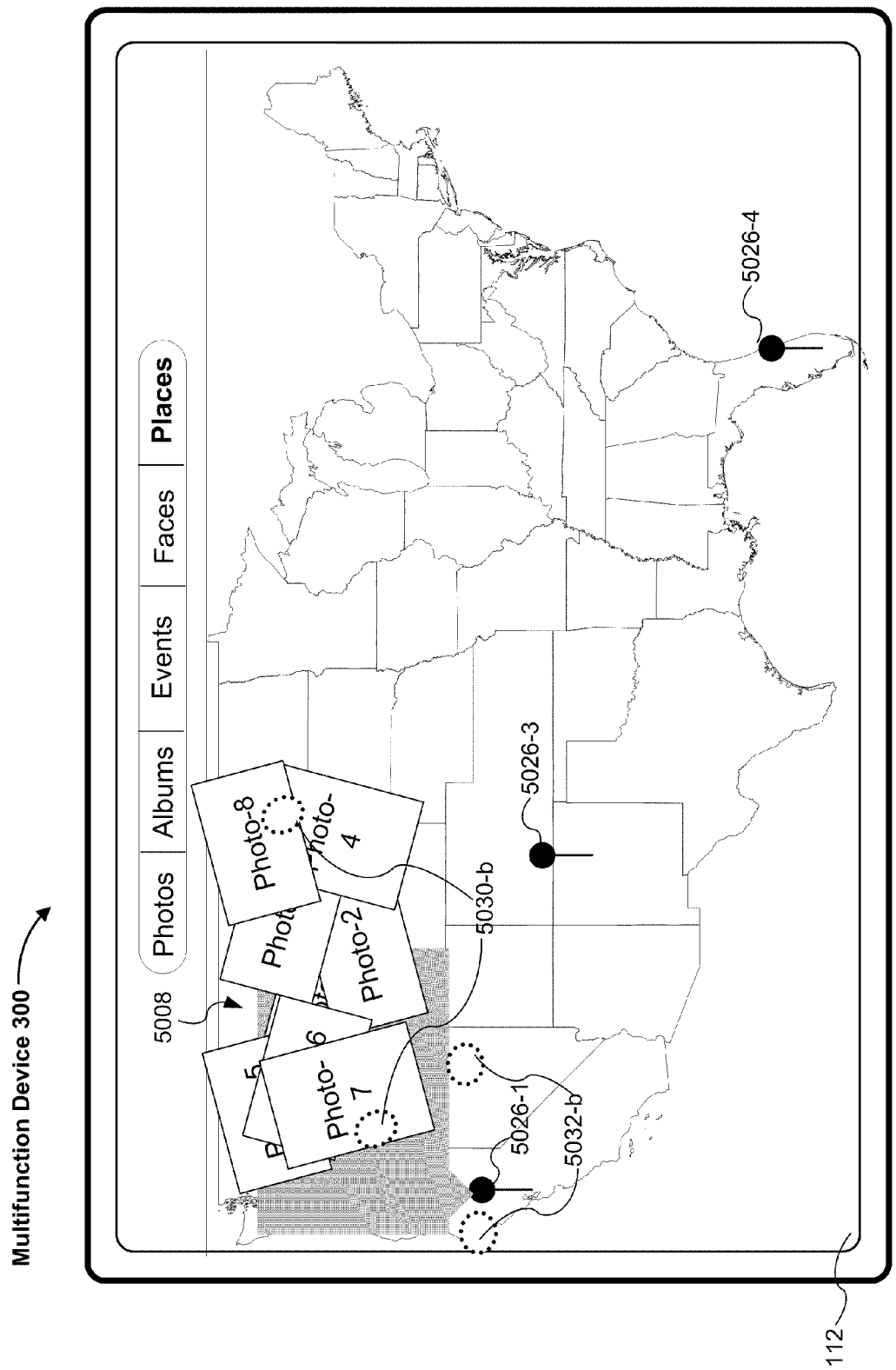
Figure 5V:
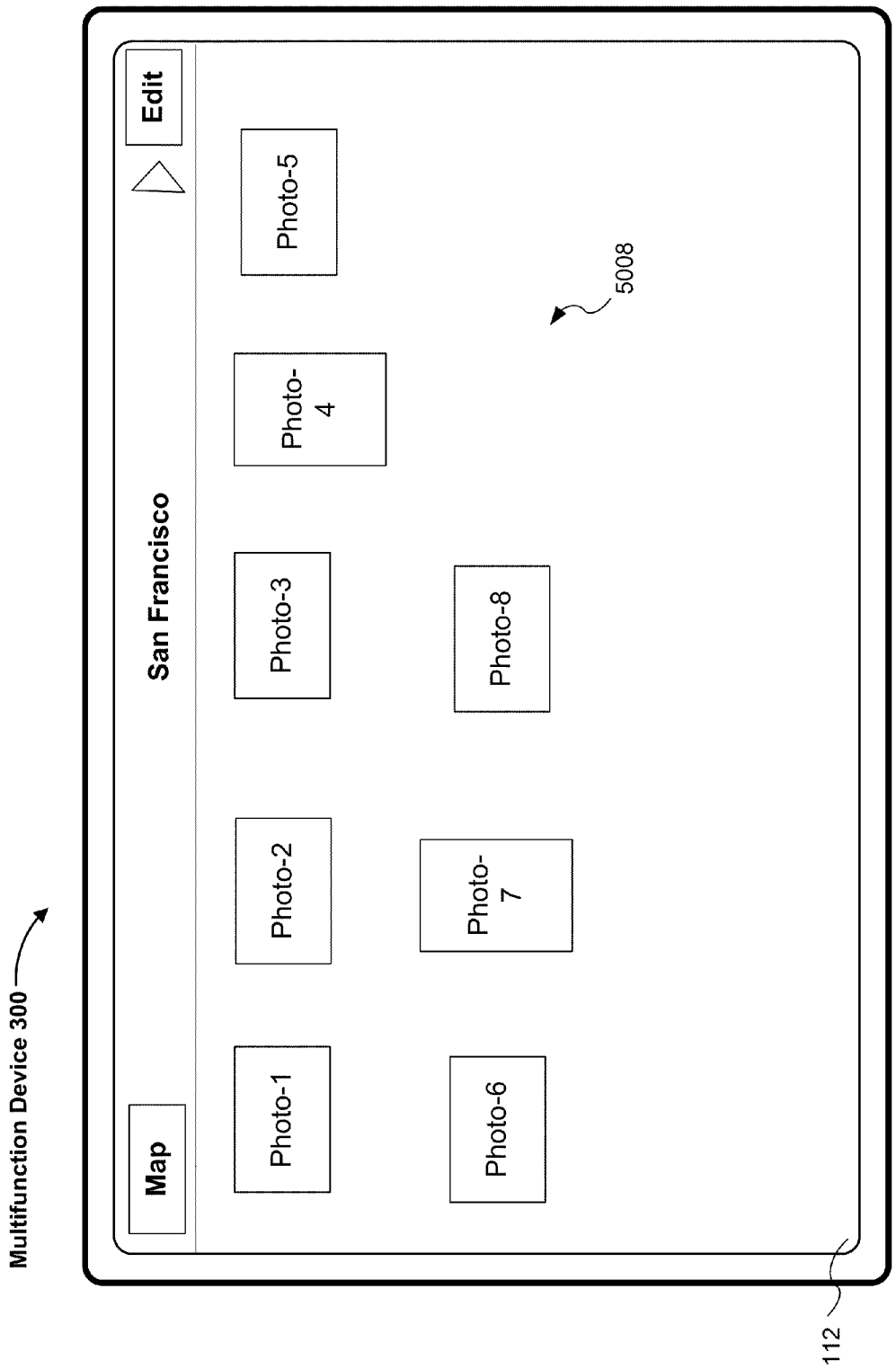
Figure 5W:
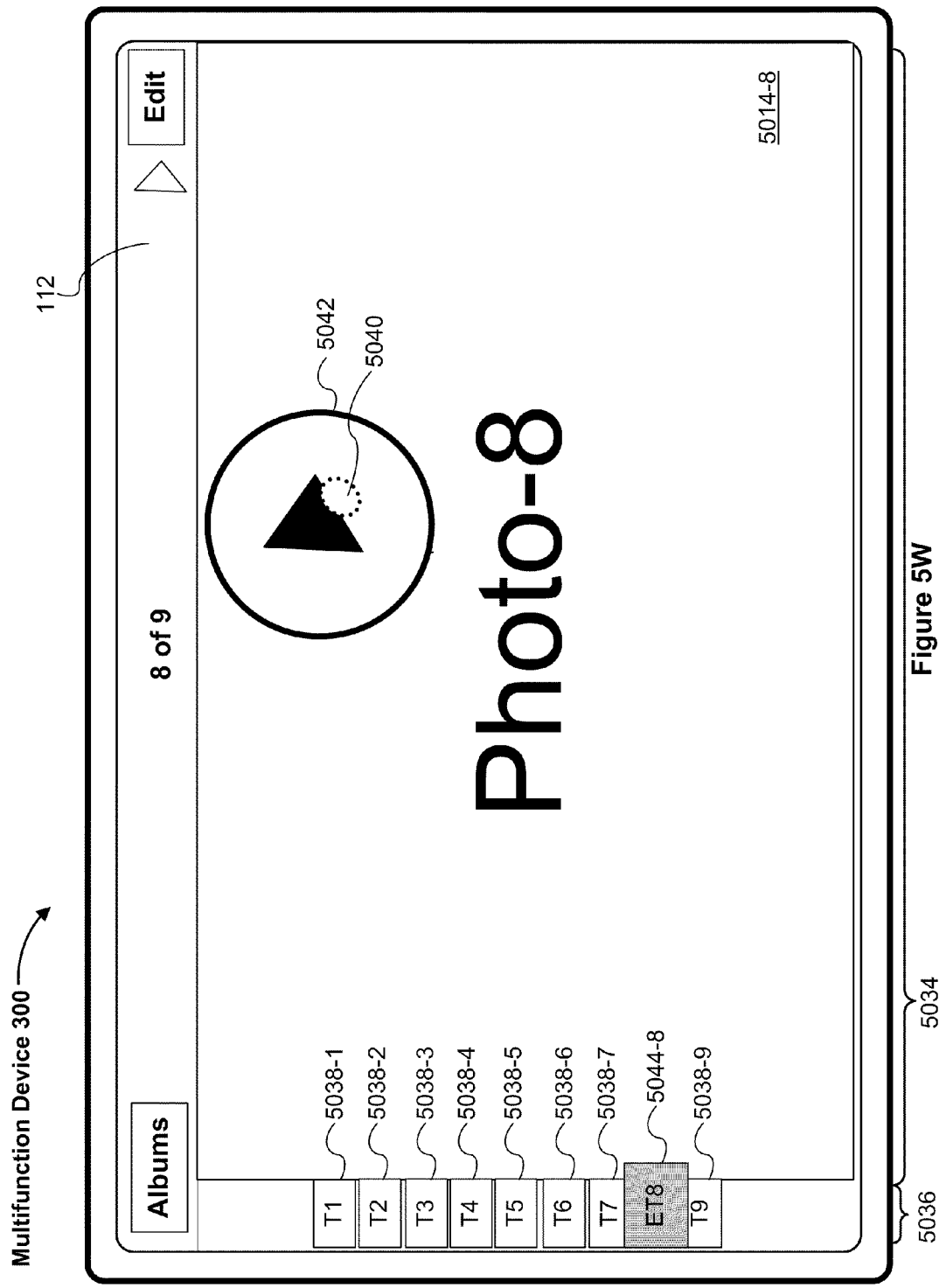
Figure 5Y:
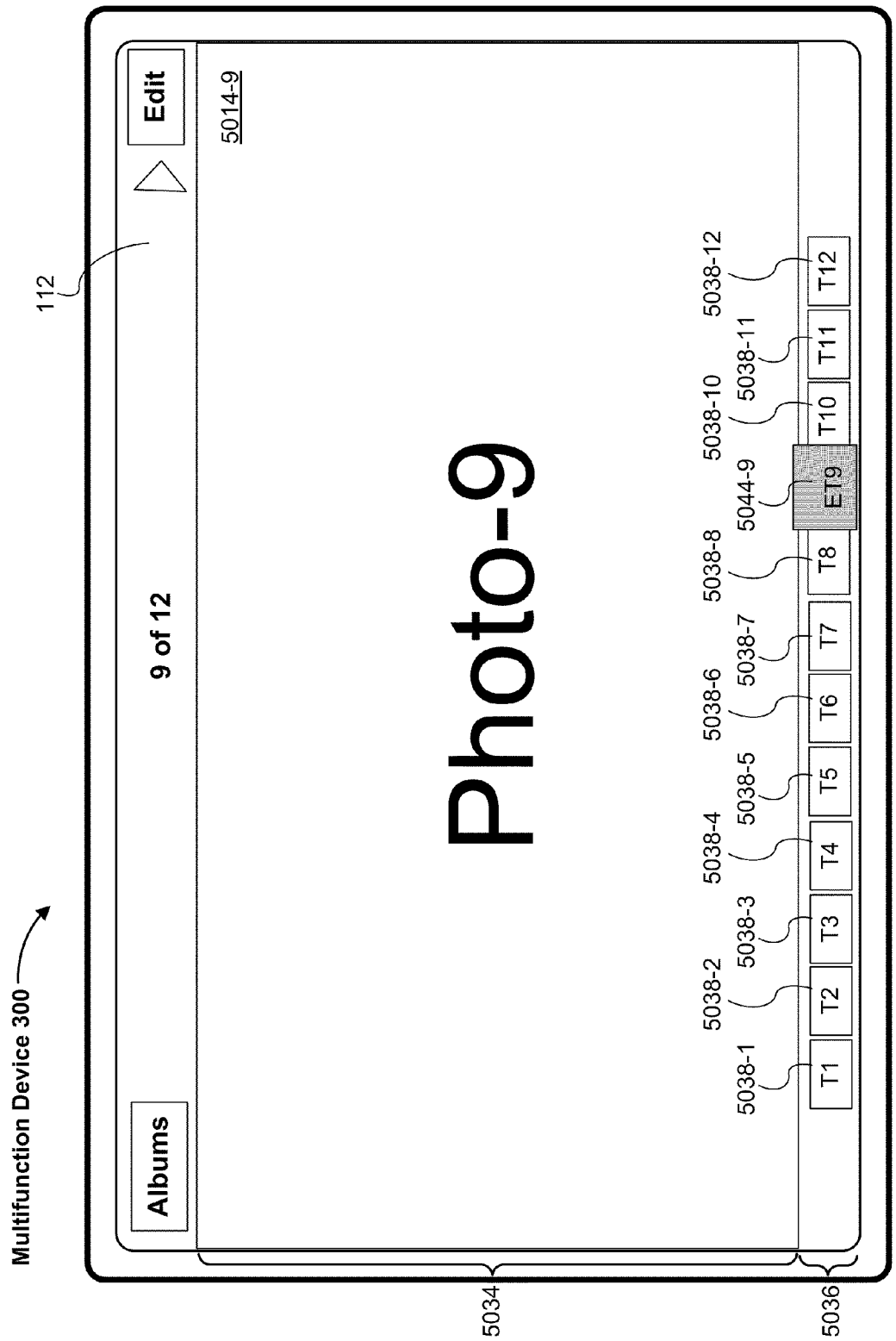
Figure 5Z:
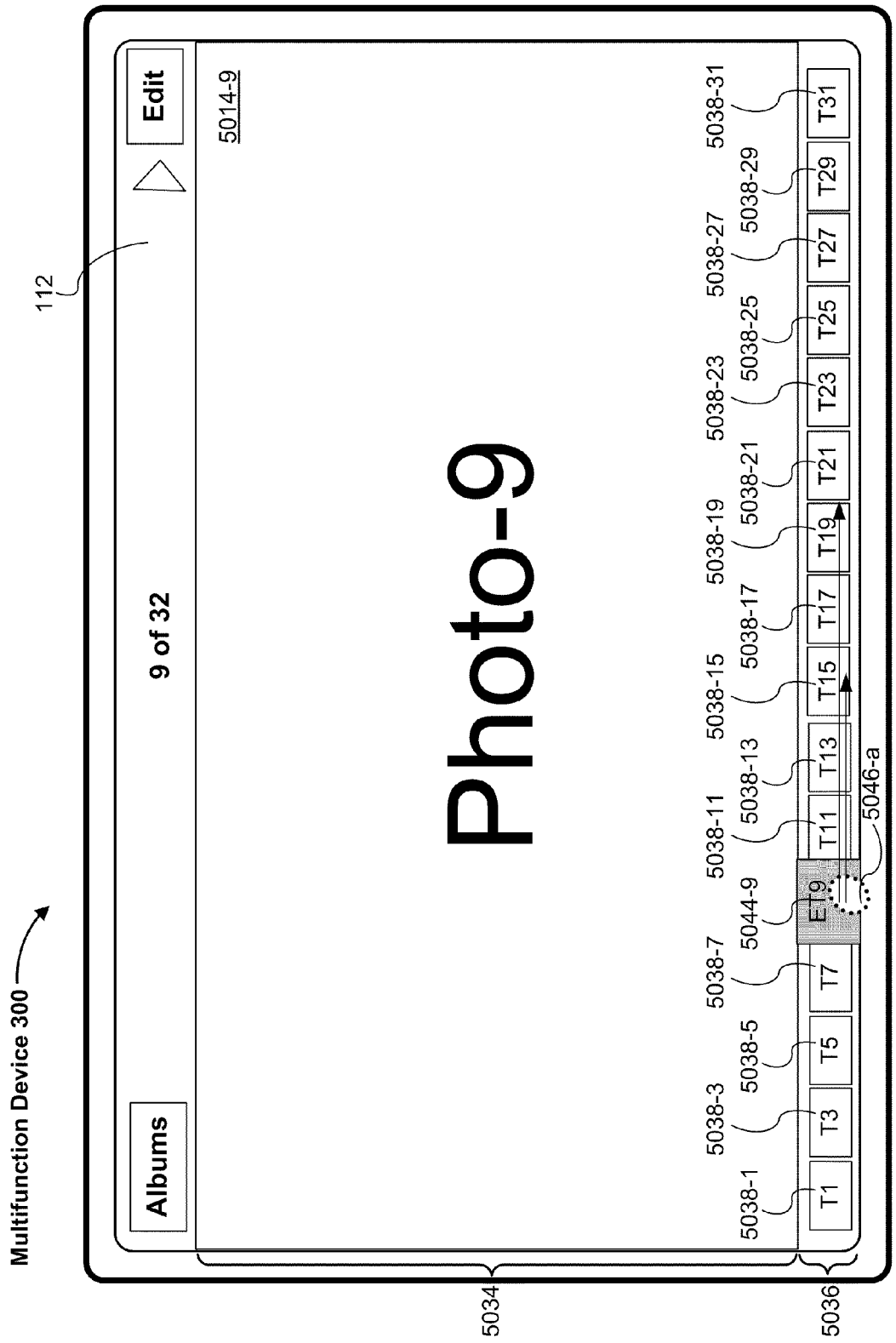
Figure 5A:
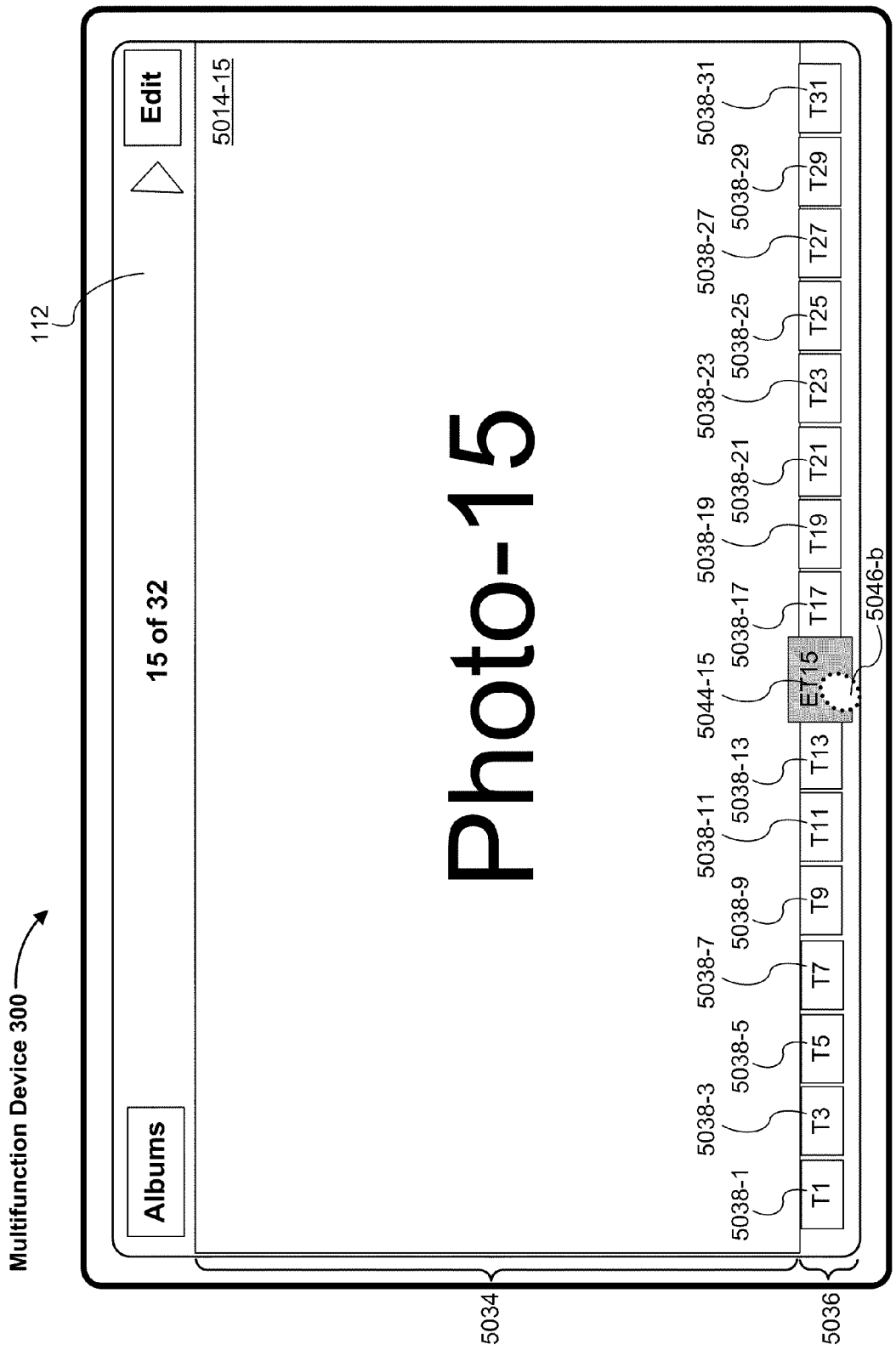
Figure 5C:
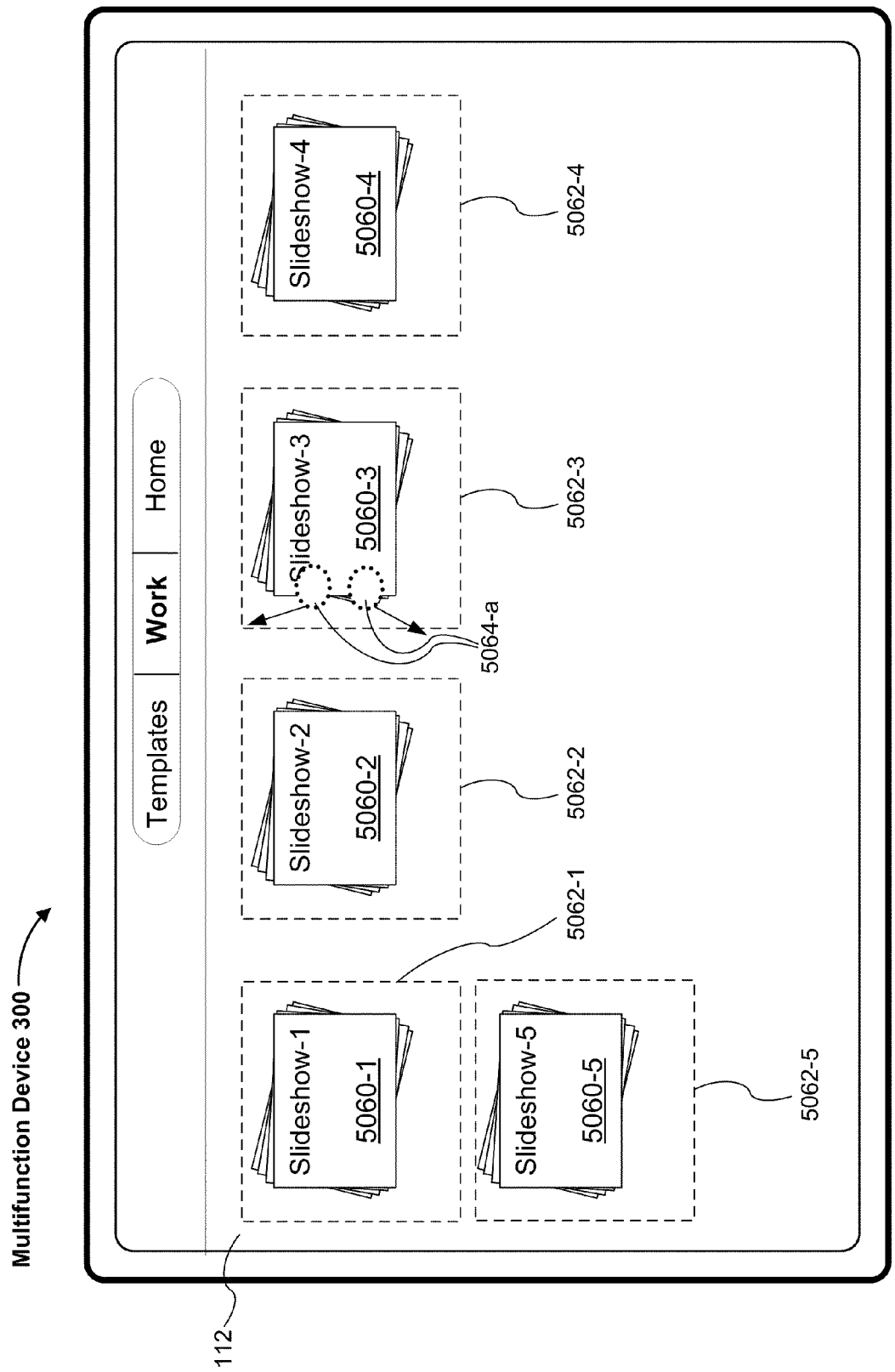
Figure 5D:
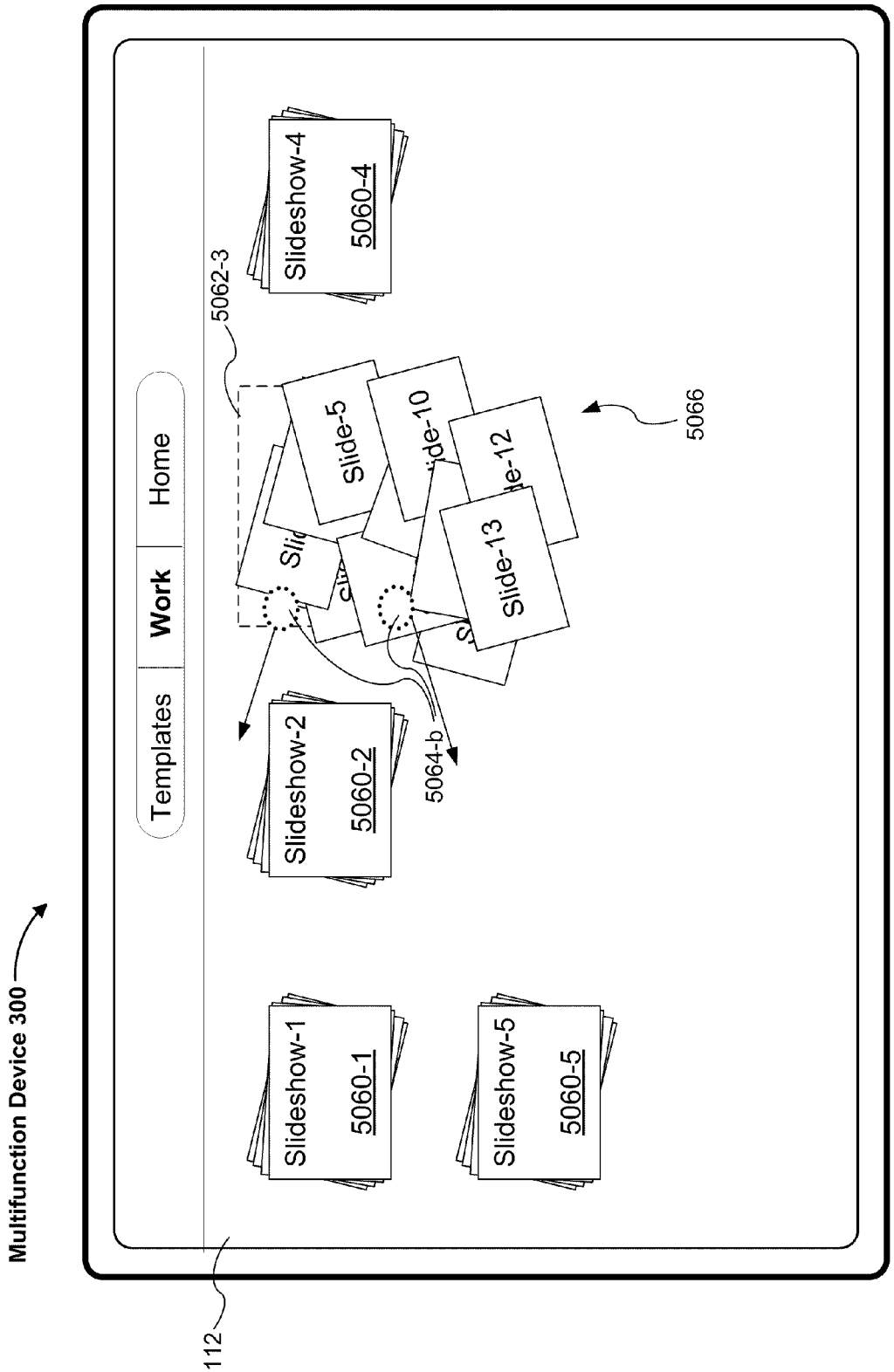
Figure 5E:
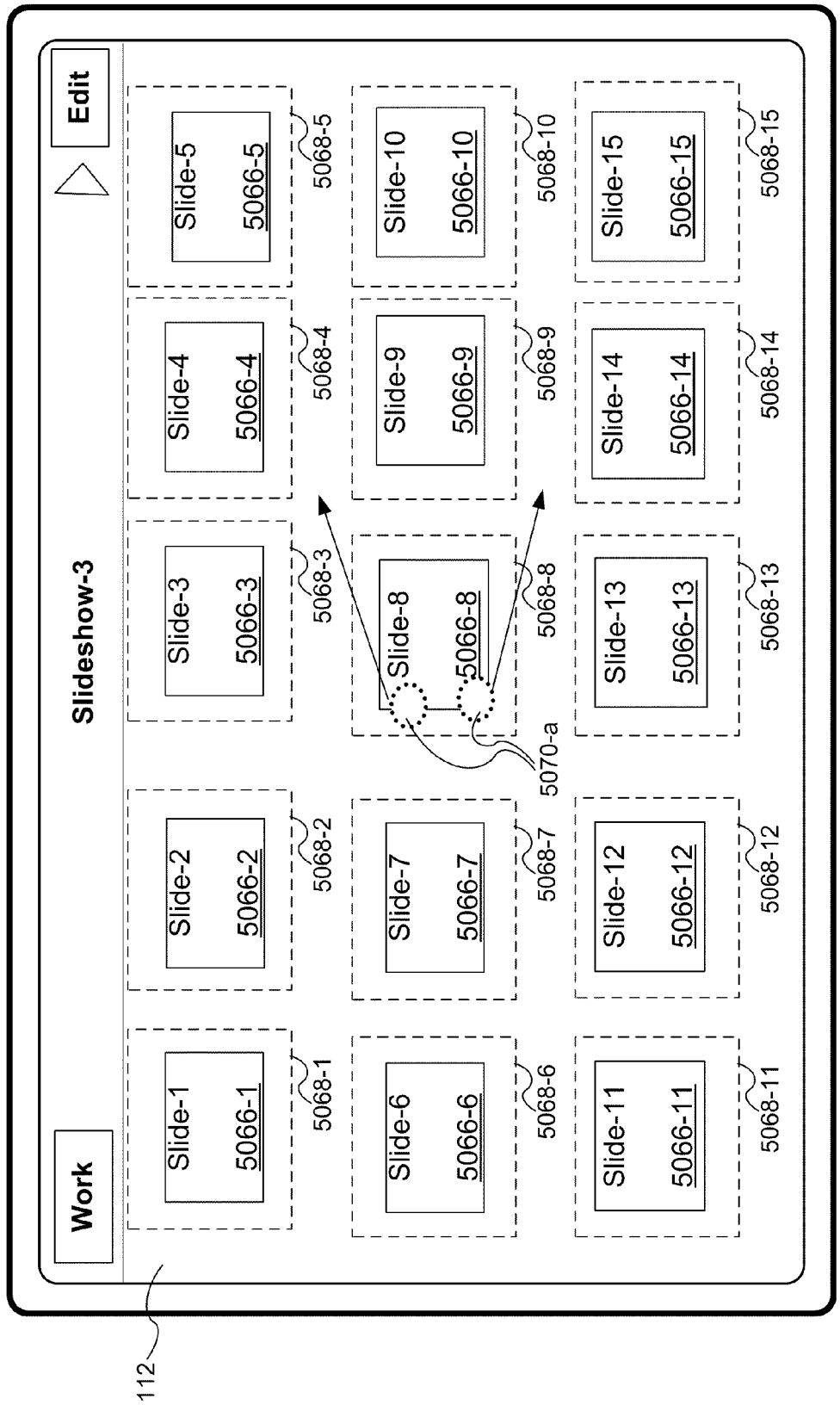
Figure 5F:
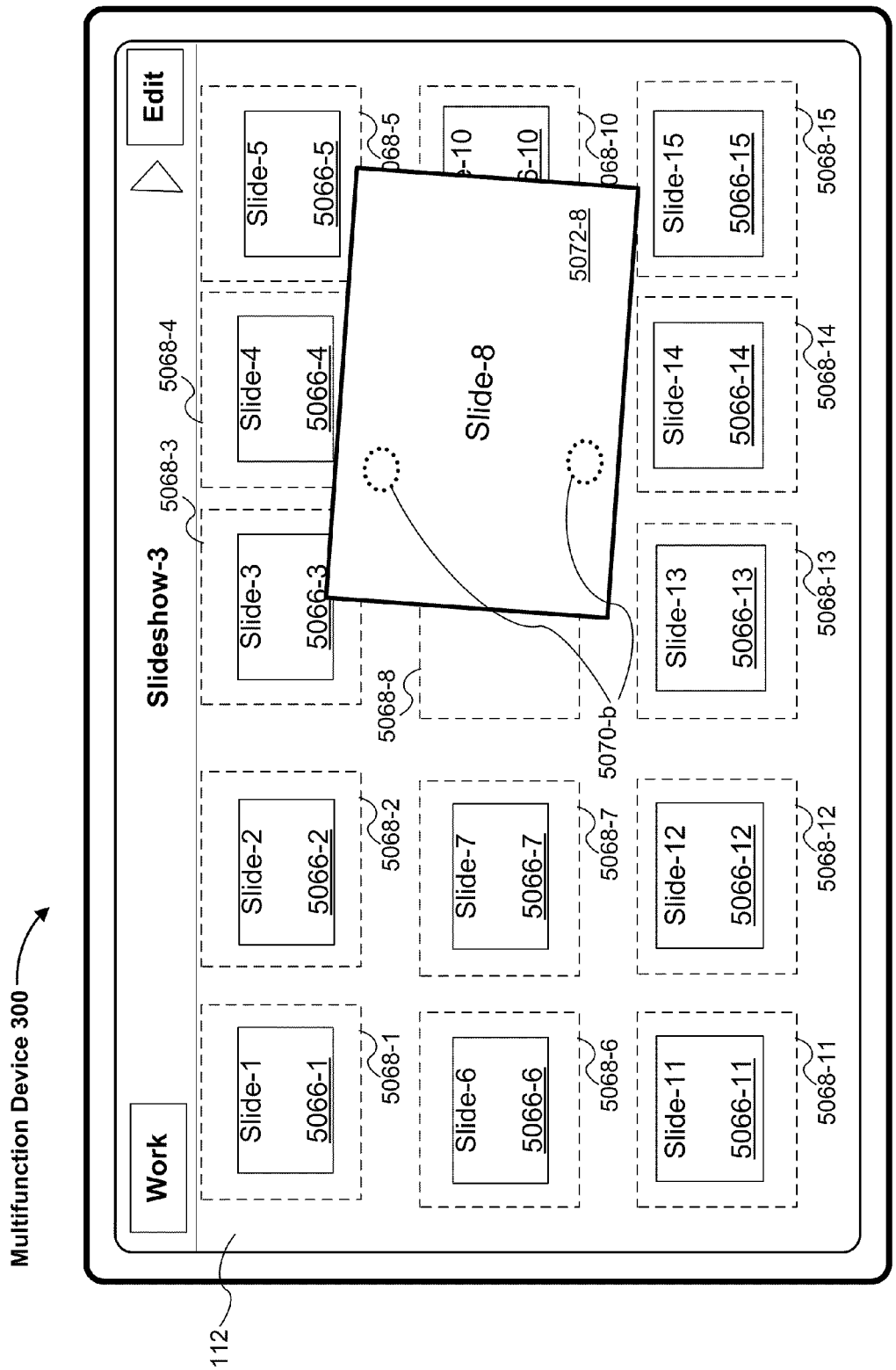
Figure 5G:
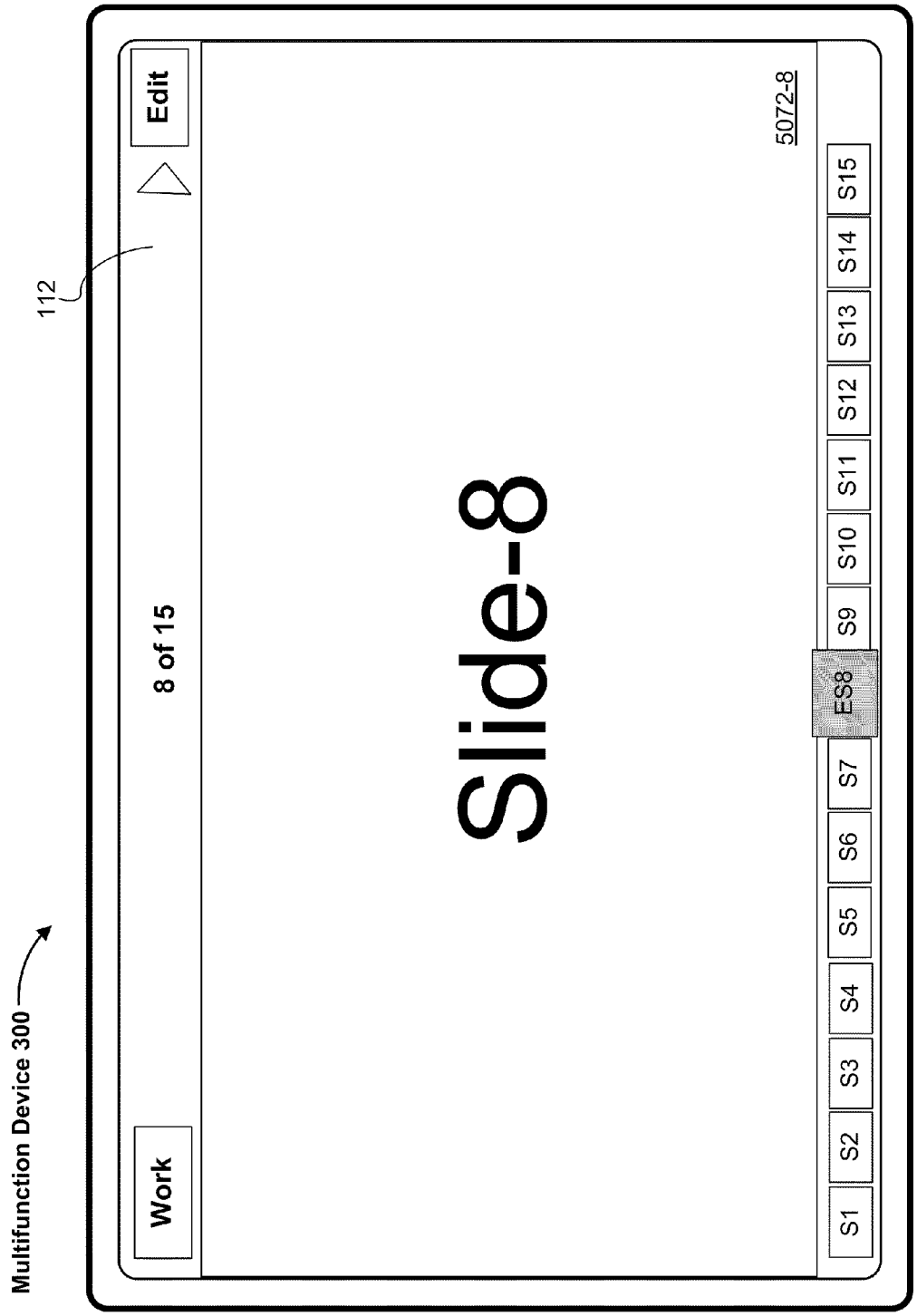
Figure 5H:
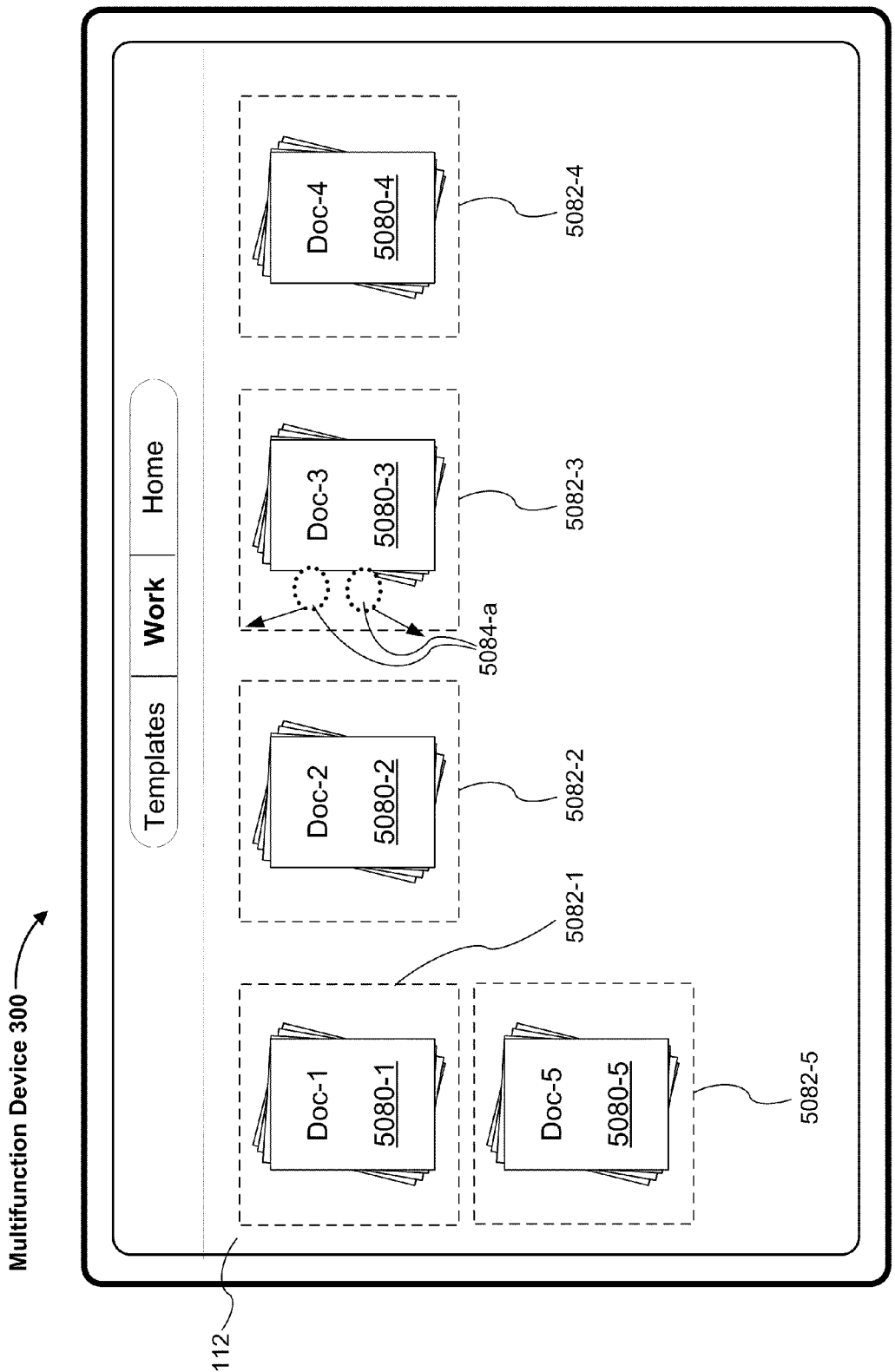
Figure 5J:
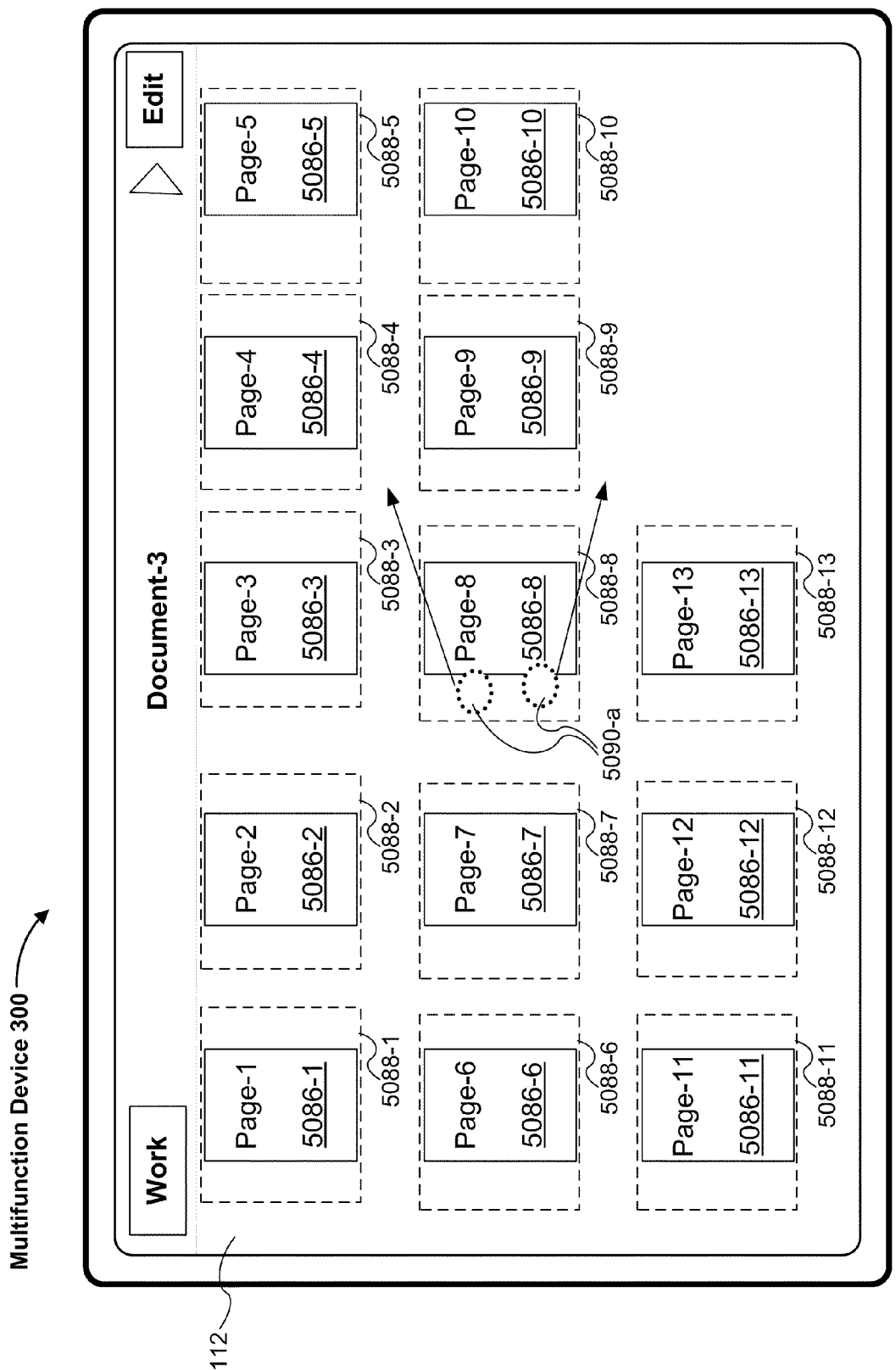
Figure 5K:
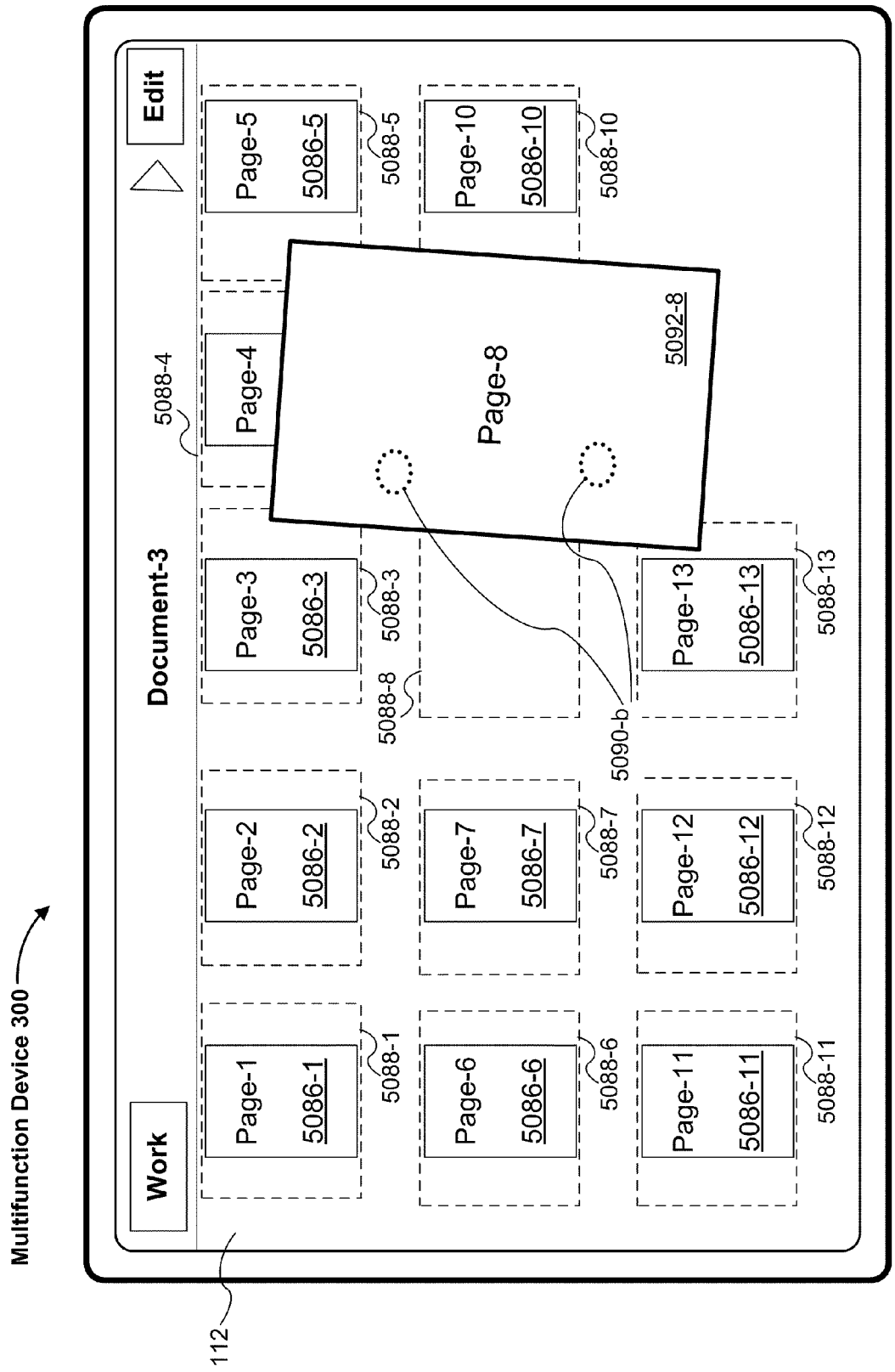
Figure 6A:
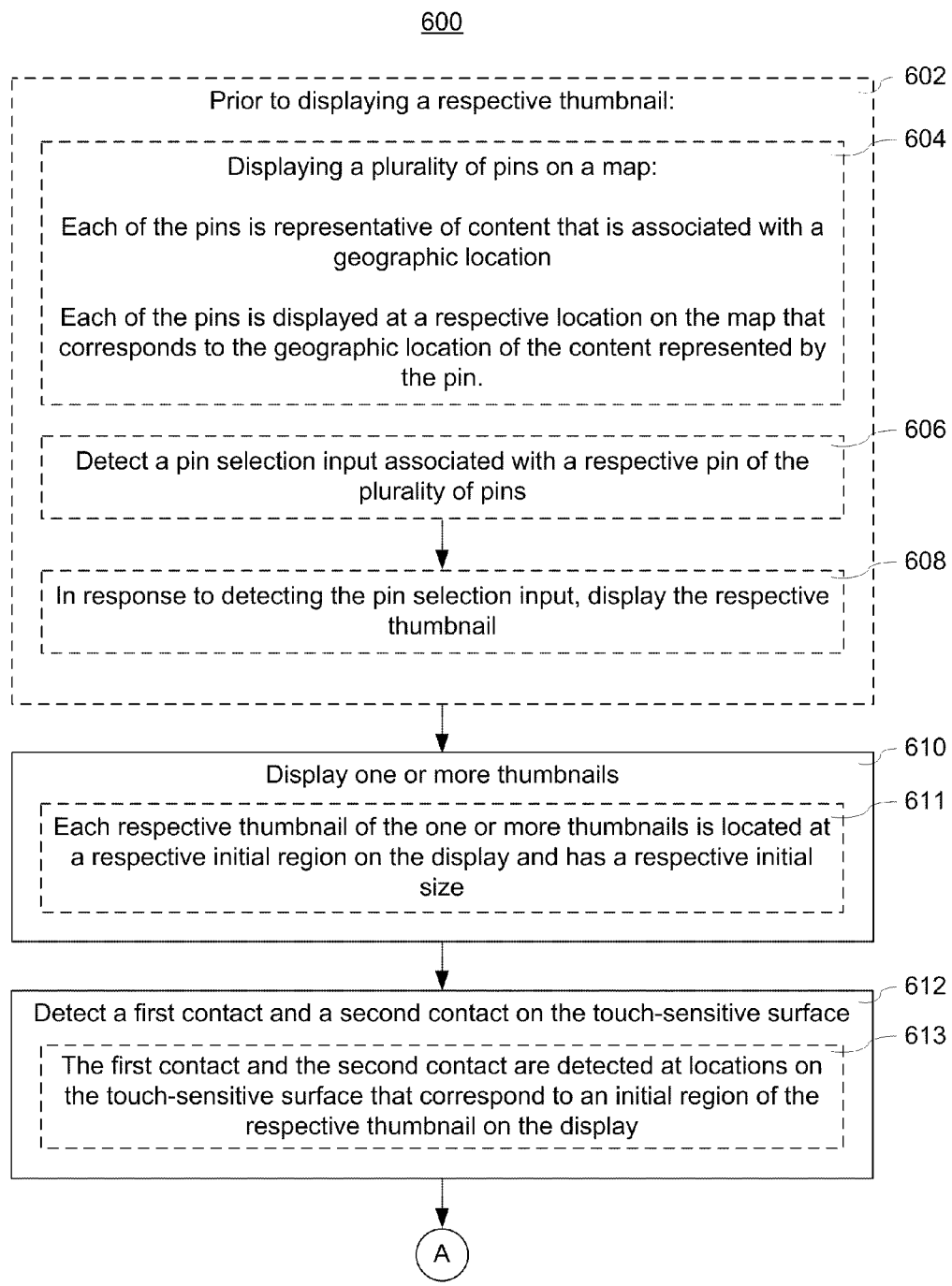
FIGS. 6A-6G are flow diagrams illustrating a method of displaying content associated with a thumbnail in accordance with some embodiments.
Figure 6B:
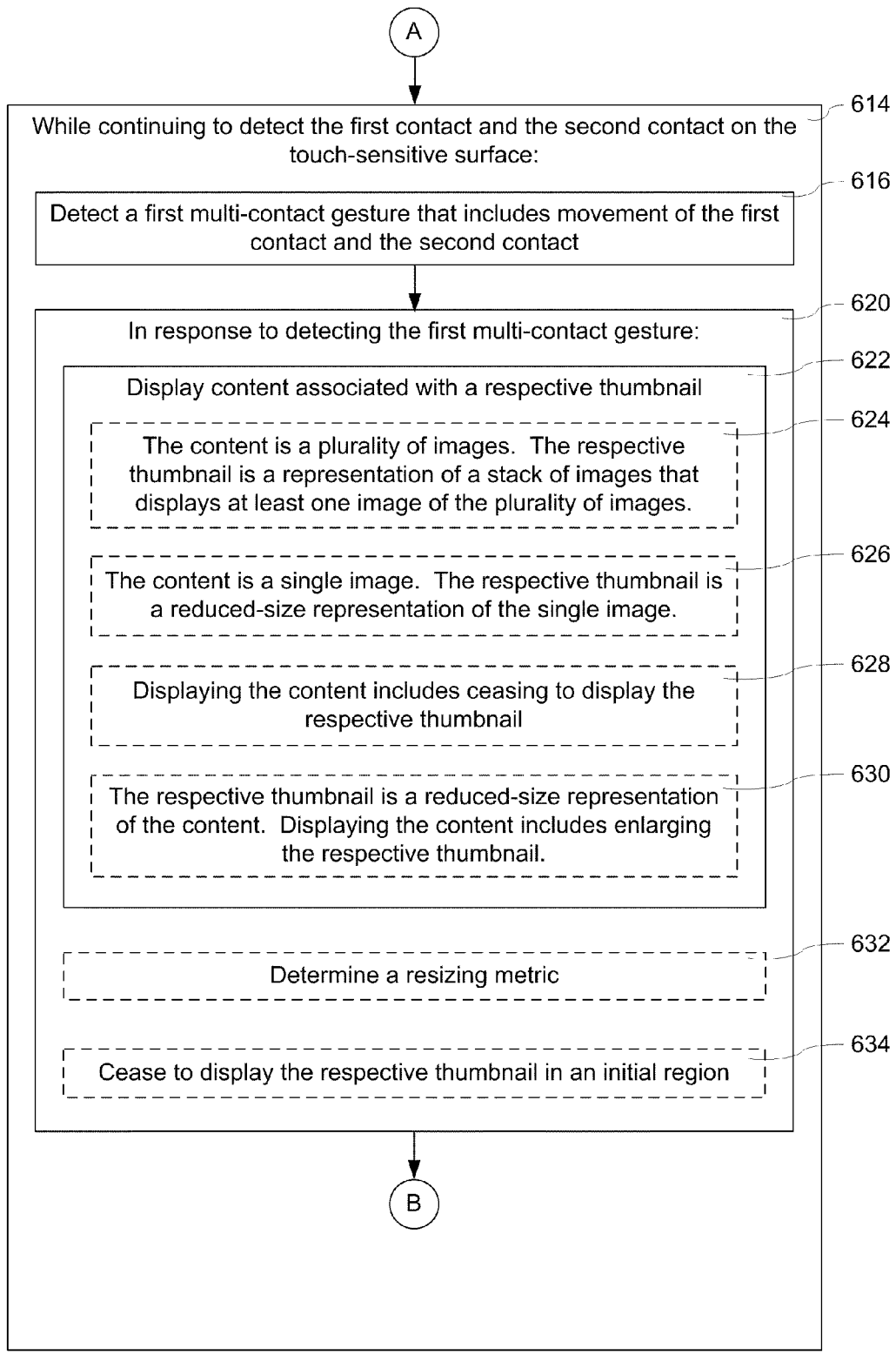
Figure 6C:
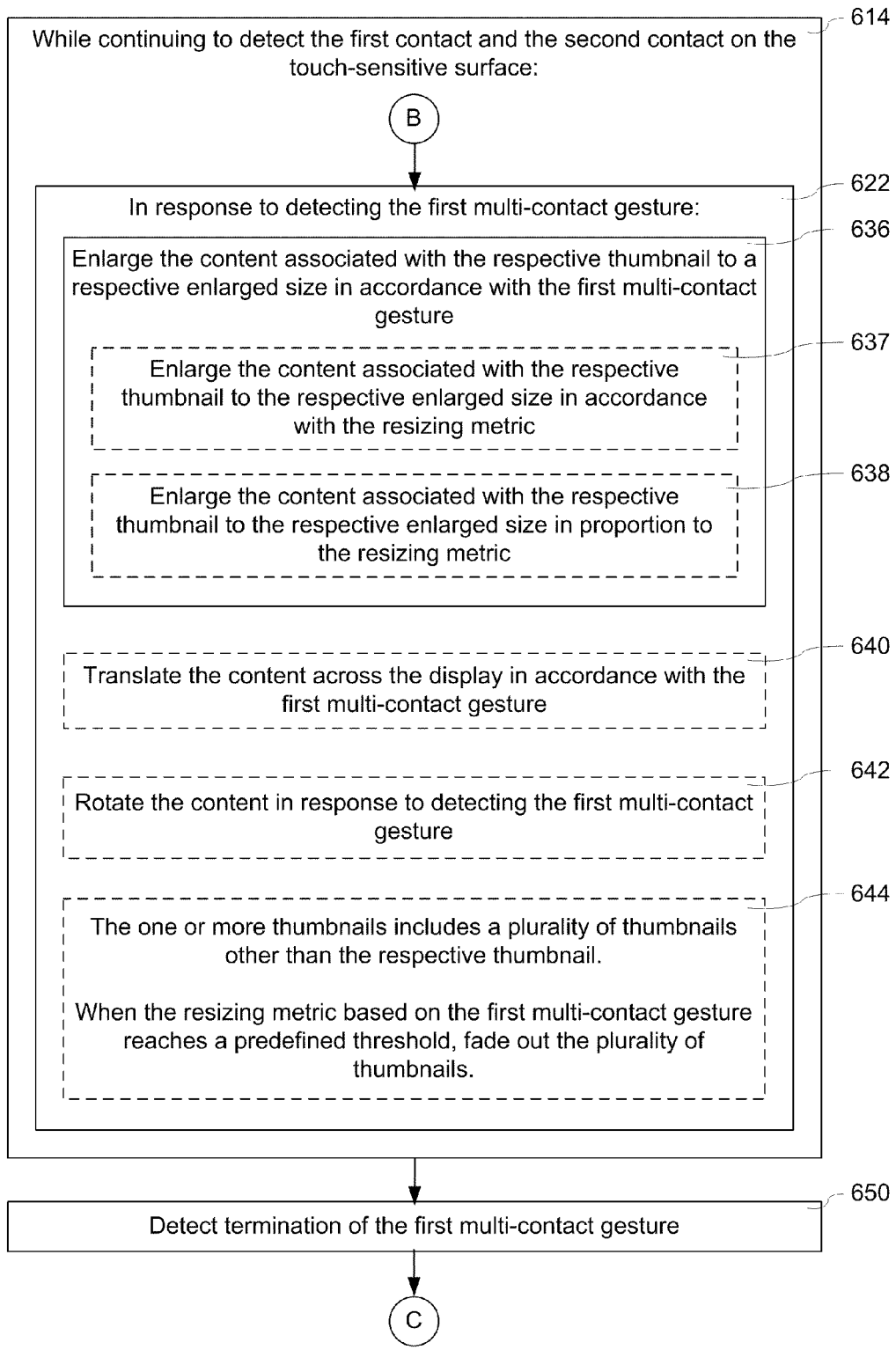
Figure 6D:
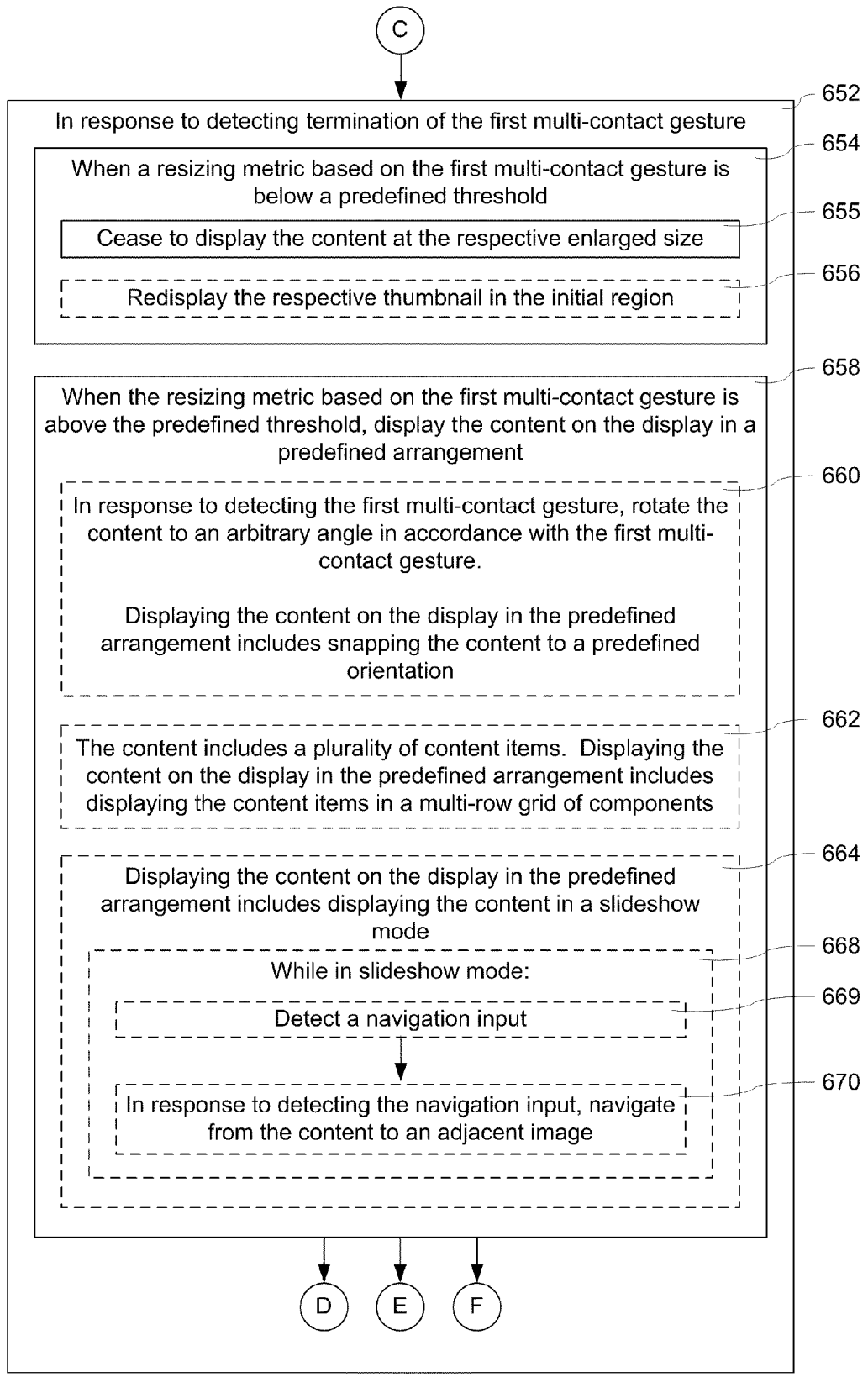
Figure 6E:
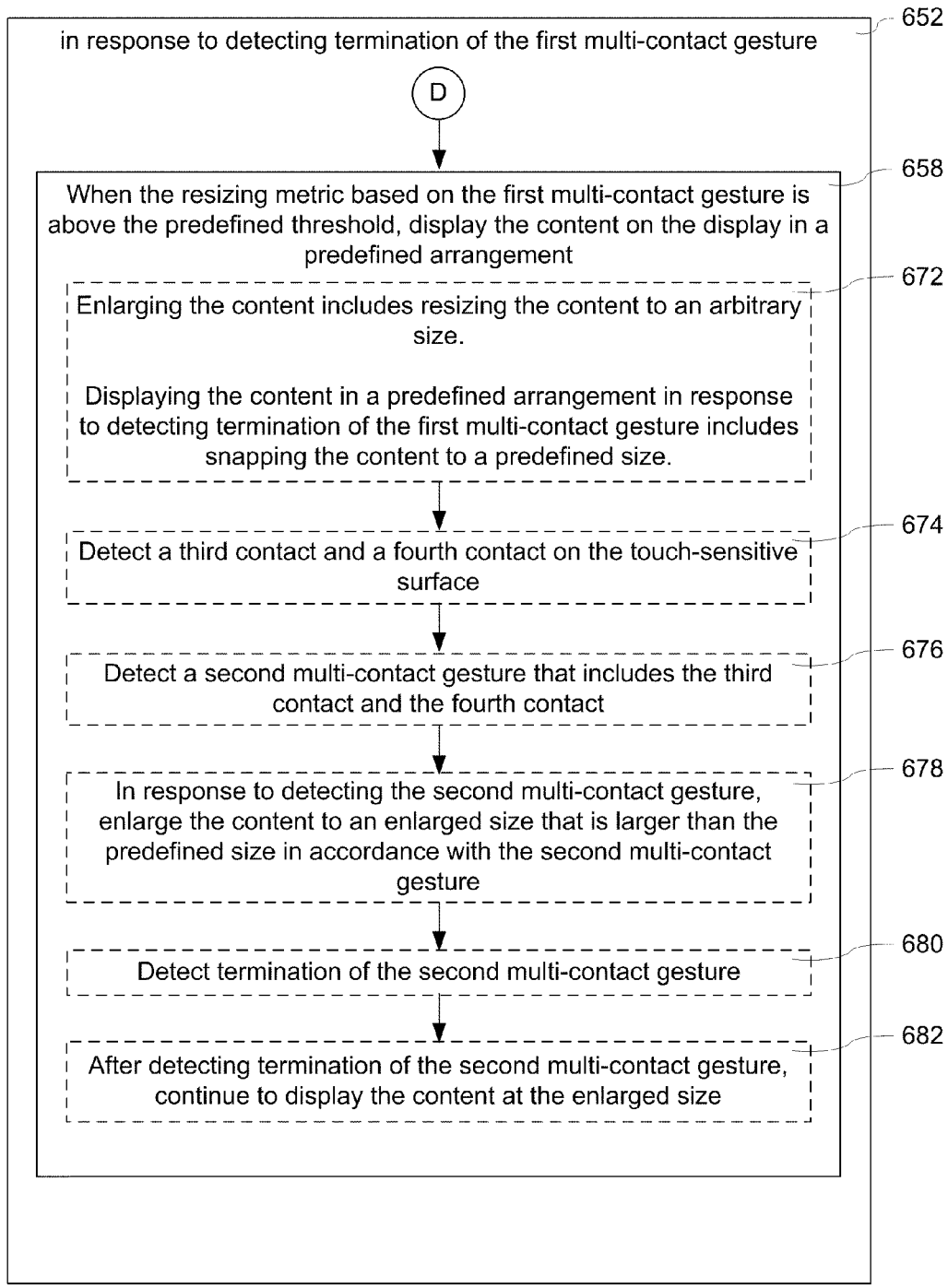
Figure 6F:
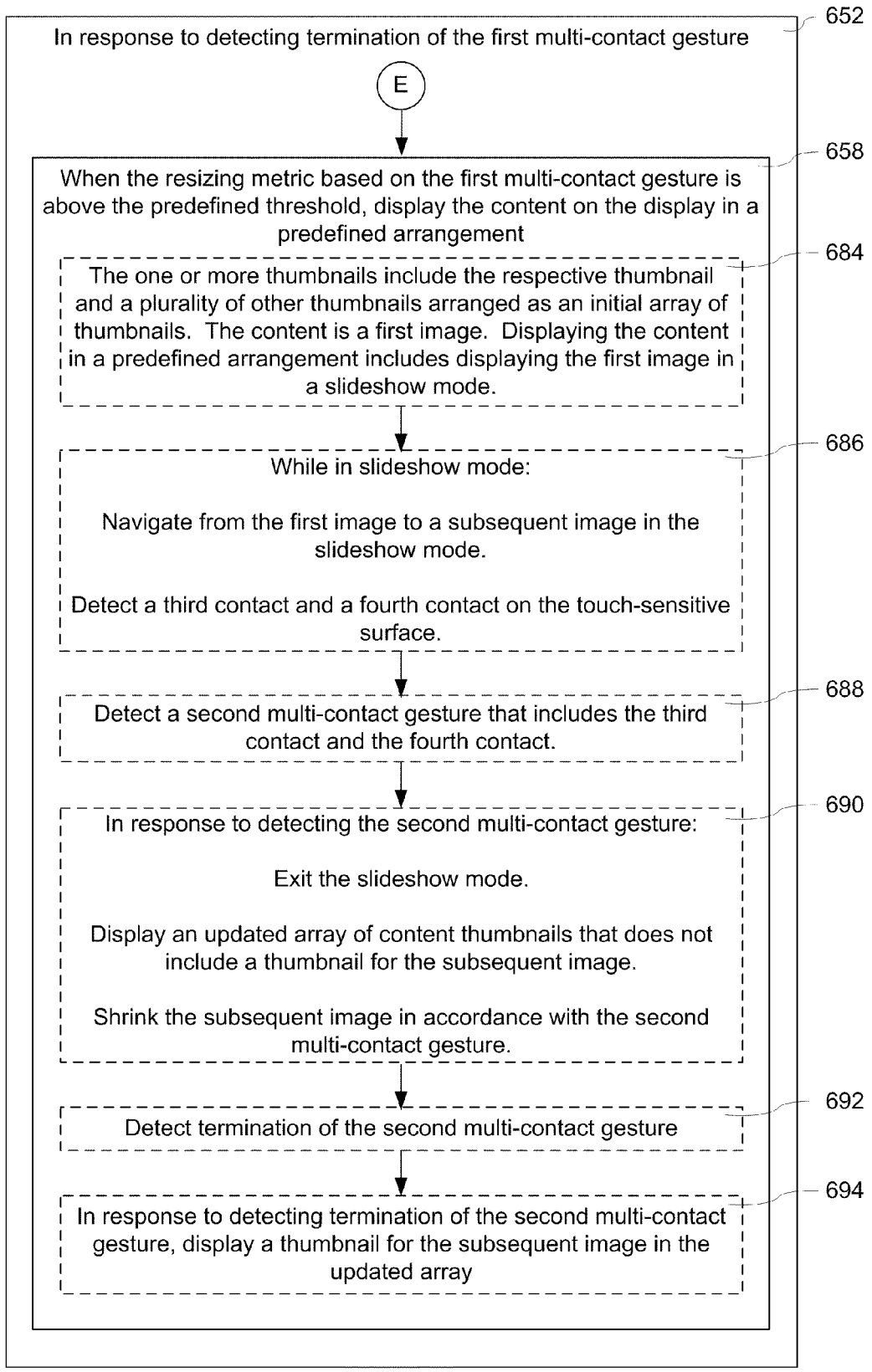
Figure 6G:
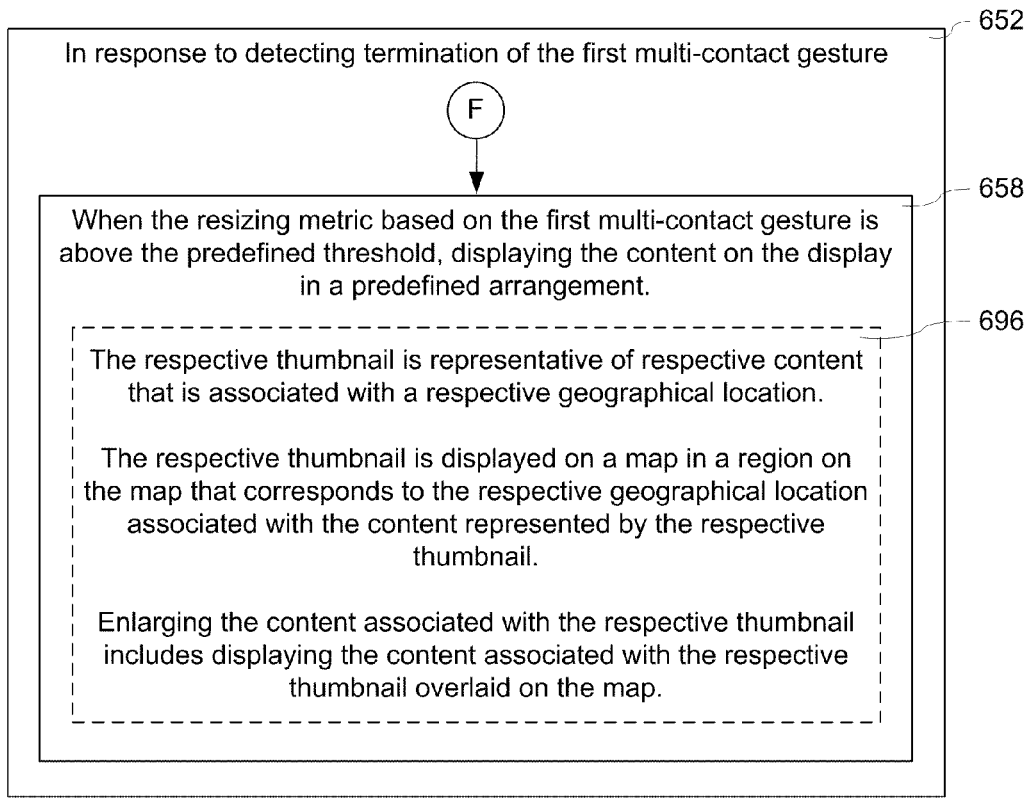

FIGS. 5F-5G and 5J-5K illustrate exemplary user interfaces for displaying the content 5014-8 in a predefined arrangement (e.g., 5014-8 in FIG. 5K) in response to detecting an end of the multi-contact gesture (e.g., liftoff of contacts 5012-b in FIG. 5G) when a resizing metric is above a predefined value. FIG. 5G illustrates rotating the content 5014-8 by six degrees when the device detects that a primary axis 5016 between two contacts in the multi-contact gesture has rotated by six degrees (e.g., from 5016-a in FIG. 5F to 5016-b in FIG. 5G). FIG. 5J illustrates rotating and resizing the content 5014-8 so as to display the content in a slideshow arrangement as illustrated in FIG. 5K.

FIGS. 5H-5I and 5F illustrate exemplary user interfaces for ceasing to display the content 5014-8 in response to detecting an end of the multi-contact gesture (e.g., liftoff of contacts 5006-b in FIG. 5H) when a resizing metric is below a predefined value. For example in FIG. 5H, the device displays an animation of the content 5014-8 moving towards the initial region associated with the content thumbnail 5008-8. In FIG. 5F, the device ceases to display the content 5014-8 and redisplays the content thumbnail 5008-8.

FIGS. 5K and 5L illustrate exemplary user interfaces for navigating from a first image in a slideshow view (e.g., 5014-8 in FIG. 5K) to a subsequent image in the slideshow view (e.g., 5014-9 in FIG. 5L) in response to detecting a navigation input (e.g., swipe gesture 5018 in FIG. 5K).

FIGS. 5K and 5M-5N illustrate exemplary user interfaces for zooming content (e.g., photo 5014-8 in FIG. 5M) in response to detecting a de-pinch gesture (e.g., movement of contacts 5020 from a first location 5020-a in FIG. 5K to a second location 5020-b in FIG. 5M), from a first magnification level (e.g., as illustrated in FIG. 5K) to a second magnification level (e.g., as illustrated in FIG. 5M) and maintaining the content at the second magnification level (e.g., as illustrated in FIG. 5N) after the device ceases to detect the gesture (e.g., after the device detects liftoff of contacts 5020-b in FIG. 5M).

FIGS. 5K and 5O illustrate exemplary user interfaces for navigating from a first image in a slideshow view (e.g., 5014-8 in FIG. 5K) to a subsequent image in the slideshow view (e.g., 5014-15 in FIG. 5O) in response to detecting a navigation input (e.g., movement of contact 5022 from a first position 5022-a in FIG. 5K to a second position 5022-b in FIG. 5O).

FIGS. 5O-5R illustrate exemplary user interfaces for exiting a slideshow mode in response to a multi-contact gesture (e.g., a multi-contact gesture including movement of contacts 5024 from a first position 5024-a in FIG. 5O towards each other to a second position 5024-b in FIG. 5P and a third position 5024-c in FIG. 5Q). FIG. 5Q illustrates rotating the content 5014-15 in accordance with the multi-contact gesture. FIG. 5R illustrates the device displaying an animation of the content moving to a respective location in an updated array in response to detecting an end of the multi-contact gesture (e.g., in response to detecting liftoff of contacts 5024-c in FIG. 5Q), and redisplaying the content thumbnail 5008-15 that is associated with the content.

FIGS. 5S-5V illustrate exemplary user interfaces for displaying and navigating through content on a map interface. In FIG. 5S, the device displays a map with a plurality of pins 5026 that are associated with geographic locations on the map. In response to detecting a pin selection input (e.g., tap gesture 5028) the device displays an album thumbnail 5002-6 that is associated with content. In response to detecting a multi-contact gesture (or de-pinch gesture including movement of contacts 5030 from a first location 5030-a in FIG. 5T to a second location 5030-b in FIG. 5U), the device displays a plurality of representations of the content (e.g., 5008 in FIG. 5U) overlaid over the map. In FIG. 5V, when the resizing metric is above a predefined value and the device detects an end of the multi-contact gesture (e.g., liftoff of contacts 5030-b in FIG. 5U) the device displays the representations of the content 5008 in a predefined arrangement (e.g., as illustrated in FIG. 5V).

FIGS. 5W-5Z illustrate exemplary user interfaces for navigating through content using a presentation user interface with a display region 5034 and a scrubber 5036. In FIG. 5W, the device displays a vertical scrubber 5036 that includes a thumbnail representation 5038 or an enlarged thumbnail representation 5044-8 for all of the content items, where the enlarged thumbnail representation 5044-8 is displayed for the currently displayed content item (e.g., photo 5014-8). In FIG. 5W the device also displays a video playback icon 5042 that, when activated (e.g., in response to detecting a video play input such as tap gesture 5040), plays a video associated with the displayed content item. In FIG. 5X, the device displays a vertical scrubber 5036 that includes thumbnail representations 5038 for a subset of the content items and an enlarged thumbnail representation 5044-8 for the currently displayed content item 5014-8. In FIG. 5Y, the device displays a horizontal scrubber 5036 that includes a thumbnail representation 5038 or an enlarged thumbnail representation 5044-9 for all of the content items, where the enlarged thumbnail representation 5044-9 is displayed for the currently displayed content item (e.g., photo 5014-9). In FIG. 5Z, the device displays a horizontal scrubber 5036 that includes thumbnail representations 5038 for a subset of the content items and an enlarged thumbnail representation 5044-9 for the currently displayed content item.

FIGS. 5Z-5AA illustrate exemplary user interfaces for, in response to a navigation input (e.g., movement of contact 5046 from a location that corresponds to a first location on the scrubber 5046-a in FIG. 5Z to a location on the touch screen that corresponds to a second location on the scrubber 5046-b in FIG. 5AA): displaying content associated with the navigation input (e.g., an image such as Photo-15 5014-15 in FIG. 5AA that is associated with the second location on the scrubber), and, when the scrubber includes a thumbnail representation of the content (e.g., thumbnail representation 5038-15 in FIG. 5Z), replacing the thumbnail representation with an enlarged thumbnail representation (e.g., 5044-15 in FIG. 5AA).

FIGS. 5Z and 5BB illustrate exemplary user interfaces for, in response to a navigation input (e.g., movement of contact 5046 from a location that corresponds to a first location on the scrubber 5046-a in FIG. 5Z to a location on the touch screen that corresponds to a third location on the scrubber 5046-c in FIG. 5BB): displaying content associated with the navigation input (e.g., an image such as Photo-20 5014-20 in FIG. 5BB) that is associated with the second location on the scrubber), and, when the scrubber does not include a thumbnail representation of the content inserting an enlarged thumbnail representation (e.g., 5044-20 in FIG. 5BB) into the scrubber and adjusting the thumbnail representations in the scrubber to accommodate the enlarged thumbnail representation.

FIGS. 5CC-5EE illustrate exemplary user interfaces for ceasing to display a slideshow thumbnail (e.g., 5060-3 in FIG. 5CC) and displaying representations of slides (e.g., 5066 in FIG. 5DD) in response to detecting a de-pinch gesture (e.g., movement of contacts 5064 from a first location 5064-a in FIG. 5CC to a second location 5064-b in FIG. 5DD), and in response to detecting an end of the multi-contact gesture (e.g., liftoff of contacts 5064-b in FIG. 5DD) when a resizing metric is above a predefined value, displaying the representations 5066 of the content in a predefined arrangement (e.g., the arrangement of the slide thumbnails 5066 in FIG. 5EE).

FIGS. 5EE-5GG illustrate exemplary user interfaces for ceasing to display a slide thumbnail (e.g., 5066-8 in FIG. 5EE) and displaying a slide (e.g., 5072-8 in FIGS. 5FF-5GG) in response to detecting a de-pinch gesture (e.g., movement of contacts 5070 from a first location 5070-a in FIG. 5EE to a second location 5070-b in FIG. 5FF), and in response to detecting an end of the multi-contact gesture (e.g., liftoff of contacts 5070-b in FIG. 5FF) when a resizing metric is above a predefined value, displaying the slide in a predefined arrangement (e.g., at a size that fills a display region of the display), as illustrated in FIG. 5GG.

FIGS. 5HH-5JJ illustrate exemplary user interfaces for ceasing to display a document thumbnail (e.g., 5080-3 in FIG. 5HH) and displaying representations of pages (e.g., 5086 in FIG. 5II) in response to detecting a de-pinch gesture (e.g., movement of contacts 5084 from a first location 5084-a in FIG. 5HH to a second location 5084-b in FIG. 5II), and in response to detecting an end of the multi-contact gesture (e.g., liftoff of contacts 5084-b in FIG. 5II) when a resizing metric is above a predefined value, displaying the representations 5066 of the content in a predefined arrangement (e.g., the arrangement of the page thumbnails 5086 in FIG. 5JJ).

FIGS. 5JJ-5LL illustrate exemplary user interfaces for ceasing to display a page thumbnail (e.g., 5086-8 in FIG. 5JJ) and displaying a page (e.g., 5092-8 in FIGS. 5KK-5LL) in response to detecting a de-pinch gesture (e.g., movement of contacts 5090 from a first location 5090-a in FIG. 5JJ to a second location 5090-b in FIG. 5KK), and in response to detecting an end of the multi-contact gesture (e.g., liftoff of contacts 5090-b in FIG. 5KK) when a resizing metric is above a predefined value, displaying the page in a predefined arrangement (e.g., at a size that fills a display region of the display), as illustrated in FIG. 5LL.

FIGS. 6A-6G are flow diagrams illustrating a method 600 of displaying content associated with a thumbnail in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to display and navigate through content. The method reduces the cognitive burden on a user when displaying and navigating through content, thereby creating a more efficient human-machine interface. For battery-operated computing devices, enabling a user to display and navigate through content faster and more efficiently conserves power and increases the time between battery charges.

In some embodiments, prior to displaying (602) the one or more thumbnails discussed in greater detail below, the device performs operations 604-608, as described in greater detail below with reference to FIGS. 5S-5V.

The device displays (610) one or more thumbnails (e.g., album thumbnails 5002 in FIG. 5A or content thumbnails 5008 in FIG. 5F).

In some embodiments, the thumbnail is a selectable object (e.g., an icon) with a reduced scale image of a portion of content associated with the thumbnail (e.g., a reduced scale image is representative of a set of images), as illustrated in FIG. 5A. For example, in FIG. 5A, each of the albums represents a plurality of photos in a photo album, and each thumbnail 5002 is a representation of a pile of photos where a reduced size representation of one of the photos from the plurality of photos in the photo album is on top of the pile.

In some embodiments, the thumbnail is a selectable object (e.g., an icon) with a reduced scale image of content associated with the thumbnail (e.g., when the thumbnail represents a single photo, the thumbnail is a reduced size representation of the single photo), as illustrated in FIG. 5F. For example, in FIG. 5F, each thumbnail 5008 is a representation a photo in a photo album.

In some embodiments, each respective thumbnail of the one or more thumbnails is located (611) at a respective initial region (e.g., regions 5004 in FIG. 5A or regions 5010 in FIG. 5F) on the display and has a respective initial size.

The device detects (612) a first contact and a second contact (e.g., contacts 5006 in FIG. 5A or contacts 5012 in FIG. 5F) on the touch-sensitive surface (e.g., touch screen 112). In some embodiments, the first contact and the second contact are detected (613) at locations (e.g., contacts 5006-*a* in FIG. 5A or contacts 5012-*a* in FIG. 5F) on the touch-sensitive surface that correspond to an initial region (e.g., 5004-3 in FIG. 5A or 5010-8 in FIG. 5F) of the respective thumbnail (e.g., 5002-3 in FIG. 5A or 5008-8 in FIG. 5F) on the display.

Operations 616-644 are performed while continuing to detect (614) the first contact and the second contact on the touch-sensitive surface (e.g., contacts 5006 with touch screen 112 in FIGS. 5A-5C or contacts 5012 with touch screen 112 in FIGS. 5F-5H). The device detects (616) a first multi-contact gesture that includes movement of the first contact and the second contact. For example, in FIGS. 5A-5C, the device detects a multi-contact gesture that includes movement of the first and second contacts 5006 away from each other from a first position 5006-*a* in FIG. 5A to a second position 5006-*b* in FIG. 5B, and finally a third position 5006-*c* in FIG. 5C. As another example, in FIGS. 5F-5H, the device detects a multi-contact gesture that includes movement of the first and second contacts 5012 away from each other from a first position 5012-*a* in FIG. 5F to a second position 5012-*b* in FIG. 5G, and finally a towards each other to a third position 5012-*c* in FIG. 5H.

Operations 622-644 are performed in response to detecting (620) the first multi-contact gesture (e.g., movement of contacts 5006 in FIGS. 5A-5C or movement of contacts 5012 in FIGS. 5F-5H).

The device displays (622) content associated with a respective thumbnail. For example, displaying the content includes displaying representations 5008 of multiple photos in FIG. 5B that were represented by the album thumbnail 5002-3 in FIG. 5A. As another example, displaying the content includes displaying a representation of a single photo 5014-8 in FIG. 5G that was represented by a content thumbnail 5008-8 in FIG. 5F.

In some embodiments, the content is initially displayed at a size that corresponds to the initial size of the respective thumbnail and at a location that is proximate to an initial region (e.g., 5004-3 in FIG. 5B or 5010-8 in FIG. 5F) of the respective thumbnail (e.g., 5002-3 in FIG. 5A or 5008-8 in FIG. 5F) on the display (e.g., touch screen 112). In some embodiments, the respective thumbnail (e.g., 5002-3 in FIG. 5A) is replaced with one or more content items (e.g., representations of 5008 content in FIGS. 5B-5C or content 5014 in FIGS. 5G-5J) associated with the respective thumbnail so as to indicate that the respective thumbnail is associated with the one or more content items. For example, in FIG. 5A, Album-3 5002-3 an album thumbnail of a photo album that is associated with a plurality of photos of a birthday party, and the thumbnail is displayed to look like a pile of photos that has a photo from the plurality of photos on top of the pile. In this example, the device displays an animation of the pile spreading out by displaying representations (e.g., 5008) of photos from the plurality of photos spreading out across the screen, thereby indicating that these photos are associated with Album-3. As another example, in FIG. 5F, a respective content thumbnail 5008-8 is associated with a respective photo (e.g., Photo-8 5014-8 in FIG. 5G), and the thumbnail is a reduced size representation of the respective photo (e.g. Photo-8 5014-8, in FIGS. 5G-5H). In this example, the device displays an animation of the photo expanding from the region (e.g., 5010-8 in FIG. 5F) in which the respective content thumbnail 5008-8 was originally located, thereby indicating that the photo is associated with the respective content thumbnail 5008-8 that was originally displayed in the region 5010-8.

In some embodiments, the content is a plurality of images (e.g., representations 5008 of content in FIGS. 5B-5C) and the respective thumbnail is (624) a representation of a stack of images (e.g., 5002-3 in FIG. 5A) that displays at least one image of the plurality of images (e.g., the content is an album including representations of a plurality of images and the thumbnail is displayed within an application view that also includes a plurality of thumbnails 5002 for other albums, as illustrated in FIG. 5A). In some embodiments, the content is a single image (e.g., Photo-8 5014-8 in FIG. 5G-5H), and the respective thumbnail is (626) a reduced-size representation (e.g., representation 5008-8 of content in FIG. 5F) of the single image (e.g., the content is a photo within an album and the thumbnail is displayed within an application view that also includes a plurality of thumbnails 5008 for other photos within the album, as illustrated in FIG. 5F).

In some embodiments, displaying the content includes ceasing (628) to display the respective thumbnail (e.g., replacing the thumbnail with the content), as illustrated in FIG. 5B, the thumbnail (e.g., 5002-3 in FIG. 5A) that is associated with the displayed content (e.g., representations 5008 of images in FIG. 5B) is no longer displayed. In some embodiments, the respective thumbnail is (630) a reduced-size representation (e.g., content thumbnail 5008-8 in FIG. 5F) of the content (e.g., 5014-8 in FIGS. 5G-5H), and displaying the content includes enlarging the respective thumbnail. In other words, in some embodiments, the device smoothly transitions from displaying the respective thumbnail (e.g., content thumbnail 5008-8 in FIG. 5G) to displaying the content (e.g., Photo-8 5014-8 in FIG. 5G) so that, to the user, it appears that the thumbnail has been stretched into the content.

In some embodiments, while detecting the first contact and the second contact, the device determines (632) a resizing metric (e.g., by calculating a change in distance between contacts in the multi-contact gesture or by calculating a change in size of the content). In some embodiments, the resizing metric is a measure of the percentage change in the distance between the first contact and the second contact on the touch-sensitive surface from the initial positions (e.g., when the distance between the contacts 5006-*b* in FIG. 5B is 200% of the distance between the contacts 5006-*a* in FIG. 5A, the resizing metric is 2.0, or when the distance between the contacts 5012-*b* in FIG. 5G is 670% of the distance between the contacts 5012-*a* in FIG. 5F, the resizing metric is 6.7). In some embodiments, the resizing metric is a measure of the percentage change in the size of the content (e.g., the content has an initial size and increases in size in accordance with the first multi-contact gesture, and when the increased size of the content is two and a half times as large as the initial size of the content, the resizing metric is 2.5). In some embodiments, the resizing metric is a measure of the absolute size of the content (e.g., when a diagonal measurement of the content is 100 pixels, the resizing metric is 100).

In some embodiments, in response to detecting the first multi-contact gesture, the device ceases (634) to display the respective thumbnail in an initial region. In some embodiments, ceasing to display the respective thumbnail in the initial region includes displaying an animation of the respective thumbnail moving from its initial region to a region on the display that is associated with the first multi-contact gesture and transitioning the respective thumbnail to the content associated with the respective thumbnail. For example, in FIGS. 5A-5B, the device displays an animation of a smooth transition between the thumbnail (e.g., 5002-3 in FIG. 5A) that represents an album of photos, and a plurality of representations (e.g., 5008 in FIGS. 5B-5C) of individual photos that are associated with the thumbnail. As another example, in FIGS. 5F-5G, the device displays an animation of a smooth transition between the thumbnail (e.g., 5008-8 in FIG. 5F) that represents a respective individual photo, and the respective individual photo (e.g., 5014-8 in FIGS. 5G-5H) that is associated with the thumbnail.

The device enlarges (636) the content associated with the respective thumbnail to a respective enlarged size in accordance with the first multi-contact gesture. For example, in FIGS. 5B-5C, the content (e.g., the representations 5008 of a plurality of photos) is initially displayed at a first size (e.g., the size of the representations 5008 of a plurality of photos in FIG. 5B), and is displayed at a larger size (e.g., the size of the representations 5008 of a plurality of photos in FIG. 5C) as the contacts 5006 move away from each other (e.g., from contact location 5006-*b* in FIG. 5B to contact location 5006-*c* in FIG. 5C). As another example, in FIGS. 5G-5H, the content (e.g., Photo-8 5014-8) is initially displayed at a first size (e.g., the size of Photo-8 5014-8 in FIG. 5G), and is displayed at a larger size (e.g., the size of Photo-8 5014-8 in FIG. 5H) as the contacts 5012 move away from each other (e.g., from contact location 5012-*b* in FIG. 5G to contact location 5012-*c* in FIG. 5H).

In some embodiments, the first multi-contact gesture includes both de-pinching component(s) (e.g., movement of the contacts from a first location 5012-*a* on the touch screen 112 in FIG. 5F away from each other to a second location 5012-*b* on the touch screen 112 in FIG. 5G) and pinching component(s) (e.g., movement of the contacts from the second location 5012-*b* on the touch screen 112 in FIG. 5G towards each other to a third location 5012-*c* on the touch screen 112 in FIG. 5H). In these embodiments, in response to the de-pinching components, the device expands the content (e.g., Photo-8 5014-8 in FIG. 5G is larger than the thumbnail of Photo-8 5008-8 in FIG. 5F) while in response to the pinching component(s), the device shrinks the content (e.g., Photo-8 5014-8 in FIG. 5H is smaller than Photo-8 5014-8 in FIG. 5G). In other words, the content expands or shrinks as though it were printed on a sheet of rubber that is being stretched by the multi-contact gesture, where pinch gestures compress the sheet of rubber and de-pinch gestures expand the sheet of rubber.

In some embodiments, the device enlarges (637) the content associated with the respective thumbnail to the respective enlarged size is in accordance with the resizing metric (e.g., when the resizing metric increases by one hundred percent, the size of the content increases by one hundred percent, etc.). In some embodiments, the device enlarges (638) the content associated with the respective thumbnail to the respective enlarged size is proportional to the resizing metric (e.g., if the proportionality is ½x, then when the resizing metric increases by one hundred percent, the size of the content is increased by fifty percent).

In some embodiments, in response to detecting the first multi-contact gesture, the device translates (640) the content across the display in accordance with the first multi-contact gesture. In some embodiments, enlarging and translating of the content occur simultaneously. For example, in FIGS. 5B-5C, in addition to moving apart, contacts 5006 move to the left (e.g., from a second location 5006-*b* in FIG. 5B to a third location 5006-*c* in FIG. 5C) on the touch screen 112, and the device translates the content (e.g., representations 5008 of photos in FIG. 5C) to the left. As another example, in FIGS. 5G-5H, in addition to moving apart, contacts 5012 move to the right (e.g., from a second location 5012-*b* in FIG. 5G to a third location 50126-*c* in FIG. 5H) on the touch screen 112, and the device translates the content (e.g., Photo-8 5014-8) to the right.

In some embodiments, in response to detecting the first multi-contact gesture, the device rotates (642) the content. For example, in FIGS. 5F and 5G, as a primary axis 5016 between the first contact and the second contact rotates (e.g., in FIG. 5F, the primary axis 5016-*a* is substantially vertical, and in FIG. 5G the primary axis 5016 rotates six degrees counterclockwise from 5016-*a* to 5016-*b*), the content is rotated a corresponding amount (e.g., Photo-8 5014-8 is rotated six degrees counterclockwise, as illustrated in FIG. 5G). In some embodiments, enlarging, rotating and or translating of the content occur simultaneously, as illustrated in FIG. 5G, where Photo-8 5014-8 is simultaneously rotated counterclockwise and translated to the right.

In some embodiments, the one or more thumbnails includes a plurality of thumbnails (e.g., 5002-1, 5002-2, 5002-4 and/or 5005-4 in FIG. 5A-5C or 5008-1, 5008-2, 5008-3, 5008-4, 5008-5, 5008-6, 5008-7, 5008-9, 5008-10, 5008-11, 5008-12, 5008-13, 5008-14, and/or 5008-15 in FIG. 5F) other than the respective thumbnail (e.g., 5002-3 in FIG. 5A or 5008-8 in FIG. 5F), and when the resizing metric based on the first multi-contact gesture reaches a predefined threshold the device fades out (644) the plurality of thumbnails (e.g., as illustrated in FIG. 5C and in FIG. 5G). In some embodiments, this fading is smooth. In some embodiments, the device exhibits hysteresis behavior when fading the plurality of thumbnails. For example, in an embodiment employing hysteresis where the plurality of thumbnails are faded out when the resizing metric reaches an initial threshold, the plurality of thumbnails are not faded in until the resizing metric reaches a hysteresis threshold that is less than the initial threshold. It should be understood that employing hysteresis behavior in when fading out background reduces visual jitter in the display, by preventing the device from switching back and forth between the "faded in" state and the "faded out" state in response to small changes in the resizing metric when the resizing metric is close to the threshold value.

The device detects (650) termination of the first multi-contact gesture (e.g., detecting liftoff of the first contact and the second contact). Operations 654-694 are performed in response to detecting (652) termination of the first multi-contact gesture. When the resizing metric based on the first multi-contact gesture is (654) below a predefined threshold, the device ceases (655) to display the content at the respective enlarged size. For example, if the device detects a liftoff of contacts 5006-b in FIG. 5B, and the resizing metric is below the predefined threshold, the device ceases to display the representations 5008 of photos, and returns to the user interface that was displayed before detecting the contacts 5006, as illustrated in FIG. 5A. As another example, if the device detects a liftoff of contacts 5012-c in FIG. 5H, and the resizing metric is below the predefined threshold, the device ceases to display the photo 5014-8, and returns to the user interface that was displayed before detecting the contacts 5012, as illustrated in FIG. 5F.

In some embodiments, redisplaying the thumbnail includes displaying an animation of the content shrinking down to the size of the respective thumbnail, transforming into the respective thumbnail and moving back to the initial region of the respective thumbnail on the display. For example, in FIG. 5B, when the device detects a liftoff of contacts 5006-b, the device transitions from the user interface displayed in FIG. 5B (e.g., including representations 5008 of photos) to the user interface displayed in FIG. 5A (e.g., including thumbnail 5002-3) by displaying the representations 5008 of the photos moving together to form a pile of photos and transitioning to the thumbnail 5002-3. As another example, in FIG. 5I, when the device detects a liftoff of contacts 5012-c, the device transitions from the user interface displayed in FIG. 5I (e.g., including Photo-8 5014-8) to the user interface displayed in FIG. 5F (e.g., including content thumbnail 5008-8) by displaying Photo-8 5014-8 moving towards the region (e.g., 5010-8 in FIG. 5I) that previously included the content thumbnail (e.g., 5008-8 in FIG. 5F) for the photo, as illustrated in FIG. 5I.

In some embodiments, in response to detecting termination of the first multi-contact gesture, when the resizing metric based on the first multi-contact gesture is below the predefined threshold, the device redisplays (656) the respective thumbnail (e.g., album thumbnail 5002-3 in FIG. 5A or content thumbnail 5008-8 in FIG. 5F) in the initial region (e.g., 5004-3 in FIG. 5A or 5010-8 in FIG. 5F). In some embodiments, the respective thumbnail is redisplayed after the transition animation described above for transitioning between displaying the content and displaying the respective thumbnail for the content.

It should be understood that ceasing to display the content when the resizing metric is below the predefined threshold is particularly advantageous in situations where the user reviews the content (e.g., the representations 5008 of photos in an Album-3 or the full size photo 5014-8) without actually causing the device to perform an operation that opens the content. In other words, the user is able to preview the actual contents of the album and then cause the device to cease to display the previewed contents in a single gesture if the user decides that it is unnecessary to need to actually open the content. This preview operation is faster for the user and more computationally efficient for the computer and thus improves the speed and efficiency of the machine-user interface, thereby conserving energy and improving battery life.

When the resizing metric based on the first multi-contact gesture is above the predefined threshold, the device displays (658) the content on the display in a predefined arrangement. For example, in FIG. 5J, the device detects a liftoff of contacts 5012-b in FIG. 5G, and in response to detecting liftoff of the contacts 5012-b, the device expands and rotates the content (e.g., Photo-8 5014-8 in FIG. 5J) and displays the content in a predefined arrangement (e.g., Photo-8 5014-8 is displayed in a slideshow view in FIG. 5K).

In some embodiments, the predefined arrangement includes displaying the content at a predefined orientation. As one example, in FIGS. 5B-5F the representations 5008 of the photos have an orientation where one edge of each photo is determined to be a top the representation of the photo, and displaying the photos in the predefined arrangement includes displaying the photos with the top of the photo oriented towards the top of the touch screen 112, as illustrated in FIG. 5F. As another example, in FIGS. 5G-5K the photo 5014-8 has an orientation where one edge is determined to be the top of the photo, and displaying the photo in the predefined arrangement includes displaying the photos 5014-8 in a slideshow view with the top of the photo oriented towards the top of the touch screen 112, as illustrated in FIG. 5K. In some embodiments, the predefined arrangement includes displaying the content at a predefined size (e.g., a size that is small enough to fit in an M×N array on the touch screen 112, as illustrated in FIG. 5F or a size that is large enough to substantially fill the vertical or horizontal size of a display region of the touch screen 112, as illustrated in FIG. 5K).

In some embodiments, in response to detecting the first multi-contact gesture, the device rotates the content to an arbitrary angle (e.g., six degrees) in accordance with the first multi-contact gesture (e.g., a primary axis 5016 between the first and second contact is rotated from a first orientation 5016-a to a second orientation 5016-b and the content 5014-8 is rotated accordingly, as described in greater detail above with reference to FIG. 5G), and displaying the content on the display in the predefined arrangement includes snapping (660) the content to the predefined orientation, as illustrated in FIG. 5K, where Photo-8 5014-8 is displayed with the top of the photo proximate to a top of the display (e.g., touch screen 112).

In some embodiments, the content includes a plurality of content items (e.g., representations 5008 of the photos in FIG. 5C), and displaying the content on the display in the predefined arrangement includes displaying (662) the content items in a multi-row grid of components (e.g., representations 5008 of photos in a photo album "Album-3" are displayed in a grid or array on the display in FIGS. 5D-5F). In some embodiments, the device displays a transition animation of displaying the content on the display in the predefined arrangement. For example, as illustrated in FIG. 5D, the device moves at least a subset of the representations (e.g., 5008 in FIG. 5D) of the photos to respective average positions in the multi-row grid of components. Subsequently, as illustrated in FIG. 5E, the device rotates and/or resizes at least a subset of the representations (e.g., 5008-1, 5008-2 and 5008-3 in FIG. 5E) of the representations of the photos about their average positions, so that the representations (e.g., 5008 in FIG. 5F) of the photos are displayed at the predefined size and predefined orientation, as illustrated in FIG. 5F. For example, in FIG. 5E, the representation of Photo-2 5008-2 is reduced in size and rotated clockwise, while the representation of Photo-9 5008-9 is rotated counter clockwise and the representation of Photo-8 5008-8 is increased in size and rotated clockwise.

In some embodiments, displaying the content on the display in the predefined arrangement includes displaying (664) the content in a slideshow mode (e.g., Photo-8 5014-8 is displayed in a slideshow mode in FIG. 5K). In some embodiments, the content is an image (e.g., Photo-8), and the other respective thumbnails (e.g., thumbnails 5008-1, 5008-2, 5008-3, 5008-4, etc.) of the one or more thumbnails are associated with other respective images (e.g., 5014-1, 5014-2, 5014-3, 5014-4 respectively) that are also part of the slideshow (e.g., the previous image and the next image in the slideshow). In some of these embodiments, while the user interface is in slideshow mode (668), the device detects (669) a navigation input. In these embodiments, in response to detecting the navigation input, the device navigates (670) from the content to an adjacent image. As one example, the navigation input is a swipe gesture (e.g., leftward swipe gesture 5018 in FIG. 5K), and in response to detecting the swipe gesture, the device displays a next image in slideshow view (e.g., Photo-9 in FIG. 5014-9 in FIG. 5L). It should be understood that, in some embodiments when the swipe gesture is substantially opposite to the gesture, the device navigates through the slide show in an opposite direction (e.g., when the swipe is a rightward swipe instead of a leftward swipe, the device navigates to a previous image instead of navigating to a next image).

In some embodiments, enlarging the content includes resizing (672) the content to an arbitrary size (e.g., 5014-8 in FIG. 5G has been resized to an arbitrary size); displaying the content in a predefined arrangement in response to detecting termination of the first multi-contact gesture includes snapping the content to a predefined size (e.g., in FIG. 5J-5K, after ceasing to detect contacts 5012-*b* in FIG. 5G, the device snaps Photo-8 to a predefined size, as illustrated in FIG. 5K). It should be understood that the arbitrary size could be either larger or smaller than the predefined size. In some embodiments, the device detects (674) a third contact and a fourth contact (e.g., 5020 in FIG. 5K) on the touch-sensitive surface (e.g., touch screen 112). In these embodiments the device also detects (676) a second multi-contact gesture that includes the third contact and the fourth contact (e.g., the device detects a de-pinch gesture including movement of the contacts 5020 from a first position 5020-*a* in FIG. 5K to a second position 5020-*b* in FIG. 5M). In response to detecting the second multi-contact gesture, the device enlarges (678) the content to an enlarged size that is larger than the predefined size in accordance with the second multi-contact gesture (e.g., in FIG. 5K, prior to detecting the de-pinch gesture, the device displays Photo-8 5014-8 at the predefined size, and in FIG. 5M, after detecting the de-pinch gesture, the device displays Photo-8 5014-8 at a size that is larger than the predefined size. In these embodiments, the device also detects (680) termination of the second multi-contact gesture (e.g., the device detects liftoff of contacts 5020-*b* in FIG. 5M). After detecting termination of the second multi-contact gesture, the device continues (682) to display the content at the enlarged size (e.g., as illustrated in FIG. 5N).

In other words, in the embodiment described above, in a first content manipulation mode (as illustrated in FIGS. 5F-5J) when a plurality of thumbnails are displayed, and the user resizes content associated with one of the thumbnails to an arbitrary size the device either snaps the content to a predefined size or ceases to display the content and redisplays the thumbnail when the gesture ends; in contrast in a second content manipulation mode (e.g., as illustrated in FIGS. 5K and 5M-5N) when the content is displayed in a slideshow mode, and the user resizes the content to an arbitrary size, the device leaves the content at the arbitrary size when the gesture ends. The combination of these two modes (e.g., the first content manipulation mode where content snaps to a predefined size and the second content manipulation mode where content remains at an arbitrary size) is particularly advantageous in embodiments where the first content manipulation mode is primarily a content navigation mode where the user is navigating through a hierarchy, and the second content manipulation mode is primarily a content display mode. This embodiment is particularly advantageous in such circumstances, because in a content navigation mode a user is more likely to want to switch between levels (e.g., from viewing all of the photos in an album to viewing a single photo); while in a content display mode a user is more likely to want to view detail of the content (e.g., by zooming in to a particular part of a photo and panning around the photo). Thus this combination of modes produces a more efficient machine-user interface, thereby decreasing energy use and improving battery life.

In some embodiments, the one or more thumbnails include (684) the respective thumbnail and a plurality of other thumbnails arranged as an initial array of thumbnails (e.g., the multi-row arrangement of content thumbnails 5008 in FIG. 5G-5I where content thumbnail 5008-8 is not displayed); the content is a first image (e.g., 5014-8 in FIG. 5G); and displaying the content in a predefined arrangement includes displaying the first image in a slideshow mode (e.g., 5014-8 in FIG. 5K). In these embodiments, while in slideshow mode, the device navigates (686) from the first image to a subsequent image in the slideshow mode (e.g., in response to detecting user input). For example, in FIG. 5K, the device detects a contact 5022-*a* with a scrubber on the touch screen 112 and detects subsequent movement of the contact along the scrubber to a location (e.g., 5022-*b* in FIG. 5O) on the scrubber that corresponds to a subsequent image (e.g., Photo-15 5014-15 in the scrubber). In this example in response to detecting the contact 5022-*b* in FIG. 5O, the device navigates from the first image (e.g., Photo-8 5014-8 in FIG. 5K) to the subsequent image (e.g., Photo-15 5014-15 in FIG. 5O).

In these embodiments, while in slideshow mode, the device also detects a third contact and a fourth contact on the touch-sensitive surface (e.g., 5024-*a* in FIG. 5O). In these embodiments, the device also detects (688) a second multi-contact gesture that includes the third contact and the fourth contact (e.g., a pinch gesture that includes movement of the contacts 5024 from a first position 5024-*a* in FIG. 5O towards each other to a second position 5024-*b* in FIG. 5P). In some embodiments, the second multi-contact gesture also includes further movement of the contacts 5024 (e.g., rotation of the contacts 5024 from the second position 5024-*b* in FIG. 5P to a third position 5024-*c* in FIG. 5Q), and in response to the further movement of the contacts, the device moves the content in accordance with the further movement (e.g., in FIGS. 5P-5Q, the device rotates Photo-15 5014-15 in FIG. 5Q in accordance with the movement of the contacts from the second location 5024-*b* in FIG. 5P to the third location 5024-*c* in FIG. 5Q).

In some embodiments, in response to detecting the second multi-contact gesture, the device also exits (690) the slideshow mode (e.g., as illustrated in FIGS. 5P-5Q). In some embodiments, in response to detecting the second multi-contact gesture, the device also displays an updated array of content thumbnails that does not include a thumbnail for the subsequent image (e.g., no content thumbnail is displayed in region 5010-15 in FIG. 5Q); and, shrinks the subsequent image in accordance with the second multi-contact gesture (e.g., 5014-15 in FIG. 5P). In some embodiments, the updated array of content thumbnails does include a thumbnail for the first image (e.g., 5008-8 in FIG. 5Q), which indicates that the currently selected image is not the first image.

In some embodiments, the device also detects (692) termination of the second multi-contact gesture (e.g., detecting liftoff of the third contact and the fourth contact 5024-*c* in FIG. 5R). In these embodiments, in response to detecting termination of the second multi-contact gesture, the device displays (694) a thumbnail for the subsequent image in the updated array (e.g., 5008-15 in FIG. 5R). In some embodiments, the device displays an animation of the subsequent image shrinking and moving to a position in the updated array of thumbnails that corresponds to a location of a thumbnail for the subsequent image in the initial array of thumbnails (e.g., region 5010-15 in FIG. 5R). For example, in FIG. 5R, the device shrinks and rotates the content (e.g., Photo-15 from a first size and rotation 5014-15-*a* to a second size and rotation 5014-15-*b* in FIG. 5R) and finally displays the content thumbnail (e.g., 5008-15 in FIG. 5R) for the subsequent image (e.g., Photo-15 5014-15) in a region for the thumbnail (e.g., 5010-15 in FIG. 5R).

In some embodiments, operations 604-608 are performed prior to displaying (602) the respective thumbnail. In some embodiments, the device displays (604) a plurality of pins on a map (e.g., 5026 in FIG. 5S). In these embodiments, each of the pins is representative of content that is associated with a geographic location (e.g., a first pin 5026-1 is associated with San Francisco, Calif., a second pin 5026-2 is associated with Yellowstone Park, a third pin 5026-3 is associated with Santa Fe, N. Mex., and a fourth pin 5026-4 is associated with Fort Lauderdale Fla.). In these embodiments, each of the pins is displayed at a respective location on the map that corresponds to the geographic location of the content represented by the pin, as illustrated in FIG. 5S. In some embodiments, the device detects (606) a pin selection input (e.g., tap gesture 5028 in FIG. 5S) associated with a respective pin (e.g., 5026-1 in FIG. 5S) of the plurality of pins. In response to detecting the pin selection input, the device displays (608) the respective thumbnail (e.g., 5002-6 in FIG. 5T). In some embodiments, the respective thumbnail is displayed proximate to the respective pin (e.g., 5026-1 in FIG. 5T).

In these embodiments, the first contact and the second contact on the touch-sensitive surface are detected with the respective thumbnail (e.g., contacts 5030 with touch screen 112 in FIGS. 5T-5U), and the first multi-contact gesture that is detected by the device includes movement of the first contact and the second contact. For example, in FIGS. 5T-5U, the device detects a multi-contact gesture that includes movement of the first and second contacts 5030 away from each other from a first position 5030-*a* in FIG. 5T to a second position 5030-*b* in FIG. 5U. In some embodiments, the respective thumbnail is representative of respective content that is associated with a respective geographical location, the respective thumbnail is displayed on a map in a region on the map that corresponds to the respective geographical location associated with the content represented by the respective thumbnail, and, enlarging the content associated with the respective thumbnail includes displaying (696) the content associated with the respective thumbnail overlaid on the map. For example, in FIG. 5U, the device displays content (e.g., representations 5008 of photos in FIG. 5U) associated with a respective thumbnail (e.g., 5002-6 in FIG. 5T) overlaid over the map.

In some embodiments, when a resizing metric based on the first multi-contact gesture is below a predefined threshold, the device ceases to display the content at the respective enlarged size (e.g., the device displays the user interface including the respective thumbnail 5002-6, as illustrated in FIG. 5T).

In contrast, when the resizing metric based on the first multi-contact gesture is above the predefined threshold, the device displays the content on the display in a predefined arrangement. For example, the device displays the content in a multi-row array (e.g., the content thumbnails 5008 are displayed in a multi-row array in FIG. 5V).

Note that details of the processes described above with respect to method 600 (e.g., FIGS. 6A-6G, and 5A-5V) are also applicable in an analogous manner to the method described below. For example, the selectable objects and associated content described with reference to FIG. 7 may have one or more of the characteristics of the thumbnails and associated content described above with reference to method 600. For brevity, these details are not repeated below.

Figure 7:
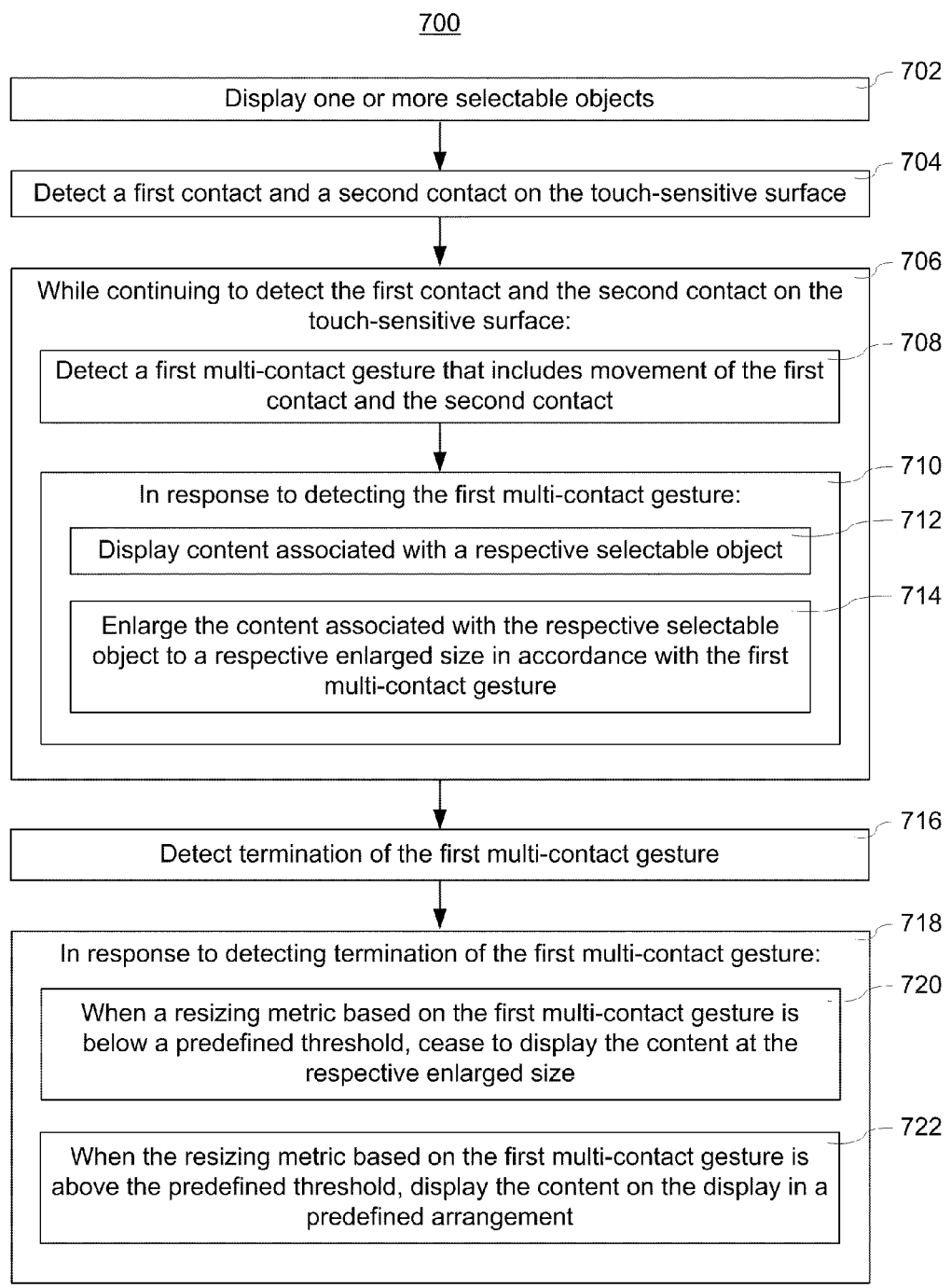
FIG. 7 is a flow diagram illustrating a method of displaying content associated with a selectable object in accordance with some embodiments.
Figure 8A:
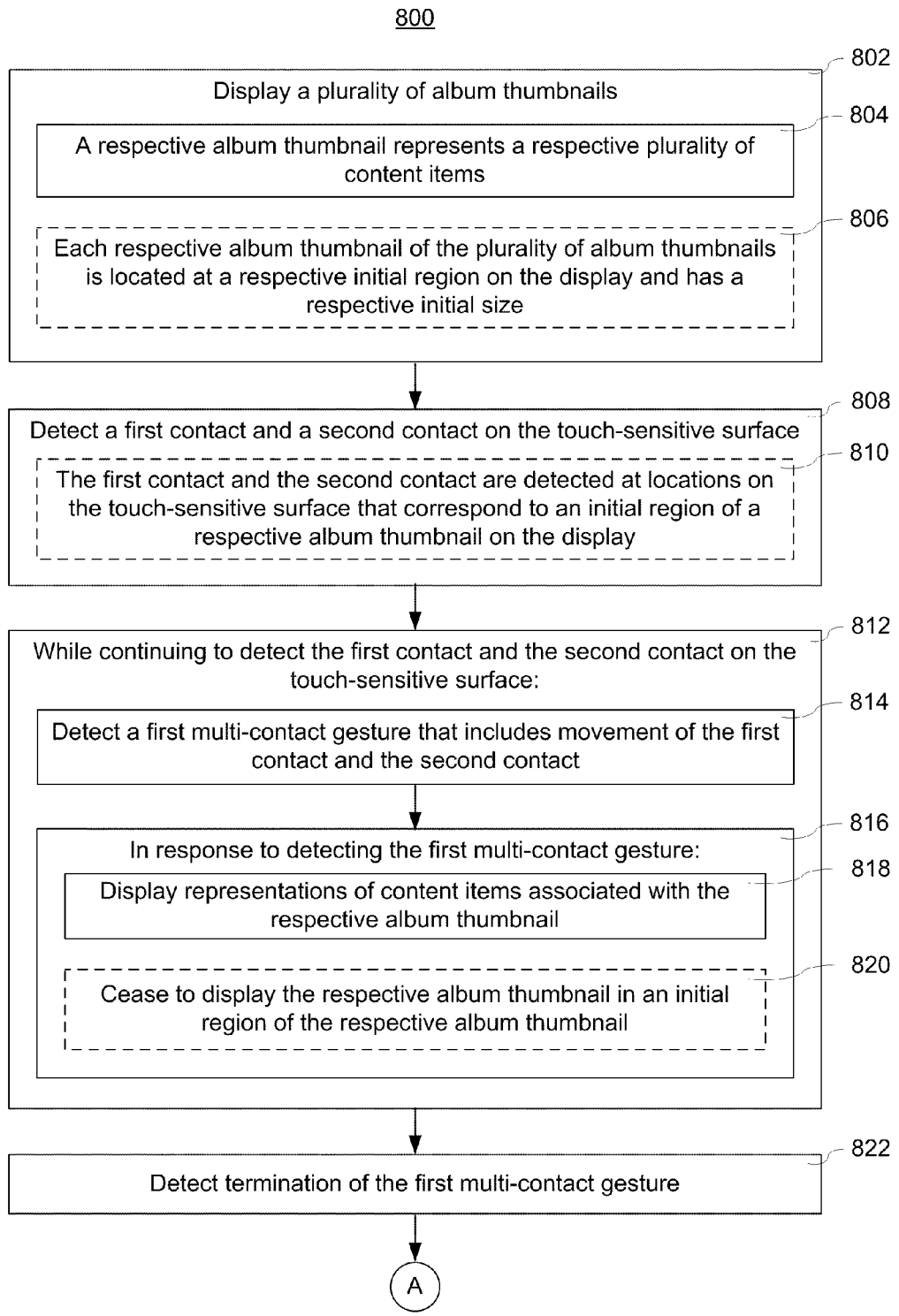
FIGS. 8A-8D are flow diagrams illustrating a method of displaying content associated with a thumbnail in accordance with some embodiments.
Figure 8B:
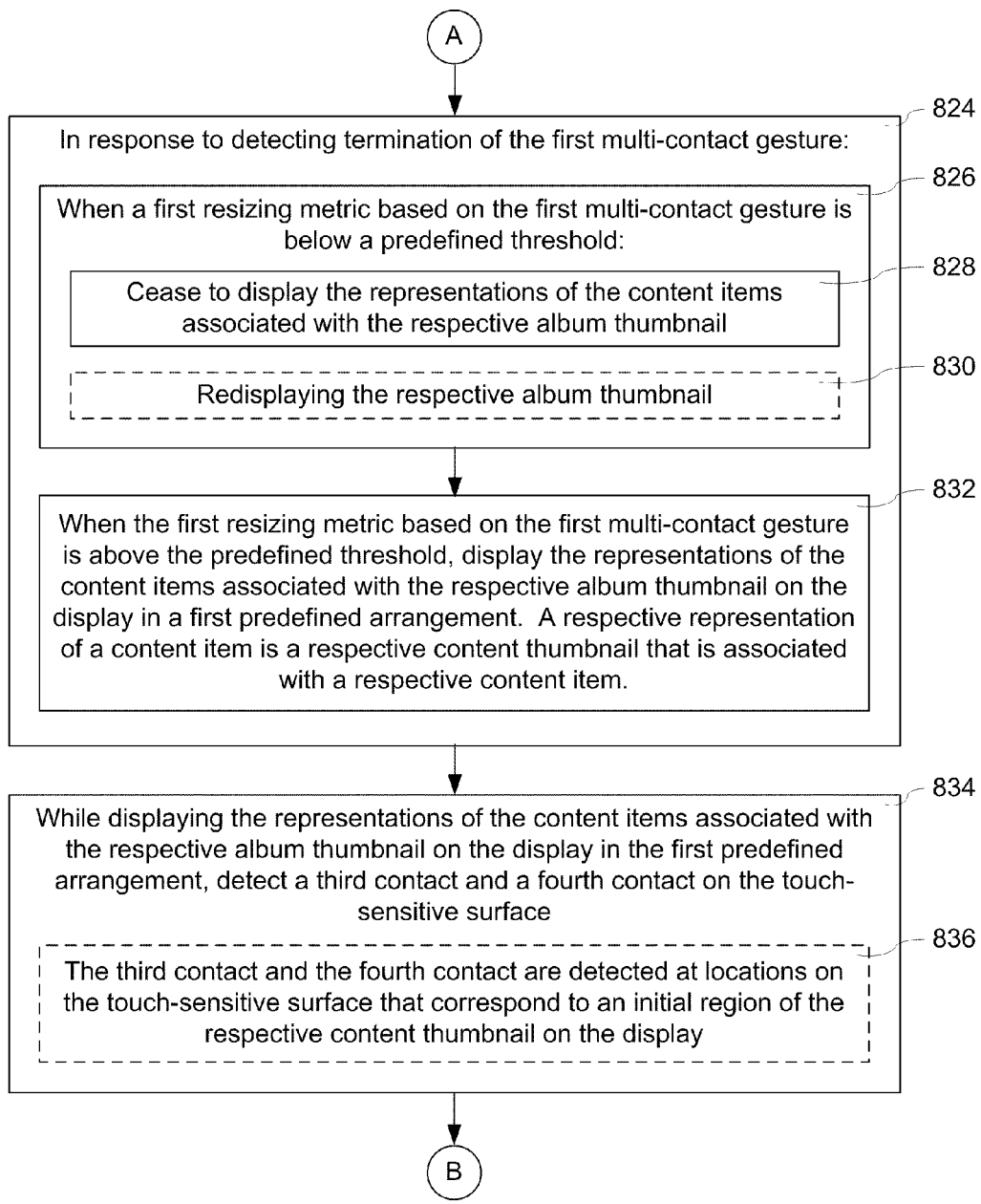
Figure 8C:
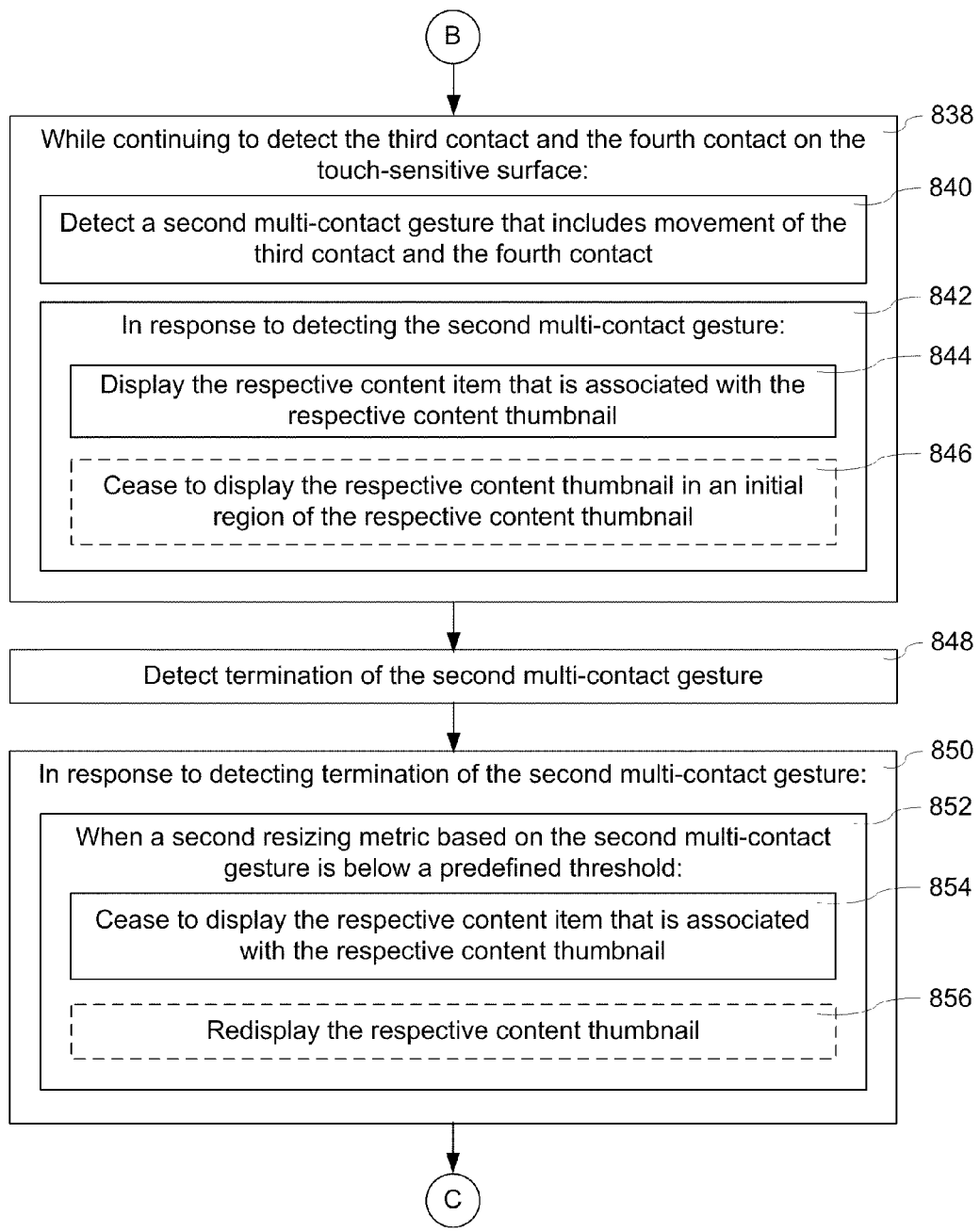
Figure 8D:
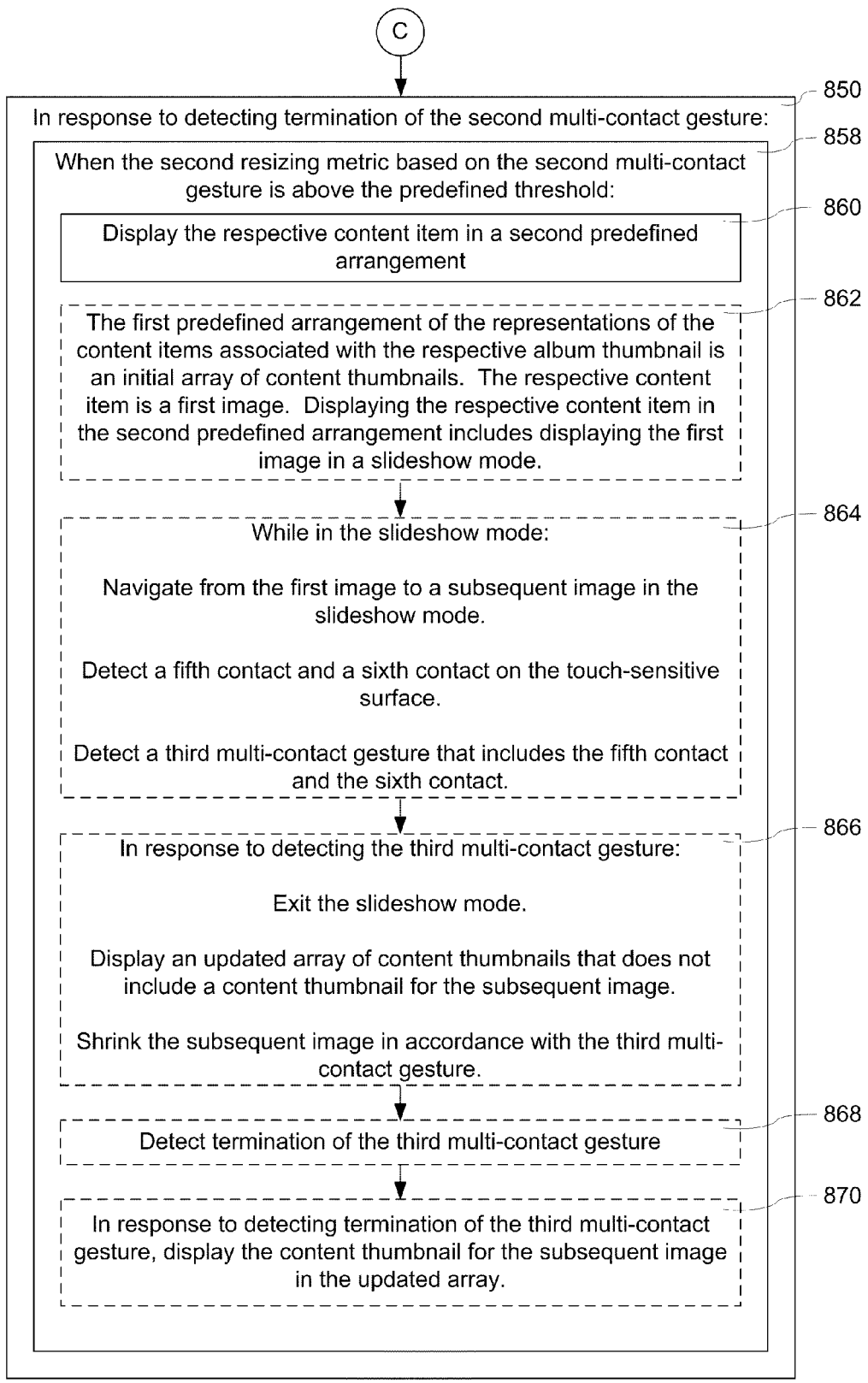
Figure 9A:
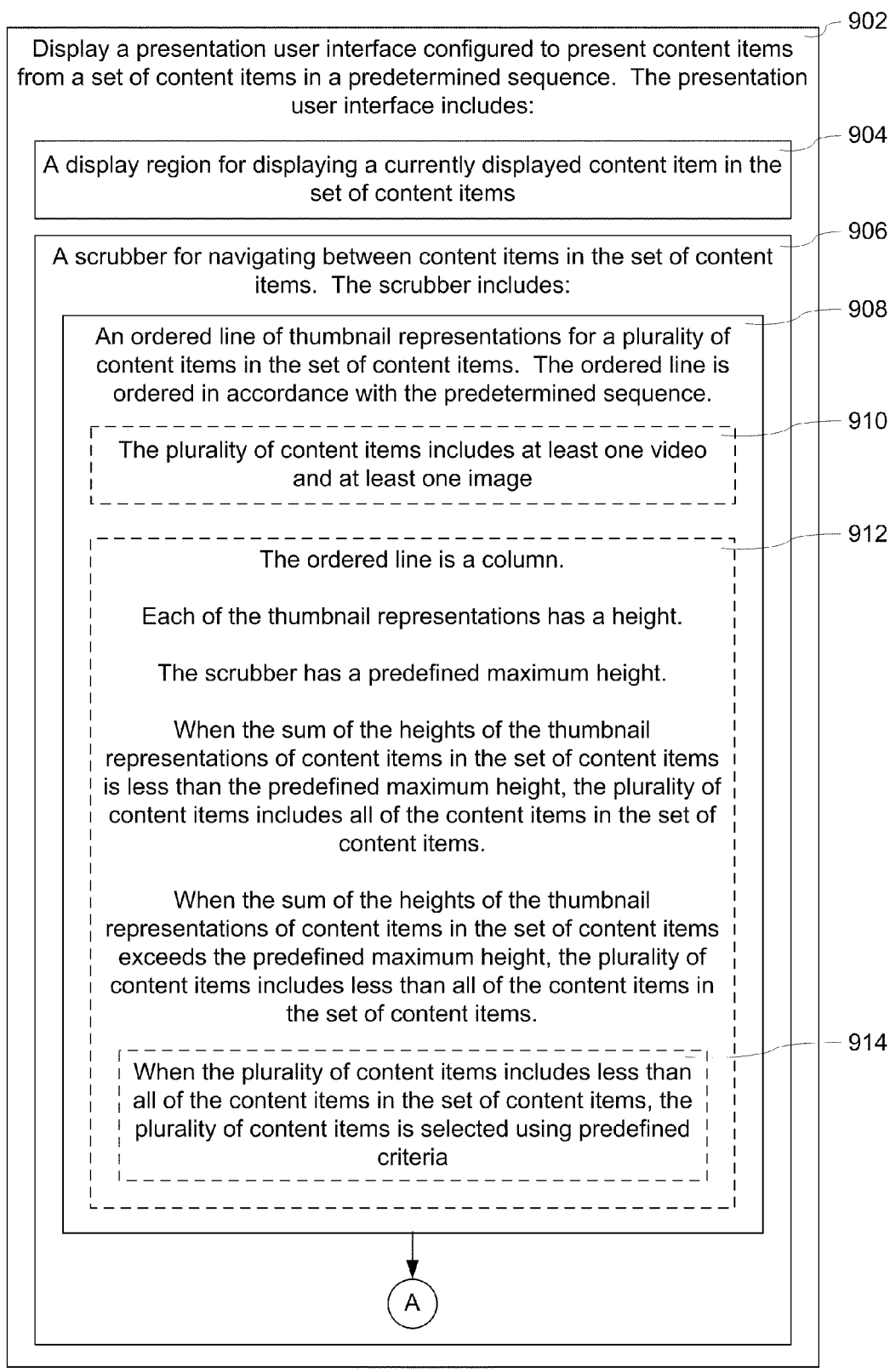
FIGS. 9A-9D are flow diagrams illustrating a method of navigating through content using a scrubber that includes thumbnail representations of content in accordance with some embodiments.
Figure 9B:
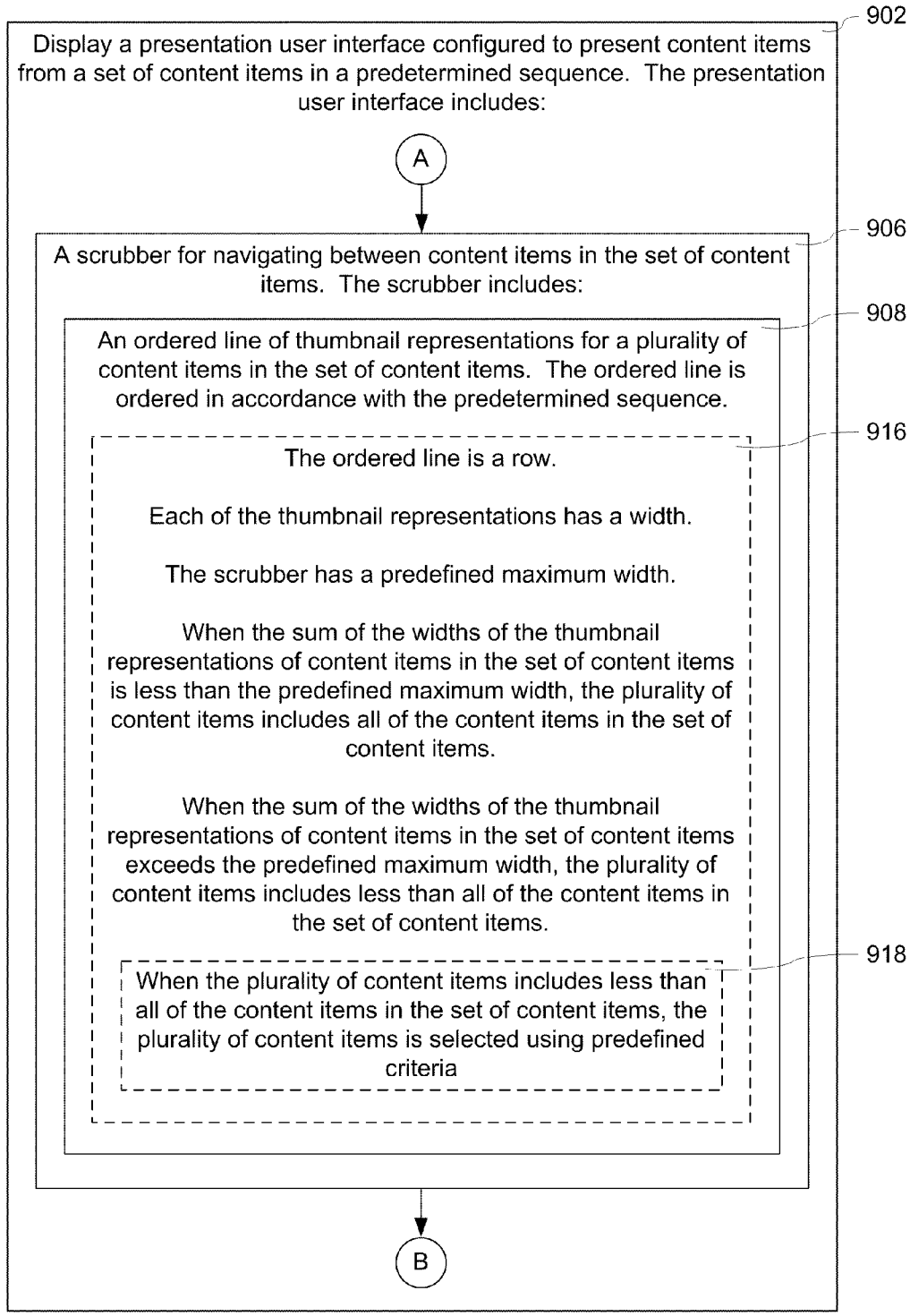
Figure 9C:
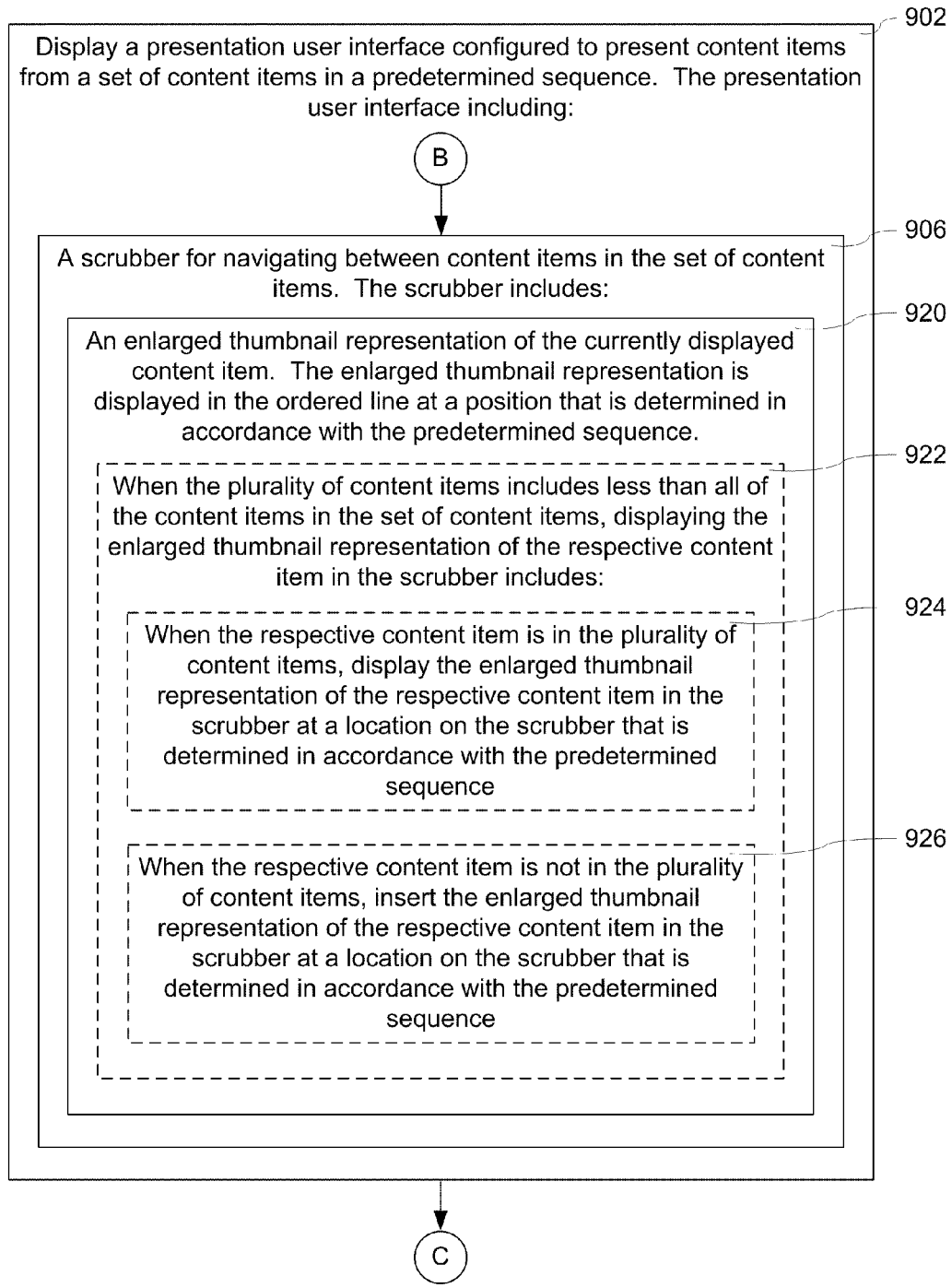
Figure 9D:
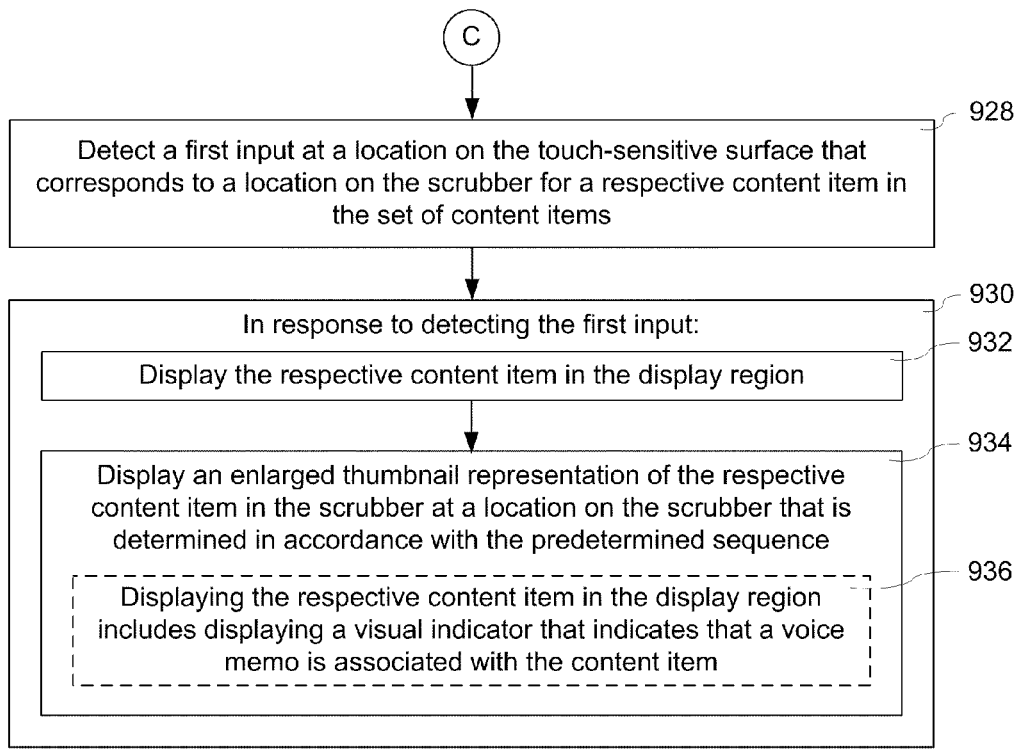

FIG. 7 is a flow diagram illustrating a method 700 of displaying content associated with a selectable object in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to display and navigate through content. The method reduces the cognitive burden on a user when displaying and navigating through content, thereby creating a more efficient human-machine interface. For battery-operated computing devices, enabling a user to display and navigate through content faster and more efficiently conserves power and increases the time between battery charges.

The device displays (702) one or more selectable objects (e.g., icons 5002 in FIG. 5A or pins 5026 in FIG. 5S). The device detects (704) a first contact and a second contact on the touch-sensitive surface (e.g., contacts 5006 in FIG. 5A or contacts 5032 in FIG. 5S).

Operations 708-714 are performed while continuing to detect (706) the first contact and the second contact on the touch-sensitive surface (e.g., contacts 5006 in FIG. 5A or contacts 5032 in FIG. 5S).

The device detects (708) a first multi-contact gesture that includes movement of the first contact and the second contact (e.g., movement of contacts 5006 away from a first location 5006-*a* in FIG. 5A away from each other to a second location 5006-*b* in FIG. 5B or movement of contacts 5032 away from a first location 5032-*a* in FIG. 5S away from each other to a second location 5032-*b* in FIG. 5U). Operations 712-714 are performed in response to detecting (710) the first multi-contact gesture. The device displays (712) content associated with a respective selectable object (e.g., representations 5008 of photos associated with album icon 5002 in FIG. 5B or representations 5008 of photos associated with pin 5026-1 in FIG. 5U). The device enlarges (714) the content (e.g., representations 5008 of photos in FIGS. 5B-5D) associated with the respective selectable object (e.g., album thumbnail 5002-3 in FIG. 5A) to a respective enlarged size in accordance with the first multi-contact gesture, as described above in greater detail with reference to FIGS. 5B-5D.

The device detects (716) termination of the first multi-contact gesture (e.g., detecting liftoff of the first contact and the second contact 5006 in FIG. 5C or detecting liftoff of the first contact and the second contact 5032-*b* in FIG. 5U). Operations 720-722 are performed in response to detecting (718) termination of the first multi-contact gesture. When a resizing metric based on the first multi-contact gesture is below a predefined threshold, the device ceases (720) to display the content at the respective enlarged size (e.g., and redisplays the album thumbnail 5002-3, as illustrated in FIG. 5A or redisplays the pin 5026-1 without any representations of associated photos, as illustrated in FIG. 5S). When the resizing metric based on the first multi-contact gesture is above the predefined threshold, the device displays (722) the content on the display in a predefined arrangement (e.g., representations 5008 of photos are displayed in a multi row array, as illustrated in FIG. 5F or FIG. 5V). In some embodiments, the content is displayed in a predefined orientation as well (e.g., each of the respective representations 5008 of a photo has a respective edge that is designated as a top of the photo, and displaying the photos in the predefined arrangement includes displaying the photos with the top of the photo oriented towards the top of the touch screen 112, as illustrated in FIGS. 5F and 5V).

Note that details of the processes described above with respect to method 600 (e.g., FIGS. 6A-6G, and 5A-5V) are also applicable in an analogous manner to the method described below. For example, the album thumbnails, the content thumbnails described with reference to FIGS. 8A-8D may have one or more of the characteristics of the thumbnails described above with reference to method 600. For brevity, these details are not repeated below. As another example, the representations of content and associated content described with reference to FIGS. 8A-8D may have one or more of the characteristics of the content described above with reference to method 600. For brevity, these details are not repeated below.

FIGS. 8A-8D are flow diagrams illustrating a method 800 of displaying content associated with a thumbnail in accordance with some embodiments. The method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to display and navigate through content. The method reduces the cognitive burden on a user when displaying and navigating through content, thereby creating a more efficient human-machine interface. For battery-operated computing devices, enabling a user to display and navigate through content faster and more efficiently conserves power and increases the time between battery charges.

The device displays (802) a plurality of album thumbnails (e.g., 5002 in FIG. 5A). A respective album thumbnail represents (804) a respective plurality of content items (e.g., the album thumbnail is a selectable object with a reduced scale image that represents an album that includes a plurality of digital images). In some embodiments, each respective album thumbnail of the plurality of album thumbnails (e.g., 5002 in FIG. 5A) is located (806) at a respective initial region (e.g., 5004 in FIG. 5A) on the display and has a respective initial size. For example, the album thumbnail 5002-3 for Album-3 is displayed at a respective initial region 5004-3 in FIG. 5A.

The device detects (808) a first contact and a second contact (e.g., 5006 in FIG. 5A) on the touch-sensitive surface (e.g., touch screen 112). In some embodiments, the first contact and the second contact are detected (810) at locations on the touch-sensitive surface that correspond to an initial region of a respective album thumbnail on the display (e.g., the contacts 5006 are detected on the touch screen 112 within the initial region 5004-3 for the album thumbnail 5002-3 for Album-3 in FIG. 5A).

Operations 814-820 are performed while continuing to detect (812) the first contact and the second contact on the touch-sensitive surface.

The device detects (814) a first multi-contact gesture that includes movement of the first contact and the second contact (e.g., the device detects movement of contacts 5006 from a first location 5006-a in FIG. 5A away from each other to a second location 5006-b in FIG. 5B and subsequently to a third location 5006-c in FIG. 5C). Operations 818-820 are performed in response to detecting (816) the first multi-contact gesture. The device displays (818) representations (e.g., content thumbnails 5008 in FIG. 5B) of content items associated with the respective album thumbnail (e.g., 5002-3 in FIG. 5A). In some embodiments, the representations of the content items are initially displayed at a size that corresponds to an initial size of the respective album thumbnail and at a location that is proximate to the initial region of the respective album thumbnail on the display. For example, in FIG. 5B, the content thumbnails 5008 are displayed at a size that is approximately equal to a size of the album thumbnail 5002-3, and they are displayed proximate to the initial region 5004-3 if the album thumbnail 5002-3.

In some embodiments, in response to detecting the first multi-contact gesture, the device ceases (820) to display the respective album thumbnail in an initial region of the respective album thumbnail (e.g., in FIG. 5B, after the first multi-contact gesture has been detected, the album thumbnail 5002-3 for Album-3 is not displayed). In some embodiments, ceasing to display the respective album thumbnail in the initial region includes displaying an animation of the respective album thumbnail moving from its initial position on the display to a position on the display that is associated with the first multi-contact gesture and transitioning the respective album thumbnail (e.g., 5002-3 in FIG. 5A) to the representations of content items (e.g., content thumbnails 5008 in FIG. 5B) that are associated with the respective album thumbnail. For example, in FIGS. 5A-5B, the device displays an animation of a smooth transition between the thumbnail (e.g., 5002-3 in FIG. 5A) that represents an album of photos, and a plurality of representations (e.g., 5008 in FIGS. 5B-5C) of individual photos that are associated with the thumbnail.

The device detects (822) termination of the first multi-contact gesture (e.g., by detecting liftoff of the first contact and the second contact 5006). Operations 826-830 are performed in response to detecting (824) termination of the first multi-contact gesture.

Operations 828-830 are performed (826) when a first resizing metric based on the first multi-contact gesture is below a predefined threshold (e.g., when the device detects a liftoff of contacts 5006-b in FIG. 5B). The device ceases (828) to display the representations of the content items associated with the respective album thumbnail. In some embodiments, the device also redisplays (830) the album thumbnail at the initial region on the display in the plurality of album thumbnails. For example, when the first resizing metric is below a predefined threshold, (e.g., as illustrated in FIG. 5B), the device returns the user interface to the configuration that was displayed prior to detecting the first multi-contact gesture (e.g., a user interface that does not include the content thumbnails 5008 and includes the respective album thumbnail 5002-3, as illustrated in FIG. 5A).

When the first resizing metric based on the first multi-contact gesture is above the predefined threshold, the device displays (832) the representations of the content items associated with the respective album thumbnail on the display in a first predefined arrangement (e.g., in a multi-row grid, as illustrated in FIG. 5F). A respective representation of a content item is a respective content thumbnail (e.g., 5008 in FIGS. 5D-5F) that is associated with a respective content item. In some embodiments, the device displays a transition animation of displaying the content on the display in the predefined arrangement. For example, as illustrated in FIG. 5D, the device moves at least a subset of the representations of the content items (e.g., content thumbnails 5008 in FIG. 5D) to respective average positions in the multi-row grid of components. Subsequently, as illustrated in FIG. 5E, the device rotates and/or resizes at least a subset of the content thumbnails (e.g., 5008-1, 5008-2, 5008-3, and 5008-4 in FIG. 5E) about their respective average positions, so that the content thumbnails (e.g., 5008 in FIG. 5F) are displayed at the predefined size and predefined orientation, as illustrated in FIG. 5F. For example, in FIG. 5E, the representation of Photo-2 5008-2 is reduced in size and rotated clockwise, while the representation of Photo-9 5008-9 is rotated counterclockwise and the representation of Photo-8 5008-8 is increased in size and rotated clockwise.

While displaying the representations of the content items associated with the respective album thumbnail on the display in the first predefined arrangement, the device detects (834) a third contact and a fourth contact on the touch-sensitive surface (e.g., contacts 5012 in FIG. 5F). In some embodiments, the third contact and the fourth contact are detected (836) at locations on the touch-sensitive surface that correspond to an initial region (e.g., 5010-8 in FIG. 5F) of the respective content thumbnail (e.g., 5008-8 in FIG. 5F) on the display.

Operations 840-846 are performed while continuing to detect (838) the third contact and the fourth contact on the touch-sensitive surface (e.g., 5012 in FIGS. 5F-5H). The device detects (840) a second multi-contact gesture that includes movement of the third contact and the fourth contact. For example, in FIGS. 5F-5H, the device detects a multi-contact gesture that includes movement of the third and fourth contacts 5012 away from each other from a first position 5012-a in FIG. 5F to a second position 5012-b in FIG. 5G, and finally a towards each other at a third position 5012-c in FIG. 5H.

In response to detecting (842) the second multi-contact gesture, the device displays (844) the respective content item (e.g., 5014-8 in FIGS. 5G-5H) that is associated with the respective content thumbnail (e.g., 5008-8 in FIG. 5F). In some embodiments, the content item is initially displayed at a size that corresponds to the initial size of the respective content thumbnail and a location that is proximate to the initial region (e.g., 5010-8 in FIG. 5F) of the respective content thumbnail (E.g., 5008-8 in FIG. 5F) on the display. In some embodiments, the content thumbnail (e.g., 5008-8 in FIG. 5F) is replaced with the content item (e.g., 5014-8 in FIG. 5G) associated with the content thumbnail so as to indicate that the content thumbnail includes the content item. In some embodiments, in response to detecting the second multi-contact gesture (e.g., movement of contacts 5012 in FIGS. 5F-5H), the device ceases (846) to display the respective content thumbnail (e.g., 5008-8 in FIG. 5F), as illustrated in FIGS. 5G-5I.

The device detects (848) termination of the second multi-contact gesture (e.g., detecting liftoff of the third contact and the fourth contact).

Operations 852-870 are performed in response to detecting (850) termination of the second multi-contact gesture. Operations 854-856 are performed when a second resizing metric based on the second multi-contact gesture is (852) below a predefined threshold, the device ceases (854) to display the respective content item that is associated with the respective content thumbnail. In some embodiments, the device also redisplays (856) the respective content thumbnail. For example, in FIG. 5I, when the device detects a liftoff of contacts 5012-c, the device transitions from the user interface displayed in FIG. 5I (e.g., including Photo-8 5014-8) to the user interface displayed in FIG. 5F by displaying Photo-8 5014-8 moving towards the region (e.g., 5010-8 in FIG. 5I) that previously included the content thumbnail for the photo, as illustrated in FIG. 5I.

Operations 860-870 are performed when the second resizing metric based on the second multi-contact gesture is above the predefined threshold (858). The device displays (860) the respective content item in a second predefined arrangement. In some embodiments, the content item is displayed at a predefined size (e.g., as a full-screen image in a slideshow of images from the album). For example, in FIG. 5J, the device detects a liftoff of contacts 5012-b in FIG. 5G, and in response to detecting liftoff of the contacts 5012-b, the device expands and rotates the content (e.g., Photo-8 5014-8 is expanded and rotated in FIG. 5J) and displays the content in a predefined arrangement (e.g., Photo-8 5014-8 is displayed in a slideshow view in FIG. 5K).

In some embodiments, the first predefined arrangement of the representations of the content items associated with the respective album thumbnail is (862) an initial array of content thumbnails (e.g., the array of content thumbnails 5008 in FIG. 5F); the respective content item is a first image (e.g., content item 5014-8 is a photo); displaying the respective content item in the second predefined arrangement includes displaying the first image in a slideshow mode (e.g., as illustrated in FIG. 5K). In these embodiments, while in the slideshow mode, the device navigates (864) from the first image (e.g., Photo-8 5014-8 in FIG. 5K) to a subsequent image (e.g., Photo-15 5014-15 in FIG. 5K) in the slideshow mode (e.g., in response to detecting user inputs such as movement of contact 5022 along a scrubber from a first position 5022 in FIG. 5K to a second position 5022-b in FIG. 5O).

While displaying the subsequent image (e.g., Photo-15, 5014-15 in FIG. 5K, the device detects a fifth contact and a sixth contact (e.g., contacts 5024 in FIG. 5O) on the touch-sensitive surface; and detects a third multi-contact gesture that includes the fifth contact and the sixth contact (e.g., a pinch gesture that includes movement of the contacts 5024 from a first position 5024-a in FIG. 5O towards each other to a second position 5024-b in FIG. 5P). In some embodiments, the second multi-contact gesture also includes further movement of the contacts 5024 (e.g., rotation of the contacts 5024 from the second position 5024-b in FIG. 5P to a third position 5024-c in FIG. 5Q), and in response to the further movement of the contacts, the device moves the content in accordance with the further movement (e.g., in FIGS. 5P-5Q, the device rotates Photo-15 5014-15 in FIG. 5Q in accordance with the movement of the contacts from the second location 5024-b in FIG. 5P to the third location 5024-c in FIG. 5Q).

In some embodiments, in response to detecting the third multi-contact gesture, the device exits (866) the slideshow mode (e.g., as illustrated in FIGS. 5P-5Q). In response to detecting the third multi-contact gesture the device also displays an updated array of content thumbnails that does not include a content thumbnail for the subsequent image (e.g., the array of content thumbnails 5008 in FIG. 5P does not include a content thumbnail in the region 5010-15 that is associated with the subsequent image); and, shrinks the subsequent image (e.g., 5014-15 in FIG. 5P) in accordance with the third multi-contact gesture. In these embodiments, the device also detects (868) termination of the third multi-contact gesture (e.g., detecting liftoff of the fifth contact and the sixth contact 5024-c in FIG. 5R). In response to detecting termination of the third multi-contact gesture, the device displays (870) the content thumbnail for the subsequent image in the updated array (e.g., the device displays content thumbnail 5008-15 in the region 5010-15 that is associated with the subsequent image in FIG. 5R). In these embodiments, the device displays an animation of the subsequent image shrinking and moving to a position in the updated array of content thumbnails that corresponds to a location of the content thumbnail for the subsequent image in the initial array of content thumbnails. For example, in FIG. 5R, the device shrinks and rotates the content (e.g., Photo-15 from a first size and rotation 5014-15-*a* to a second size and rotation 5014-15-*b* in FIG. 5R) and finally displays the thumbnail (e.g., 5008-15 in FIG. 5R) for the subsequent image (e.g., Photo-15 5014-15) in the region (e.g., 5010-15 in FIG. 5R) that is associated with the subsequent image.

FIGS. 9A-9D are flow diagrams illustrating a method 900 of navigating through content using a scrubber that includes thumbnail representations of content in accordance with some embodiments. The method 900 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to navigate through content. The method reduces the cognitive burden on a user when navigating through content, thereby creating a more efficient human-machine interface. For battery-operated computing devices, enabling a user to navigate through content faster and more efficiently conserves power and increases the time between battery charges.

The device displays (902) a presentation user interface configured to present content items (e.g., photos 5014 in FIGS. 5W-5BB) from a set of content items in a predetermined sequence (e.g., a slide show with digital photographs, images, and/or videos). The presentation user interface includes: a display region (e.g., 5034 in FIGS. 5W-5BB) for displaying (904) a currently displayed content item in the set of content items (e.g., 5014 in FIGS. 5W-5BB). The presentation user interface also includes a scrubber (e.g., 5036 in FIGS. 5W-5BB) for navigating (906) between content items in the set of content items. The scrubber includes: an ordered line (e.g., a row or a column) of thumbnail representations (e.g., 5038 in FIGS. 5W-5BB) for a plurality of content items in the set of content items. For example, in FIGS. 5W-5BB, thumbnail representation T1 5038-1 is associated with Photo-1, thumbnail representation T3 5038-3 is associated with Photo-3, etc.

The ordered line is ordered (908) in accordance with the predetermined sequence. For example, the photos are arranged in ascending numerical order (e.g., ordered from Photo-1 to Photo-2 to Photo-3, etc.) and the thumbnail representations are ordered in accordance with the ascending numerical order of the photos with which they are associated (e.g., ordered from T1 to T2, to T3, etc.) In some embodiments, the plurality of content items includes (910) at least one video and at least one image. For example, Photo-8 in FIG. 5W is a representative video frame from a video, and in response to detecting a video play input (e.g., a tap gesture 5040 on a video playback icon 5042) the device plays video associated with the respective video frame (e.g., Photo-8).

In some embodiments, the ordered line is (912) a column (e.g., as illustrated in FIGS. 5W-5X); each of the thumbnail representations (e.g., 5038 in FIGS. 5W-5X) has a height; the scrubber (e.g., 5036 in FIG. 5X) has a predefined maximum height. In some embodiments, when the sum of the heights of the thumbnail representations of content items in the set of content items is less than the predefined maximum height, the plurality of content items that are represented by thumbnail representations includes all of the content items in the set of content items (e.g., as illustrated in FIG. 5W, where thumbnail representations 5038 or expanded thumbnail representations 5044 are shown for all nine content items in the set of content items). In other words, in these embodiments, the scrubber includes thumbnails for each image in the set of images. In some embodiments, when the sum of the heights of the thumbnail representations of content items in the set of content items exceeds the predefined maximum height, the plurality of content items that are represented by thumbnail representations includes less than all of the content items in the set of content items (e.g., as illustrated in FIG. 5X, where thumbnail representations 5038 are shown for only thirteen of the thirty two content items). In other words, in these embodiments, the scrubber includes thumbnails for only a subset of the images in the set of images. For example, in FIG. 5X, thumbnail representations are displayed for Photo-1, Photo-3, Photo-6, Photo-11, (e.g., thumbnails 5038-1, 5038-3, 5038-6 and 5038-11 respectively) but no thumbnail representations are displayed for Photo-2, Photo-4 or Photo-7. In some embodiments, when the plurality of content items includes less than all of the content items in the set of content items, the plurality of content items is selected (914) using predefined criteria (e.g., "every other content item" or "every third content item" is selected to be included in the plurality of content items that have thumbnail representations in the scrubber).

In some embodiments, the ordered line is (916) a row (e.g., as illustrated in FIGS. 5Y-5Z); each of the thumbnail representations (e.g., 5038 in FIGS. 5Y-5Z) has a width; the scrubber has a predefined maximum width (e.g., 5036 in FIG. 5Z). In some embodiments, when the sum of the widths of the thumbnail representations of content items in the set of content items is less than the predefined maximum width, the plurality of content items includes all of the content items in the set of content items (e.g., as illustrated in FIG. 5Y, where thumbnail representations 5038 or expanded thumbnail representations 5044 are shown for all twelve content items in the set of content items). In other words, in these embodiments, the scrubber includes thumbnails for each image in the set of images. In some embodiments, when the sum of the widths of the thumbnail representations of content items in the set of content items exceeds the predefined maximum width, the plurality of content items includes less than all of the content items in the set of content items (e.g., as illustrated in FIG. 5Z, where thumbnail representations 5038 are shown for only fifteen of the thirty two content items). In other words, in these embodiments, the scrubber includes thumbnails for only a subset of the images in the set of images. For example, in FIG. 5Z, thumbnail representations are displayed for Photo-1, Photo-3, Photo-5, Photo-7, (e.g., thumbnails 5038-1, 5038-3, 5038-5 and 5038-7 respectively) but no thumbnail representations are displayed for Photo-2, Photo-4 or Photo-6. In some of these embodiments, when the plurality of content items includes less than all of the content items in the set of content items, the plurality of content items is selected (918) using predefined criteria (e.g., "every other content item" or "every third content item" is selected to be included in the plurality of content items that have thumbnail representations in the scrubber).

The scrubber also includes an enlarged thumbnail representation (e.g., 5044 in FIGS. 5W-5BB) of the currently displayed content item. For example, in FIG. 5Z, the currently displayed content item is Photo-9 5014-9 and the enlarged thumbnail representation is ET9 5044-9, while in FIG. 5AA, the currently displayed content item is Photo-15 5014-15 and the enlarged thumbnail representation is ET15 5044-15, and in FIG. 5BB, the currently displayed content item is Photo-20 5014-20 and the enlarged thumbnail representation is ET20 5044-20.

The enlarged thumbnail representation is (920) displayed in the ordered line at a position that is determined in accordance with the predetermined sequence. For example, in FIG. 5Z, the enlarged thumbnail ET9 5044-9 which is an enlarged thumbnail representation for Photo-9 5014-9 is displayed in between the thumbnail representation T7 5038-7 which is a thumbnail representation for Photo-7 and the thumbnail representation T11 5038-11 which is a thumbnail representation for Photo-11.

In some embodiments, when the plurality of content items includes less than all of the content items in the set of content items (e.g., as illustrated in FIGS. 5Z-5BB), the operation that is performed when displaying (922) the enlarged thumbnail representation of the respective content item in the scrubber is dependant on whether the respective content item is in the plurality of content items.

When the respective content item is in the plurality of content items, displaying the enlarged thumbnail representation of the respective content item includes displaying (924) the enlarged thumbnail representation of the respective content item in the scrubber at a location on the scrubber that is determined in accordance with the predetermined sequence. For example, in FIG. 5W, the expanded thumbnail representation 5044-8 of Photo-8 replaces a thumbnail representation of Photo-8 that would otherwise be displayed between the thumbnail representation 5038-7 of Photo-7 and the thumbnail representation 5038-9 of Photo-9 in FIG. 5W.

In contrast, when the respective content item is not in the plurality of content items, displaying the enlarged thumbnail representation of the respective content item includes inserting (926) the enlarged thumbnail representation of the respective content item in the scrubber at a location on the scrubber that is determined in accordance with the predetermined sequence. It should be understood that in order to display the enlarged thumbnail representation in this case, the other thumbnail representations in the scrubber will have to be adjusted (e.g., by removing a previously displayed thumbnail representation for another content item, or decreasing the size of one or more adjacent thumbnail representations). For example, in FIG. 5X, the expanded thumbnail representation 5044-8 of Photo-8 replaces a thumbnail representation of Photo-9 that would otherwise be displayed between the thumbnail representation 5038-6 of Photo-6 and the thumbnail representation 5038-11 of Photo-11 in FIG. 5X.

The device detects (928) a first input on the touch-sensitive surface that corresponds to a location on the scrubber for a respective content item in the set of content items. As one example, the device detects movement of the contact (e.g., movement of contact 5046 from a first location 5046-*a* in FIG. 5Z) to a location (e.g., 5046-*b* in FIG. 5AA) on the touch-sensitive surface that corresponds to a location on the scrubber for a respective content item (e.g., Photo-15 5014-15 in FIG. 5AA) in the set of content items where a thumbnail representation of the respective content item is displayed in the scrubber (e.g., thumbnail representation 5038-15 was displayed in the scrubber 5036 in FIG. 5Z). As another example, the device detects movement of the contact (e.g., movement of contact 5046 from a first location 5046-*a* in FIG. 5Z) to a location (e.g., 5046-*c* in FIG. 5BB) on the touch-sensitive surface that corresponds to a location on the scrubber for a respective content item (e.g., Photo-20 5014-20 in FIG. 5BB) in the set of content items where a thumbnail representation of the respective content item is not displayed in the scrubber (e.g., no thumbnail representation for Photo-20 was displayed in the scrubber 5036 in FIG. 5Z).

Operations 932-936 are performed in response to detecting (930) the first input. The device displays (932) the respective content item in the display region (e.g., Photo-15 5014-15 is displayed in content region 5034 in FIG. 5AA or Photo-20 5014-20 is displayed in content region 5034 in FIG. 5BB). The device also displays (934) an enlarged thumbnail representation of the respective content item in the scrubber at a location on the scrubber that is determined in accordance with the predetermined sequence (e.g., the device displays an enlarged thumbnail representation 5044-15 for Photo-15 in the scrubber 5036 in FIG. 5AA or the device displays and enlarged thumbnail representation 5044-20 for the scrubber 5036 in FIG. 5BB). In other words, the enlarged thumbnail representation of the respective content item for the respective content item (e.g., the enlarged thumbnail representation 5044-15 for Photo-15 in FIG. 5AA or the enlarged thumbnail representation 5044-20 for Photo-20 in FIG. 5BB) is displayed when the respective content item is selected, without regard for whether or not a thumbnail representation of the respective content item was displayed in the scrubber before the respective content item was selected.

It should be understood that, in some embodiments, the device displays an expanded thumbnail representation for each content item in the set of content items as the contact (e.g., 5046 in FIGS. 5Z-5BB) moves over a location on the scrubber that is associated with the content item, even if a thumbnail representation 5038 of the content item is not displayed in the scrubber. For example, in FIGS. 5Z-5AA when the device detects movement of the contact 5046 from the first position (e.g., 5046-*a* in FIG. 5Z) to the second position (e.g., 5046-*b* in FIG. 5AA) and the contact 5046 passes through locations on the scrubber that are associated with Photo-9, Photo-10, Photo-11, Photo-12, Photo-13, Photo-14 and Photo-15, and the device displays expanded thumbnail representations of each of these photos, even though the scrubber only includes thumbnail representations for a subset of these content items (e.g., thumbnail representation 5038-11 for Photo-11, thumbnail representation 5038-13 for Photo-13 and thumbnail representation 5038-15 for Photo-15 in FIG. 5Z).

When displaying a navigation interface for navigating through a set of content items, it is particularly advantageous to display a scrubber that includes thumbnail representations of a plurality of the content items in a set of content items, so that the user can readily determine which portion of the scrubber is associated with which content items in the set of content items (e.g., by looking a the thumbnail representations that are displayed in the scrubber). However, when the scrubber has a fixed length or width (e.g., the length or width of the display), as the number of content items in the set of content items increases, the thumbnail representations must decrease in size, and if the device continues to decrease the thumbnail representations in size, then the thumbnail representations cease to provide any visual indication of which portion of the scrubber is associated with which content items in the set of content items. However, by displaying thumbnail representations for only a subset of the content items, the device continues to provide the user with visual cues as to which portion of the scrubber is associated with which content items in the set of content items even as the number of content items increases beyond the number of thumbnail representations that can be displayed in the scrubber.

However, displaying thumbnail representations for only a subset of the content items, may create cognitive dissonance for the user when the user provides an input that corresponds to a respective location of the scrubber that includes a thumbnail representation for a first content item, and the device selects a second item that is associated with the respective location on the scrubber. Displaying an expanded thumbnail representation of the content item associated with the current location on the scrubber, as described above, avoids creating cognitive dissonance for the user, reducing confusion and increasing speed and accuracy of the user, thereby creating a more efficient machine-user interface.

In some embodiments, displaying the respective content item in the display region includes displaying (936) a visual indicator (e.g., voice memo indicator icon 5048 in FIG. 5BB) that indicates that a voice memo is associated with the content item. In some embodiments, detecting a voice memo playback input (e.g., tap gesture 5050 on voice memo indicator icon 5048 on the touch screen 112 in FIG. 5BB) the device plays back the voice memo (e.g., a voice memo associated with Photo-20 5014-20 in FIG. 5BB). In some embodiments the device plays back the voice memo while continuing to display the navigation user interface. In some embodiments, the device switches to a different user interface (e.g., a dedicated audio playback application) to play the voice memo.

It should be understood that while the preceding examples for the methods described above (e.g., method 600, method 700, method 800 and method 900) have been given primarily with respect to album thumbnails, image thumbnails and images such as photos, the content items may be any kind of electronic document or representation of an electronic document (e.g., slideshow documents, word processing documents, spreadsheet documents, etc.) or portions of electronic documents (e.g., slides, pages, tables, etc.) without departing from the scope of the embodiments disclosed herein. In some embodiments, the content items include a slideshow document and the thumbnail for the slideshow document is a representation of the slideshow document, as described in greater detail with reference to FIGS. 5CC-5EE below. In some embodiments, the content items include a plurality of slides of a slideshow document and the thumbnails are representations of slides of a slideshow, as described in greater detail with reference to FIGS. 5DD-5GG below. In some embodiments, the content items include a document (e.g., a PDF, a word-processing document, an e-book, etc.) and the thumbnail for the document is a representation of the document, as described in greater detail with reference to FIGS. 5HH-5JJ below. In some embodiments, the content items include a plurality of pages of a word-processing document and the thumbnails are representations of the pages of a document, as described in greater detail with reference to FIGS. 5JJ-5LL below.

As described in greater detail above with reference to FIGS. 5A-5F, in response to detecting a first multi-contact gesture, the device displays content associated with a respective thumbnail. For example, in FIG. 5CC the device displays a plurality of slideshow thumbnails 5060 in respective regions 5062. In response to detecting a de-pinch gesture (e.g., movement of contacts 5064 from a first location 5062-*a* on the display in FIG. 5CC away from each other to a second location 5062-*b* on the display in FIG. 5DD) at a location on the touch screen 112 that corresponds to a slideshow thumbnail (e.g., 5060-3 in FIG. 5CC), the device displays representations (e.g., slide thumbnails 5066 in FIG. 5DD-5EE) of slides in the slideshow (e.g., Slideshow 3). As illustrated in FIGS. 5CC-5DD the slideshow thumbnail is replaced with a plurality of slide thumbnails which spread apart as the contacts move away from each other (e.g., from 5064-*a* in FIG. 5CC to 5064-*b* in FIG. 5DD). Additionally, as illustrated in FIG. 5GG, in response to detecting liftoff of the contacts, the slide thumbnails 5066 are displayed in a predefined arrangement on the display (e.g., touch screen 112).

As described in greater detail above with reference to FIGS. 5F-5K, in response to detecting a first multi-contact gesture, the device displays content associated with a respective thumbnail. For example, in FIG. 5EE the device displays a plurality of slide thumbnails 5066 in respective regions 5068. In response to detecting a de-pinch gesture (e.g., movement of contacts 5070 from a first location 5070-*a* on the display in FIG. 5EE away from each other to a second location 5070-*b* on the display in FIG. 5FF) at a location on the touch screen 112 that corresponds to a slide thumbnail (e.g., 5066-8 in FIG. 5EE), the device displays a slide (e.g., slide 5072-8 in FIGS. 5FF-5GG) associated with the slide thumbnail. As illustrated in FIG. 5FF, the slide expands as the contacts move away from each other (e.g., from 5070-*a* in FIG. 5EE to 5070-*b* in FIG. 5FF). Additionally, as illustrated in FIG. 5GG, in response to detecting liftoff of the contacts the slide 5072-8 is displayed so as to fill a viewing pane on the display (e.g., touch screen 112).

As described in greater detail above with reference to FIGS. 5A-5F, in response to detecting a first multi-contact gesture, the device displays content associated with a respective thumbnail. For example, in FIG. 5HH the device displays a plurality of document thumbnails 5080 in respective regions 5082. In response to detecting a de-pinch gesture (e.g., movement of contacts 5084 from a first location 5082-*a* on the display in FIG. 5HH away from each other to a second location 5082-*b* on the display in FIG. 5II) at a location on the touch screen 112 that corresponds to a document thumbnail (e.g., 5080-3 in FIG. 5HH), the device displays representations (e.g., page thumbnails 5086 in FIG. 5II-5JJ) of pages in the document (e.g., Document 3). As illustrated in FIGS. 5HH-5II the document thumbnail is replaced with a plurality of page thumbnails which spread apart as the contacts move away from each other (e.g., from 5084-*a* in FIG. 5HH to 5084-*b* in FIG. 5II). Additionally, as illustrated in FIG. 5JJ, in response to detecting liftoff of the contacts the page thumbnails 5086 are displayed in a predefined arrangement on the display (e.g., touch screen 112).

As described in greater detail above with reference to FIGS. 5F-5K, in response to detecting a first multi-contact gesture, the device displays content associated with a respective thumbnail. For example, in FIG. 5JJ the device displays a plurality of page thumbnails 5086 in respective regions 5088. In response to detecting a de-pinch gesture (e.g., movement of contacts 5090 from a first location 5090-*a* on the display in FIG. 5JJ away from each other to a second location 5090-*b* on the display in FIG. 5KK) at a location on the touch screen 112 that corresponds to a page thumbnail (e.g., 5086-8 in FIG. 5JJ), the device displays a page (e.g., page 5092-8 in FIGS. 5KK-5LL) associated with the page thumbnail. As illustrated in FIG. 5KK the page expands as the contacts move away from each other (e.g., from 5090-*a* in FIG. 5JJ to 5090-*b* in FIG. 5KK). Additionally, as illustrated in FIG. 5LL, in response to detecting liftoff of the contacts the page 5092-8 is displayed so as to fill a viewing pane on the display (e.g., touch screen 112).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6G, 7, 8A-8D, and 9A-9D may be implemented by components depicted in FIGS. 1A-1C. For example, display operation 610, detection operation 612, and enlarge operation 636 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the internal state of application 136-1 data. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display and a touch-sensitive surface;
one or more processors;
memory; and
one or more programs, wherein the one or more programs are stored in the memory and configured to be executed by the one or more processors, the one or more programs including instructions for:
  displaying a first arrangement of thumbnails that includes a plurality of thumbnails, wherein each respective thumbnail of the plurality of thumbnails corresponds to a respective set of content items that includes a plurality of content items;
  while displaying the first arrangement of thumbnails, detecting a first contact and a second contact on the touch-sensitive surface at a location on the touch-sensitive surface that corresponds to a location of a first thumbnail of the plurality of thumbnails that corresponds to a first set of content items;
  while continuing to detect the first contact and the second contact on the touch-sensitive surface:
    detecting a first multi-contact gesture that includes movement of the first contact relative to the second contact; and,
    in response to detecting the first multi-contact gesture:
      displaying a group of representations of content items in the first set of content items; and
      enlarging the group of representations by spreading the representations of content items in the first set of content items out by an amount determined in accordance with the first multi-contact gesture;
  detecting termination of the first multi-contact gesture; and,
  in response to detecting termination of the first multi-contact gesture:
    in accordance with a determination that a resizing metric based on the first multi-contact gesture is below a predefined threshold:
      ceasing to display the representations of the plurality of content items in the first set of content items; and
      redisplaying the first arrangement of thumbnails; and,
    in accordance with a determination that the resizing metric based on the first multi-contact gesture is above the predefined threshold;
      spreading the representations of content items in the first set of content items out by a predefined amount; and
      displaying the representations of the plurality of content items in the first set of content items on the display in a second arrangement that is different from the first arrangement.

2. The device of claim 1, wherein the first contact and the second contact are detected at locations on the touch-sensitive surface that correspond to an initial region of the first thumbnail on the display.

3. The device of claim 1, including instructions for:
in response to detecting the first multi-contact gesture, translating the group of representations of content items in the first set of content items across the display in accordance with the first multi-contact gesture.

4. The device of claim 1, wherein:
the first arrangement of thumbnails includes a plurality of thumbnails other than the first thumbnail; and
the device includes instructions for fading out the plurality of thumbnails in the first arrangement of thumbnails when the resizing metric based on the first multi-contact gesture reaches a predefined fading threshold.

5. The device of claim 1, wherein displaying the representations of the plurality of content items in the first set of content items on the display in the second arrangement includes displaying the representations of the plurality of content items in the first set of in a multi-row, multi-column, grid.

6. The device of claim 1, wherein:
the first thumbnail is representative of respective content that is associated with a respective geographical location;
the first thumbnail is displayed on a map in a region on the map that corresponds to the respective geographical location associated with the respective content represented by the first thumbnail; and,
enlarging the group of representations includes displaying the group of representations overlaid on the map.

7. The device of claim 6, including instructions for, prior to displaying the respective thumbnail:
displaying a plurality of pins on the map, wherein:
  each of the pins is representative of content that is associated with a geographic location; and, each of the pins is displayed at a respective location on the map that corresponds to the geographic location of the content represented by the pin;

detecting a pin selection input associated with a respective pin of the plurality of pins; and, in response to detecting the pin selection input, displaying the first thumbnail.

8. The device of claim 1, wherein:

displaying the group of representations of content items in the first set of content items includes displaying a first representation overlapping a second representation;

spreading the representations of content items in the first set of content items out by an amount determined in accordance with the first multi-contact gesture includes reducing the amount by which the first representation overlaps the second representation in accordance with the first multi-contact gesture; and displaying the representations of the plurality of content items in the first set of content items on the display in a second arrangement that is different from the first arrangement includes displaying the first representation and the second representation without overlapping the first representation and the second representation.

9. A method, comprising:

at an electronic device with a display and a touch-sensitive surface:

displaying a first arrangement of thumbnails that includes a plurality of thumbnails, wherein each respective thumbnail of the plurality of thumbnails corresponds to a respective set of content items that includes a plurality of content items;

while displaying the first arrangement of thumbnails, detecting a first contact and a second contact on the touch-sensitive surface at a location on the touch-sensitive surface that corresponds to a location of a first thumbnail of the plurality of thumbnails that corresponds to a first set of content items;

while continuing to detect the first contact and the second contact on the touch-sensitive surface:

detecting a first multi-contact gesture that includes movement of the first contact relative to the second contact; and, in response to detecting the first multi-contact gesture:

displaying a group of representations of content items in the first set of content items; and enlarging the group of representations by spreading the representations of content items in the first set of content items out by an amount determined content associated in accordance with the first multi-contact gesture;

detecting termination of the first multi-contact gesture; and, in response to detecting termination of the first multi-contact gesture:

in accordance with a determination that a resizing metric based on the first multi-contact gesture is below a predefined threshold;

ceasing to display the representations of the plurality of content items in the first set of content items; and redisplaying the first arrangement of thumbnails; and, in accordance with a determination that the resizing metric based on the first multi-contact gesture is above the predefined threshold;

spreading the representations of content items in the first set of content items out by a predefined amount; and displaying the representations of the plurality of content items in the first set of content items on the display in a second arrangement that is different from the first arrangement.

10. The method of claim 9, wherein the first contact and the second contact are detected at locations on the touch-sensitive surface that correspond to an initial region of the first thumbnail on the display.

11. The method of claim 9, including:

in response to detecting the first multi-contact gesture, translating the group of representations of content items in the first set of content items across the display in accordance with the first multi-contact gesture.

12. The method of claim 9, wherein:

the first arrangement of thumbnails includes a plurality of thumbnails other than the first thumbnail; and the method includes fading out the plurality of thumbnails in the first arrangement of thumbnails when the resizing metric based on the first multi-contact gesture reaches a predefined fading threshold.

13. The method of claim 9, wherein displaying the representations of the plurality of content items in the first set of content items on the display in the second arrangement includes displaying the representations of the plurality of content items in the first set of content items in a multi-row, multi-column, grid.

14. The method of claim 9, wherein:

the first thumbnail is representative of respective content that is associated with a respective geographical location;

the first thumbnail is displayed on a map in a region on the map that corresponds to the respective geographical location associated with the respective content represented by the first thumbnail; and, enlarging the group of representations includes displaying the group of representations overlaid on the map.

15. The method of claim 14, including, prior to displaying the respective thumbnail:

displaying a plurality of pins on the map, wherein:

each of the pins is representative of content that is associated with a geographic location; and, each of the pins is displayed at a respective location on the map that corresponds to the geographic location of the content represented by the pin;

detecting a pin selection input associated with a respective pin of the plurality of pins; and, in response to detecting the pin selection input, displaying the first thumbnail.

16. The method of claim 9, wherein:

displaying the group of representations of content items in the first set of content items includes displaying a first representation overlapping a second representation;

spreading the representations of content items in the first set of content items out by an amount determined in accordance with the first multi-contact gesture includes reducing the amount by which the first representation overlaps the second representation in accordance with the first multi-contact gesture; and displaying the representations of the plurality of content items in the first set of content items on the display in a second arrangement that is different from the first arrangement includes displaying the first representation and the second representation without overlapping the first representation and the second representation.

17. A non-transitory computer readable storage medium storing one or more programs, the one or more programs comprising instructions, which when executed by an electronic device with a display and a touch-sensitive surface, cause the device to:
- display a first arrangement of thumbnails that includes a plurality of thumbnails, wherein each respective thumbnail of the plurality of thumbnails corresponds to a respective set of content items that includes a plurality of content items;
- while displaying the first arrangement of thumbnails, detect a first contact and a second contact on the touch-sensitive surface at a location on the touch-sensitive surface that corresponds to a location of a first thumbnail of the plurality of thumbnails that corresponds to a first set of content items;
- while continuing to detect the first contact and the second contact on the touch-sensitive surface:
  - detect a first multi-contact gesture that includes movement of the first contact relative to the second contact; and,
  - in response to detecting the first multi-contact gesture:
    - display a group of representations of content items in the first set of content items; and
    - enlarge the group of representations by spreading the representations of content items in the first set of content items out by an amount determined in accordance with the first multi-contact gesture;
- detect termination of the first multi-contact gesture; and,
- in response to detecting termination of the first multi-contact gesture:
  - in accordance with a determination that a resizing metric based on the first multi-contact gesture is below a predefined threshold:
    - cease to display the representations of the plurality of content items in the first set of content items; and
    - redisplay the first arrangement of thumbnails; and,
  - in accordance with a determination that the resizing metric based on the first multi-contact gesture is above the predefined threshold:
    - spread the representations of content items in the first set of content items out by a predefined amount; and
    - display the representations of the plurality of content items in the first set of content items on the display in a second arrangement that is different from the first arrangement.

18. The computer readable storage medium of claim 17, wherein the first contact and the second contact are detected at locations on the touch-sensitive surface that correspond to an initial region of the first thumbnail on the display.

19. The computer readable storage medium of claim 17, including instructions for:
- in response to detecting the first multi-contact gesture, translating the group of representations of content items in the first set of content items across the display in accordance with the first multi-contact gesture.

20. The computer readable storage medium of claim 17, wherein:
- the first arrangement of thumbnails includes a plurality of thumbnails other than the first thumbnail; and
- the computer readable storage medium includes instructions for fading out the plurality of thumbnails in the first arrangement of thumbnails when the resizing metric based on the first multi-contact gesture reaches a predefined fading threshold.

21. The computer readable storage medium of claim 17, wherein displaying the representations of the plurality of content items in the first set of content items on the display in the second arrangement includes displaying the representations of the plurality of content items in the first set of content items in a multi-row, multi-column, grid.

22. The computer readable storage medium of claim 17, wherein:
- the first thumbnail is representative of respective content that is associated with a respective geographical location;
- the first thumbnail is displayed on a map in a region on the map that corresponds to the respective geographical location associated with the respective content represented by the first thumbnail; and,
- enlarging the group of representations includes displaying the group of representations overlaid on the map.

23. The computer readable storage medium of claim 22, including instructions for, prior to displaying the respective thumbnail:
- displaying a plurality of pins on the map, wherein:
  - each of the pins is representative of content that is associated with a geographic location; and,
  - each of the pins is displayed at a respective location on the map that corresponds to the geographic location of the content represented by the pin;
- detecting a pin selection input associated with a respective pin of the plurality of pins; and,
- in response to detecting the pin selection input, displaying the first thumbnail.

24. The computer readable storage medium of claim 17, wherein:
- displaying the group of representations of content items in the first set of content items includes displaying a first representation overlapping a second representation;
- spreading the representations of content items in the first set of content items out by an amount determined in accordance with the first multi-contact gesture includes reducing the amount by which the first representation overlaps the second representation in accordance with the first multi-contact gesture; and
- displaying the representations of the plurality of content items in the first set of content items on the display in a second arrangement that is different from the first arrangement includes displaying the first representation and the second representation without overlapping the first representation and the second representation.

25. An electronic device, comprising:
- a display and a touch-sensitive surface;
- one or more processors;
- memory; and
- one or more programs, wherein the one or more programs are stored in the memory and configured to be executed by the one or more processors, the one or more programs including instructions for:
  - displaying a first arrangement of thumbnails that includes a plurality of thumbnails, wherein a first thumbnail in the first arrangement of thumbnails corresponds to first content;
  - while displaying the first arrangement of thumbnails, detecting a first contact and a second contact on the touch-sensitive surface at a location on the touch-sensitive surface that corresponds to a location of the first thumbnail;
  - while continuing to detect the first contact and the second contact on the touch-sensitive surface:
    - detecting a first multi-contact gesture that includes movement of the first contact relative to the second contact; and, in response to detecting the first multi-contact gesture:
  displaying a representation of the first content;
  enlarging the representation of the first content to a respective enlarged size in accordance with the first multi-contact gesture; and
  rotating the representation of the first content to a respective arbitrary orientation in accordance with the first multi-contact gesture;
detecting termination of the first multi-contact gesture; and,
in response to detecting termination of the first multi-contact gesture:
  in accordance with a determination that a resizing metric based on the first multi-contact gesture is below a predefined threshold, ceasing to display the first content at the respective enlarged size and at the respective arbitrary orientation and redisplaying the first arrangement of thumbnails; and,
  in accordance with a determination that the resizing metric based on the first multi-contact gesture is above the predefined threshold, displaying the content on the display at a predefined size and a predefined rotation.

* * * * *

UNITED STATES PATENT AND TRADEMARK OFFICE
CERTIFICATE OF CORRECTION

PATENT NO. : 8,698,762 B2  
APPLICATION NO. : 12/789441  
DATED : April 15, 2014  
INVENTOR(S) : Oliver P. Wagner et al.

Page 1 of 1

It is certified that error appears in the above-identified patent and that said Letters Patent is hereby corrected as shown below:

In the Claims

Column 48, line 23, in claim 1, delete "threshold;" and insert -- threshold: --, therefor.

Column 48, line 51, in claim 5, delete "of" and insert -- of content items --, therefor.

Column 49, line 50-51, in claim 9, after "determined" delete "content associated".

Column 49, line 59, in claim 9, delete "threshold;" and insert -- threshold: --, therefor.

Column 49, line 67, in claim 9, delete "threshold;" and insert -- threshold: --, therefor.

Signed and Sealed this  
Ninth Day of September, 2014

Michelle K. Lee  
*Deputy Director of the United States Patent and Trademark Office*